(12) United States Patent
O'Hara et al.

(10) Patent No.: US 11,999,628 B2
(45) Date of Patent: Jun. 4, 2024

(54) SYSTEMS AND METHODS FOR PRODUCING ELEMENTS FROM MIXTURES, STORAGE/GENERATION VESSELS, AND STORAGE/GENERATION VESSEL ASSEMBLIES

(71) Applicant: BATTELLE MEMORIAL INSTITUTE, Richland, WA (US)

(72) Inventors: Matthew J. O'Hara, Richland, WA (US); Gabriel B. Hall, Richland, WA (US); Lucas P. Boron-Brenner, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 504 days.

(21) Appl. No.: 17/120,084

(22) Filed: Dec. 11, 2020

(65) Prior Publication Data

US 2021/0188654 A1 Jun. 24, 2021

Related U.S. Application Data

(63) Continuation-in-part of application No. 16/894,679, filed on Jun. 5, 2020.

(60) Provisional application No. 62/946,592, filed on Dec. 11, 2019, provisional application No. 62/857,681, filed on Jun. 5, 2019.

(51) Int. Cl.
| | | |
|---|---|---|
| *C01F 13/00* | (2006.01) |
| *B01D 15/00* | (2006.01) |
| *B01D 15/10* | (2006.01) |
| *B01J 20/20* | (2006.01) |
| *C02F 1/68* | (2023.01) |
| *B01F 101/57* | (2022.01) |
| *B01J 20/34* | (2006.01) |
| *G21G 1/00* | (2006.01) |

(52) U.S. Cl.
CPC .............. *C01F 13/00* (2013.01); *B01D 15/10* (2013.01); *B01J 20/20* (2013.01); *C02F 1/683* (2013.01); *B01F 2101/57* (2022.01); *B01J 20/34* (2013.01); *G21G 1/001* (2013.01)

(58) Field of Classification Search
None
See application file for complete search history.

(56) References Cited

U.S. PATENT DOCUMENTS 4,663,129 A * 5/1987 Atcher .................. G21G 4/08
423/2
5,322,644 A 6/1994 Dunn et al.
5,707,922 A 1/1998 Mimori et al.
(Continued)

FOREIGN PATENT DOCUMENTS

EP 3174068 5/2017
EP 20902056 2/2024

OTHER PUBLICATIONS

Kah et al. (Water Research, 2017, 124, 673-692). (Year: 2017).*
(Continued)

*Primary Examiner* — Clare M Perrin
(74) *Attorney, Agent, or Firm* — Wells St. John P.S.

(57) ABSTRACT

Systems and/or methods for producing free elements, systems and/or methods for producing element storage/generation vessel assemblies, element storage/generation vessel assemblies, system and/or methods for purifying elements and providing a progeny generating assemblies are provided.

25 Claims, 63 Drawing Sheets

(56) References Cited

U.S. PATENT DOCUMENTS

| | | | |
|---|---|---|---|
| 5,809,394 | A | 9/1998 | Bray et al. |
| 5,863,439 | A | 1/1999 | Dietz et al. |
| 6,126,909 | A | 10/2000 | Rotmensch et al. |
| 6,136,197 | A | 10/2000 | Egorov et al. |
| 6,416,668 | B1* | 7/2002 | Al-Samadi ........... B01D 61/025 |
| | | | 210/639 |
| 6,645,377 | B1 | 11/2003 | Egorov et al. |
| 6,780,326 | B2 | 8/2004 | Egorov et al. |
| 7,001,522 | B2 | 2/2006 | Egorov et al. |
| 7,157,022 | B2 | 1/2007 | Horwitz et al. |
| 8,894,860 | B2* | 11/2014 | Li ........................ B01D 15/361 |
| | | | 210/661 |
| 2003/0127395 | A1* | 7/2003 | Bond ....................... G21G 4/08 |
| | | | 423/11 |
| 2006/0153760 | A1 | 7/2006 | Meikrantz et al. |
| 2008/0038169 | A1* | 2/2008 | Phan ....................... C22B 3/284 |
| | | | 423/120 |
| 2012/0325052 | A1 | 12/2012 | Rösch et al. |
| 2018/0047474 | A1 | 2/2018 | O'Hara |
| 2018/0308599 | A1 | 2/2018 | O'Hara |
| 2021/0188654 | A1 | 6/2021 | O'Hara et al. |

OTHER PUBLICATIONS

Atcher et al., "An Improved Generator for the Production of 212Pb and 212Bi from 224Ra", Applied Radiation and Isotopes vol. 39, No. 4, 1988, United Kingdom, pp. 283-286.
Dash et al., "Radionuclide Generators: The Prospect of Availing PET Radiotracers to Meet Current Clinical Needs and Future Research Demands", American Journal of Nuclear Medicine and Molecular Imaging 9(1), 2019, United States, pp. 30-66.
Horwitz et al., "A Novel Strontium-Selective Extraction Chromatographic Resin", Solvent Extraction and Ion Exchange 10(2), 1992, United States, pp. 313-336.
Hyde, "The Radiochemistry of Thorium", Nuclear Science Series, NAS-NS 3004, National Academy of Sciences National Research Council, Jan. 1960, United States, 77 pages.
Ishimori et al., "Measurement and Calculation of Radon Releases from NORM Residues", International Atomic Energy Agency Technical Reports Series No. 474, 2013, Vienna, 95 pages.
Knapp Jr. et al., "Re-Emergence of the Important Role of Radionuclide Generators to Provide Diagnostic and Therapeutic Radionuclides to Meet Future Research and Clinical Demands", Journal of Radioanalytical and Nuclear Chemistry 302, 2014, Netherlands, pp. 1053-1068.
NIDC, "DOE Isotope Program Announces Availability of Radium-224/Lead-212 Generators", Notice #38, Mar. 13, 2015, available online at https://www.isotopes.gov/node/123, 1 page.
Westrøm, et al., "Preparation of 212Pb-Labeled Monoclonal Antibody using a Novel 224Ra-Based Generator Solution", Nuclear Medicine and Biology 51, 2017, United States, pp. 1-9.
Zhao et al., "An Initial Study of EDTA Complex Based Draw Solutes in Forward Osmosis Process", Desalination 378, 2016, Netherlands, pp. 28-36.
WO PCT/US2020/036503 IPRP, Dec. 16, 2021, Battelle Memorial Institute.
WO PCT/US2020/064710 IPRP, May 17, 2022, Battelle Memorial Institute.
EP 20818030 Supplemental Srch Rpt, dated Apr. 14, 2023, Battelle Memorial Institute.
Bunney et al., "Quantitative Radiochemical Analysis by Ion Exchange. Anion Exchange Behavior of Several Metal Ions in Hydrochloric, Nitric, and Sulfuric Acid Solutions", Analytical Chemistry 31, 1959, United States, pp. 324-326.

Dudzinska et al., "Anion Exchange Studies of Lead-EDTA Complexes", Reactive Polymers vol. 16, 1991, Netherlands, pp. 71-80.
Faris et al., "Anion Exchange Characteristics of the Elements in Nitric Acid Medium", Analytical Chemistry 36, 1964, United States, pp. 1157-1158.
Grate et al., "Extraction Chromatographic Methods in the Sample Preparation Sequence for Thermal Ionization Mass Spectrometric Analysis of Plutonium Isotopes", Analytical Chemistry 83, 2011, United States, pp. 9086-9091.
Horwitz et al., "A lead-selective extraction chromatographic resin and its application to the isolation of lead from geological samples", Analytica Chimica Acta 292 (1994) pp. 263-273.
Horwitz et al., "Separation and Preconcentration of Actinides by Extraction Chromatography using a Supported Liquid Anion Exchanger: Application to the Characterization of High-Level Nuclear Waste Solutions", Analytica Chimica Acta 310, 1995, Netherlands, pp. 63-78.
IBC Advanced Technologies, "AnaLig Data Sheet: Ra-01", IBC 10604.Rev 1. IBC Advanced Technologies, Inc. American Fork, UT. p. 1.
Karhu et al., "Determination of the Solubility Products of Nitrilotriacetic Acid, Ethylenediaminetetraacetic Acid and Diethylenetriaminepentaacetic Acid", Analytica Chimica Acta vol. 380, 1999, Netherlands, pp. 105-111.
Korkisch et al., "Anion Exchange Separation of Uranium, Thorium and Bismuth", 1961, pp. 290-295. (Year: 1961).
Li et al., "Automated Cassette-Based Production of High Specific Activity [203/212pb] Peptide-Based Theranostic Radiopharmaceuticals for Image-Guided Radionuclide Therapy for Cancer", Applied Radiation and Isotopes 127, 2017, United Kingdom, pp. 52-60.
Maxwell et al., "Rapid Fusion Method for the Determination of Refractory Thorium and Uranium Isotopes in Soil Samples", Journal of Radioanalytical and Nuclear Chemistry vol. 305, 2015, Netherlands, pp. 631-641.
Monroy-Guzman, "Isolation of Uranium by Anionic Exchange Resins", J. Chem. Chem. Eng. 10 (2016) 90-95 (Year: 2016).
Ornl, "Standard Operating Procedure for ORNL Radium-224 (t1/2=3.66 d)/Lead-212 (t1/2=10.64 h) Generator System", Oak Ridge National Laboratory: Oak Ridge, TN. 2009, p. 1-4.
Strelow, "Distribution Coefficients and Ion Exchange Behavior of 46 Elements with a Macroreticular Cation Exchange Resin in Hydrochloric Acid", Analytical Chemistry 56 (6), 1984, United States, pp. 1053-1056.
Verlinde et al., "A New Rapid Protocol for 226Ra Separation and Preconcentration in Natural Water Samples using Molecular Recognition Technology for ICP-MS Analysis", Journal of Environmental Radioactivity vol. 202, 2019, United Kingdom, pp. 1-7.
WO PCT/US2020/064710 Search Rpt, dated Aug. 31, 2021, Battelle Memorial Institute.
WO PCT/US2020/064710 Written Opin, dated Aug. 31, 2021, Battelle Memorial Institute.
WO PCT/US2020/036503 Search Rept., dated Oct. 5, 2020, Battelle Memorial Institute.
WO PCT/US2020/036503 Writ Opin., dated Oct. 5, 2020, Battelle Memorial Institute.
Kraus et al., "Fig. 3—Adsorption of the Elements from Hydrochloric Acid", Proceedings of the International Conference on the Peaceful Uses of Atomic Energy, vol. 7, p. 113, Session 9B1, P/837, United Nations (1956).
Martell et al., "Critical Stability Constants", vol. 5: First Supplement, Springer Science+Business Media, New York, 1982, pp. 1-58.
Knapp, Jr. et al., "Availability of Rhenium-188 from the Alumina-Based Tungsten-188/Rhenium 88 Generator for Preparation of Rhenium-188-Labeled Radiopharmaceuticals for Cancer Treatment", Anti Cancer Research, Int. Instit. Antocancer Research, vol. 17, May 1, 1997, Greece, pp. 1783-1795.

* cited by examiner

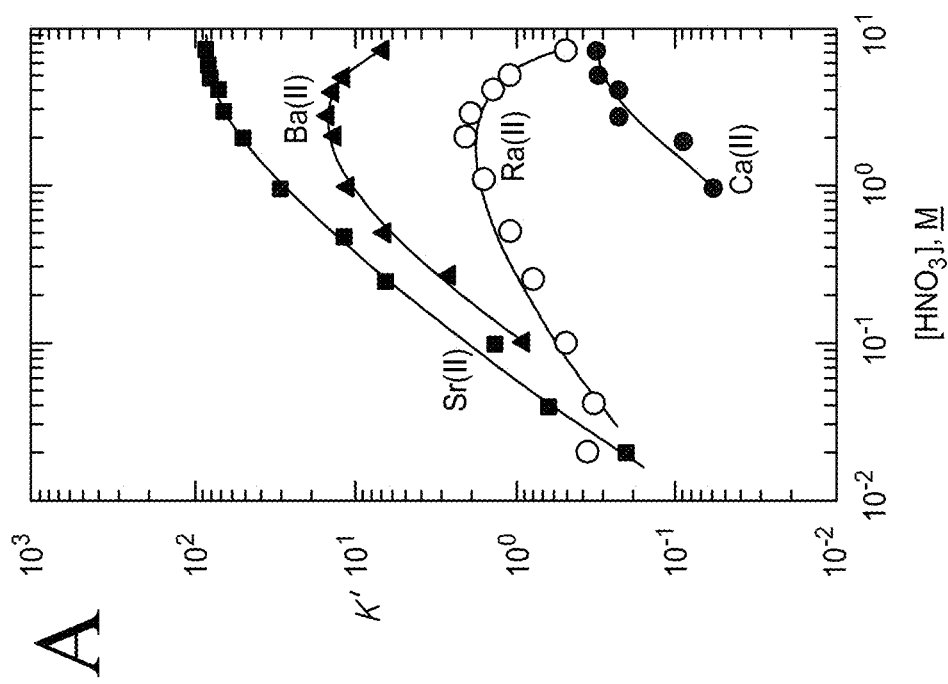
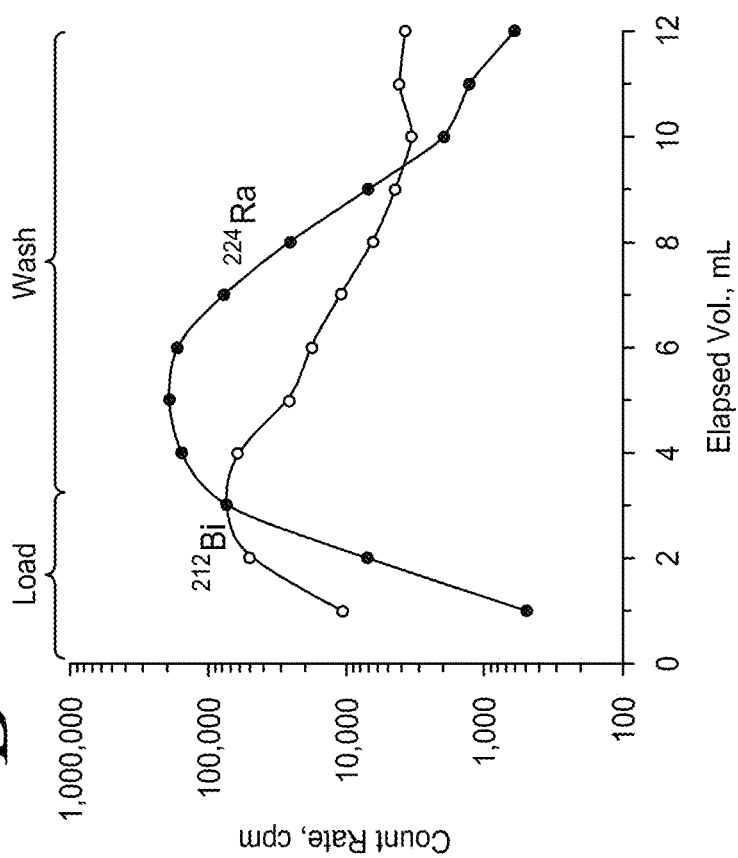
FIG. 8

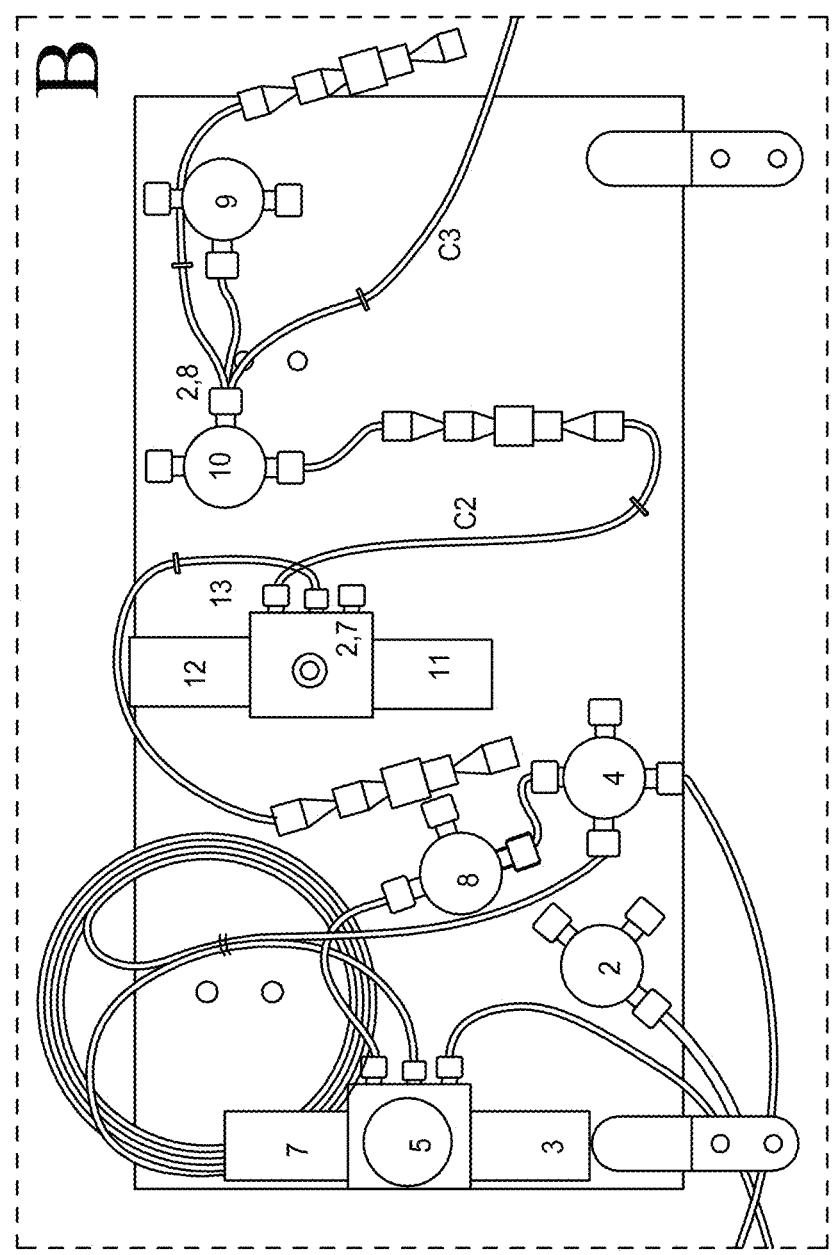
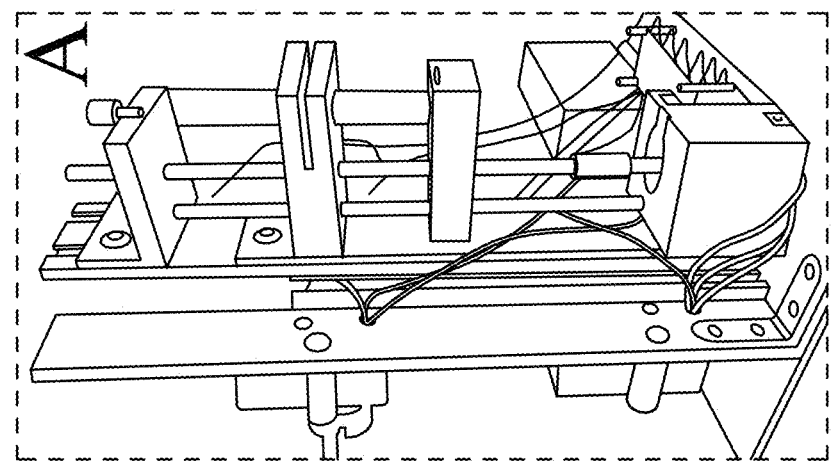
FIG. 17

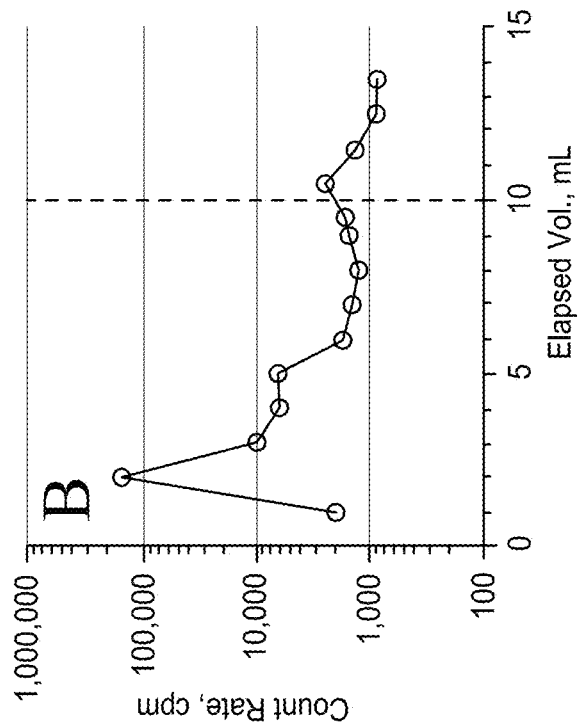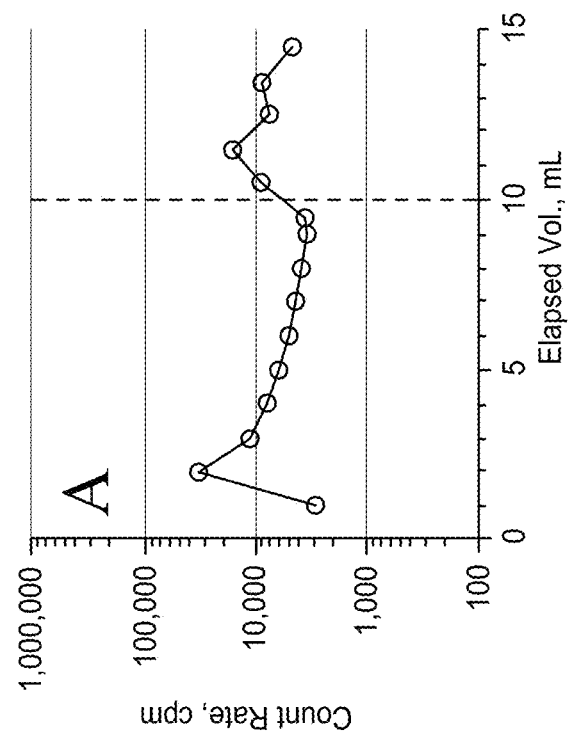
FIG. 18

SYSTEMS AND METHODS FOR PRODUCING ELEMENTS FROM MIXTURES, STORAGE/GENERATION VESSELS, AND STORAGE/GENERATION VESSEL ASSEMBLIES

CROSS REFERENCE TO RELATED APPLICATION

This application is a continuation-in-part of U.S. patent application Ser. No. 16/894,679 filed Jun. 5, 2020, entitled "Systems and Methods for Separating Radium from Lead, Bismuth, and Thorium", which claims priority to and the benefit of U.S. Provisional Patent Application Ser. No. 62/857,681 filed Jun. 5, 2019, entitled "Separation of Radium from Lead, Bismuth, and Thorium for Medical Isotope Production Applications". This application also claims priority to and the benefit of U.S. Provisional Patent Application Ser. No. 62/946,592 filed Dec. 11, 2019 entitled "Fluidic System for Packing Generator Columns with Resin Containing Homogeneously Distributed Isotope", the entirety of each of which are incorporated by reference herein.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

TECHNICAL FIELD

The disclosure generally relates to the isolation of metals as elements for example and assemblies for the storage/generation of metals and in more particular embodiments, to medical radionuclides and more to methods for obtaining materials and performing separations for generating such materials.

BACKGROUND

In the field of medical radionuclide separations of materials and preparation of materials for inclusion in various treatments face a number of obstacles. Availability, cost, timing, and limited shelf-life coupled with the need to perform many activities in specialized safe facilities create a number of obstacles. The existing method of $^{212}$Pb/$^{212}$Bi generator preparation requires two steps: first $^{224}$Ra must be isolated from a $^{228}$Th stock solution; second the $^{224}$Ra must be loaded onto a cation exchange (CatIX) resin (which becomes the $^{212}$Pb/$^{212}$Bi generator column), the performance of which can expose staff to a high radiological dose. The dose is largely caused by the short-lived progeny below $^{212}$Po. In addition, this method is cumbersome and labor intensive and can require multiple columns and boil-down steps to achieve the desired ends.

What are needed are more and more improved methods for simplifying these processes, increasing the yields and addressing the various barriers to use. The following description provides various examples and advances in this regard.

SUMMARY

Systems for separating Ra from a mixture comprising at least Ra, Pb, Bi, and Th are provided. The systems can include: a first vessel housing a first media and either Pb or Bi and/or Th; and a second vessel in fluid communication with the first vessel, the second vessel housing a second media and Ra, wherein the first media is different from the second media.

Systems for separating Ra from a mixture comprising at least Ra, Pb, Bi, and Th are also provided that can include a first vessel housing a first media and Th and/or Bi; and a second vessel in fluid communication with the first vessel, the second vessel housing a first media and Pb, wherein the first media is different from the second media.

Additional systems for separating Ra from a mixture comprising at least Ra, Pb, Bi, and Th can include: a first vessel housing a first media and Th or Bi; a second vessel in fluid communication with the first vessel, the second vessel housing a second media and Pb; and a third vessel in fluid communication with the second vessel, the third vessel housing a third media and Ra, wherein at least one of the first, second, or third medias are different from the other medias.

Methods for separating Ra from Pb, Bi, and Th are provided, the methods can include: providing a first mixture comprising Ra, Pb, Bi, and/or Th; providing a system that includes: a first vessel housing a first media; and a second vessel in fluid communication with the first vessel, the second vessel housing a second media; exposing the first mixture to the first media within the first vessel to separate the Th and Bi from the Ra and Pb; then, through the fluid communication, exposing the remaining mixture to the second media in the second vessel to associate the Pb or Ra with the second media.

Methods for separating Ra from Pb, Bi, and Th can also include providing a first mixture comprising Ra, Pb, Bi, and/or Th; providing a system that can include: a first vessel housing a first media; a second vessel in fluid communication with the first vessel, the second vessel housing a second media; and a third vessel in fluid communication with the second vessel, the third vessel housing a third media; and exposing the first mixture to the first media within the first vessel then, through the fluid communication, exposing the first remainder to the second media in the second vessel, then, through fluid communication, exposing the next remainder to the third media in the third vessel, the exposing separating the Th and Bi from the Ra and Pb, and the Ra from the Pb.

Methods for separating Ra from being associated with a media are also provided. The methods can include: exposing the Ra and media to a chelating agent to form a mixture comprising the Ra complexed with the chelating agent.

Methods for separating Ra from Pb, Bi, and Th are also provided that can include: providing a first mixture comprising Ra and at least Bi and/or Th; separating one or more of Bi and/or Th from the Ra, the separating associating the Bi and/or Th with a first media; and disassociating the Bi and/or Th from the first media to form a mixture comprising the Bi and Th and transferring the mixture to a vessel housing at least Ra and additional Bi and/or Th.

The system/methods can include providing a mixing vessel in fluid communication with both a bound element source and an acid source. The mixing vessel can be operably configured to mix contents within the mixing vessel. The systems can include a first multiport valve operably engaged with an exit of the mixing vessel, and a second multiport valve operably engaged with the first multiport valve, the acid source, and a collection vessel.

Methods for producing free element from a bound element are also provided. The methods can include: providing a solution comprising an element bound to a complex; exposing the solution to an acid solution to separate the complex from the element; and removing either the separated element or the complex from the solution to produce a free element.

Systems and/or methods for producing metal storage/generation vessel assemblies are provided. The systems can include: a first mixing vessel in fluid communication with a first and a second multiport valve; a manifold of multiport valves in fluid communication with the second multiport valve; a second mixing vessel in fluid communication with at least one of the multiport valves of the manifold; a third multiport valve in fluid communication with an exit of the second mixing vessel; and a metal storage/generation vessel in fluid communication with the third multiport valve.

The first and second mixing vessels define different volumes. The first mixing vessel defines a volume larger than the volume defined by the second mixing vessel.

Methods for producing a metal storage/generation vessel assembly are also provided. The methods can include: homogenizing a resin slurry in a first mixing vessel; supplementing the homogenized resin slurry with a free element to form a homogenized bound element resin slurry; and transferring the homogenized bound element resin slurry to a storage/generation vessel assembly. As shown and described, the resin/media alone or in combination with free element of the present disclosure, without homogenization will consolidate at the lower portion of the vessel or adhere to other portions of the vessel. Homogenizing herein keeps the resin/media alone or in combination with free element distributed throughout the solution of the vessel. This distribution can be uniform and/or without a heterogenous interface.

Metal storage/generation vessel assemblies are also provided that can include: sidewalls extending between entrance and exit openings to define a vessel volume; inert material proximate the exit opening: and a homogenized bound element resin bed within the vessel, the inert material being between the resin bed and the exit opening.

DRAWINGS

Embodiments of the disclosure are described below with reference to the following accompanying drawings.

Figure 4:
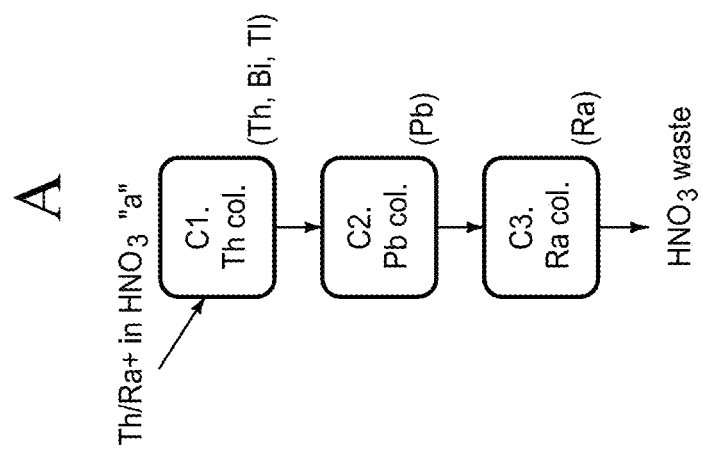
FIG. 4 is a depiction of Step A: Initial 3-column load of $^{228}$Th stock+wash "a".
Figure 5:
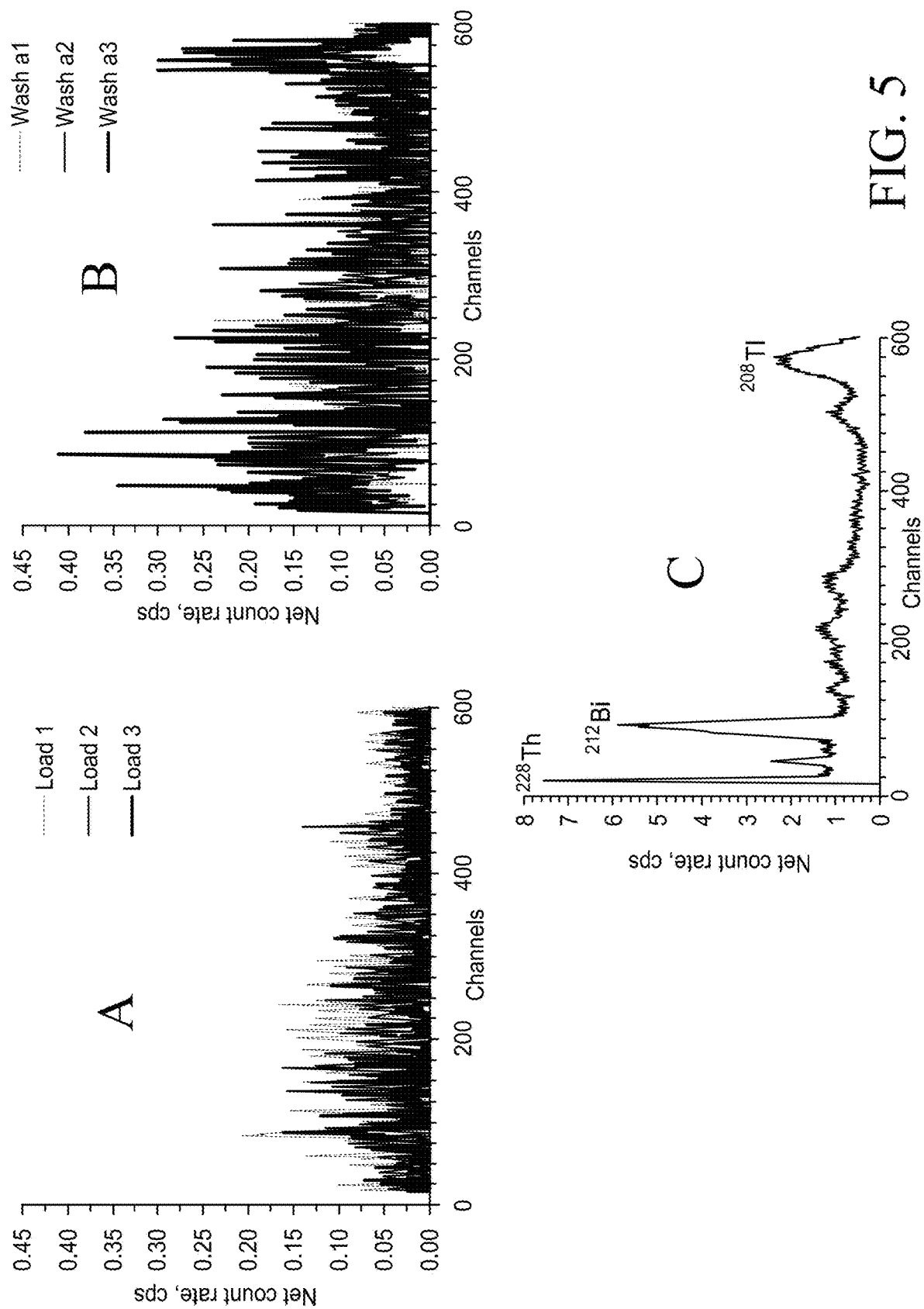

FIG. 5 depicts gamma spectra obtained following triple-column load/wash routine (see path A in FIG. 4). The $^{228}$Th/progeny sample is loaded (A) and washed (B) through all three columns using 6 M HNO$_3$; no activity is observed to break through the three-column stack. (C) Following load and wash steps, the AnIX$_{poly}$ (defined below in Table 1) media (C1) shows $^{228}$Th, $^{212}$Bi, and $^{208}$Tl adsorbed on the resin beads.

Figure 6:
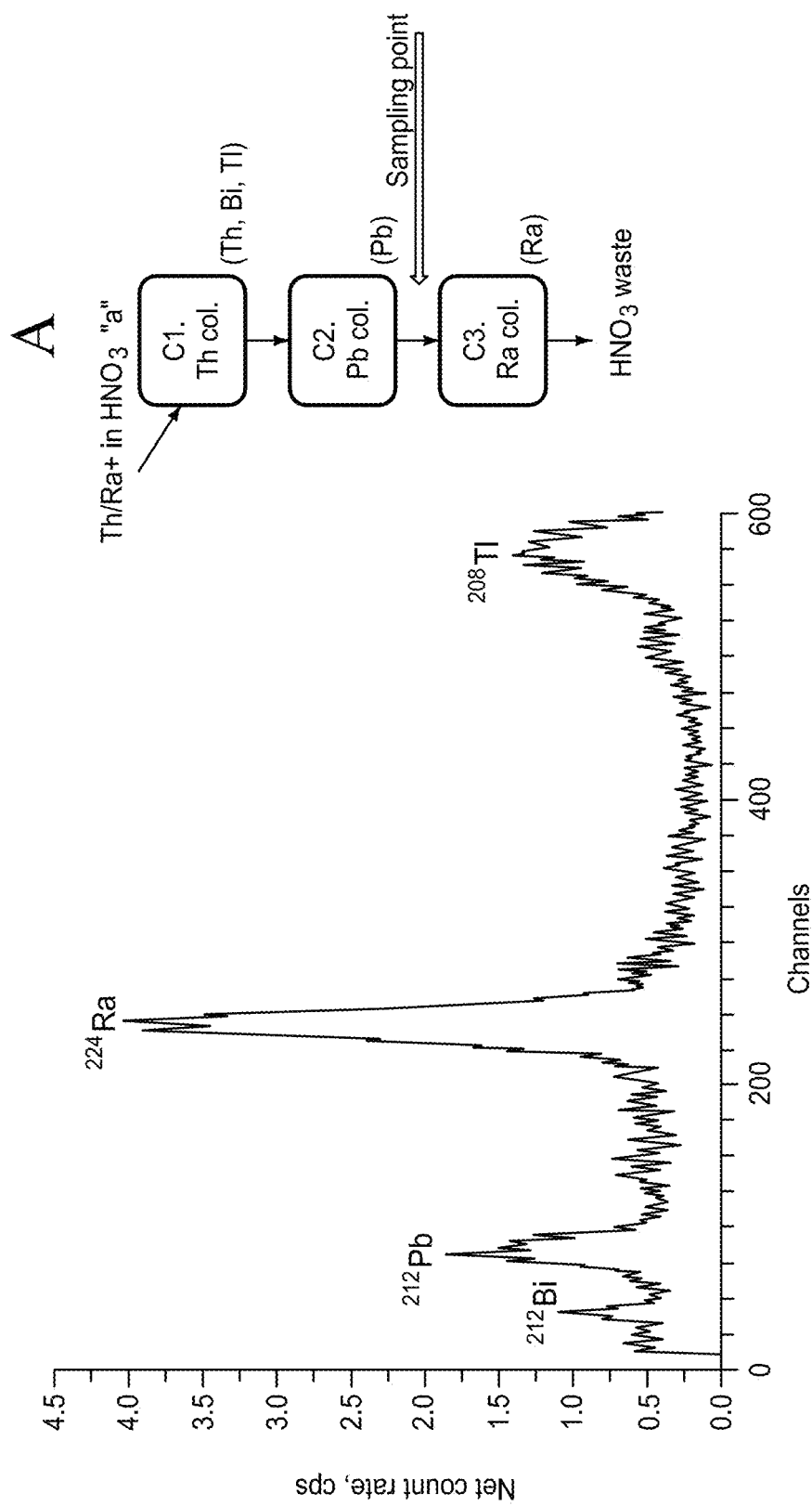

FIG. 6 depicts gamma spectrum showing a prominent $^{224}$Ra emission in a fraction collected immediately downstream of C2 during the wash "a" sequence. Traces of $^{212}$Bi/$^{208}$Tl (unretained on C2), likely generated by the $^{212}$Pb adsorbed on C2, are likewise observed.

Figure 7:
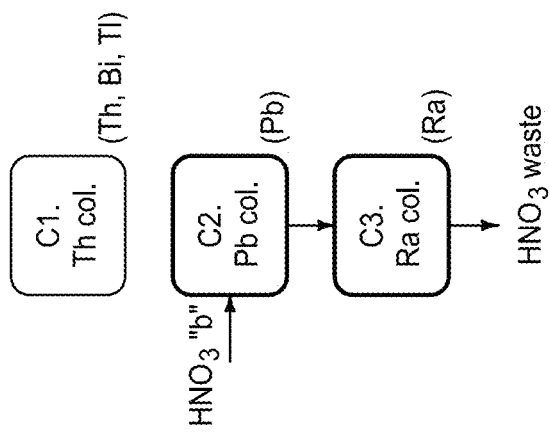

FIG. 7 depicts Step B: C2+C3 wash "b".

FIG. 8 depicts (A) Resin capacity factors (k') for Group II divalent cations in nitric acid on Sr Resin. (B) Sr Resin effluent fraction elution profiles for unretained $^{212}$Bi and slightly retained $^{224}$Ra in 2 M HNO$_3$.

Figure 9:
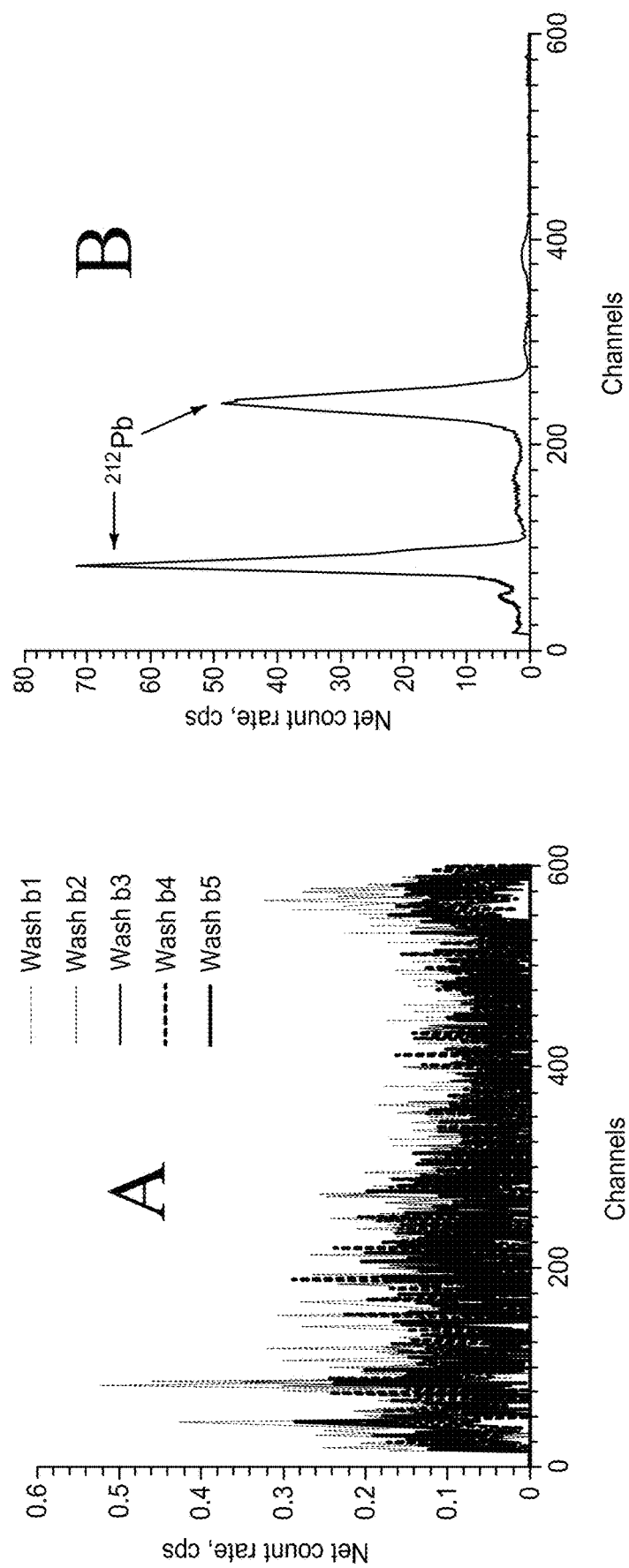

FIG. 9 depicts gamma spectra obtained following double-column load/wash routine (see path B in FIG. 7). (A) The $^{212}$Pb and $^{224}$Ra are washed through C2/C3 using 2 M HNO$_3$; no activity is observed to break through the two-column stack, as $^{212}$Pb is retained on the Sr Resin column (C2) and $^{224}$Ra is retained on the Ra-01 Resin column (C3). (B) Spectrum taken of the Sr Resin column (C2) at the conclusion of the wash "b" step shows pure $^{212}$Pb.

Figure 10:
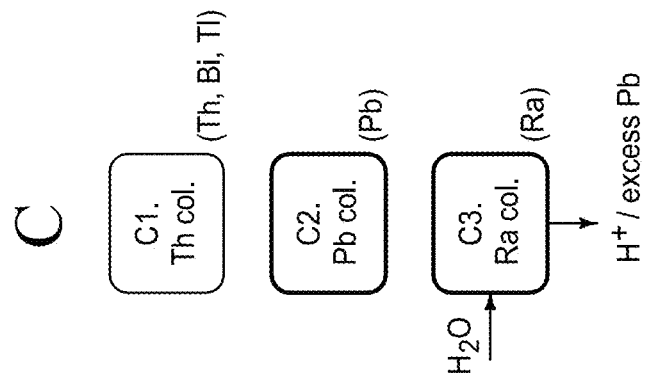

FIG. 10 is Step C: C3 water rinse.

Figure 11:
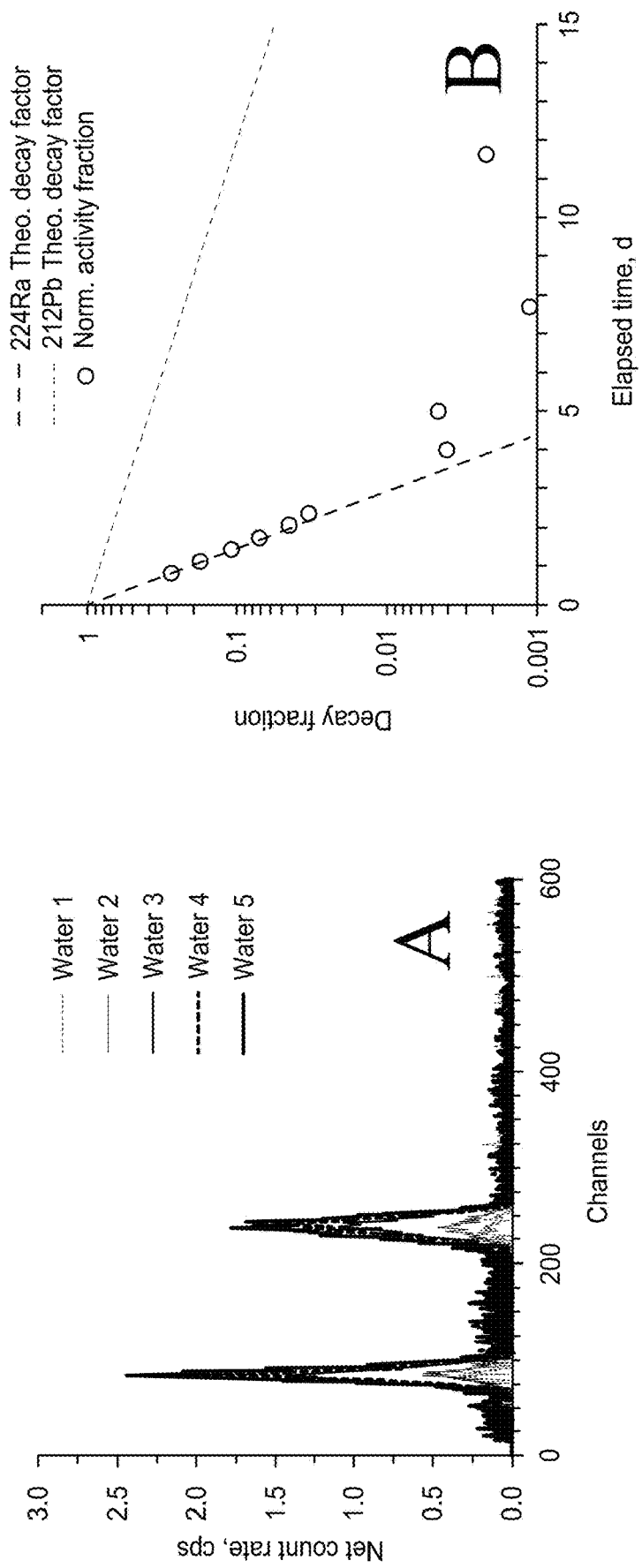

FIG. 11 depicts (A) Elution of residual $^{212}$Pb from the $^{224}$Ra-loaded C3 using water. (B) Decay rate of the water wash fractions indicated little to no $^{224}$Ra loss during the water wash step.

Figure 12:
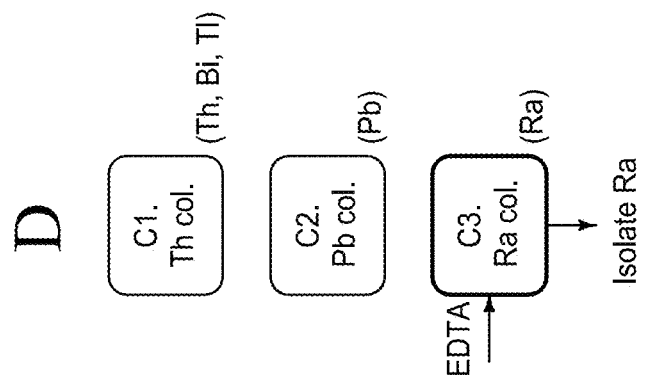

FIG. 12 is Step D: C3 elution of isolated $^{224}$Ra.

Figure 13:
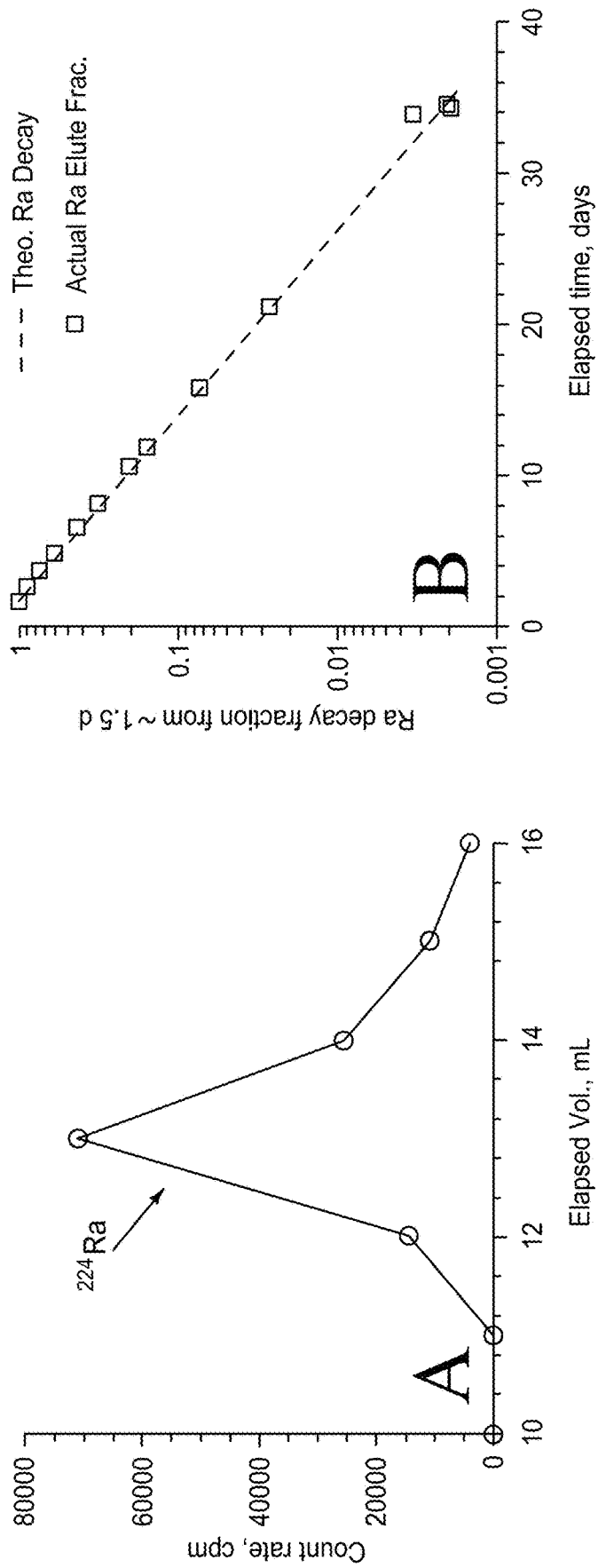

FIG. 13 depicts (A) Assembled radiochromatogram of $^{224}$Ra elute fractions. (B) Monitoring the isolated $^{224}$Ra fraction activity over the theoretical decay rate as a function of time shows that it is radionuclidically pure.

Figure 14:
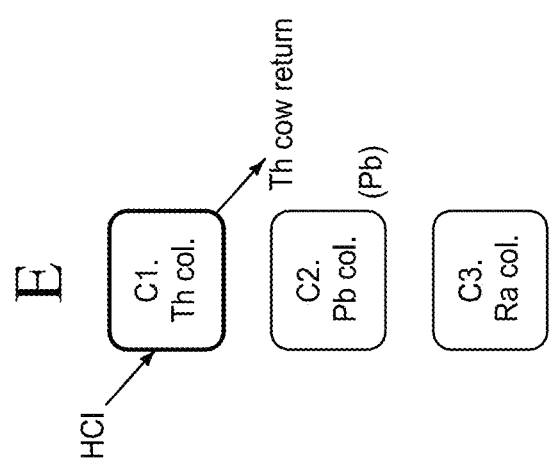

FIG. 14 is Step E: C1 elution of $^{228}$Th stock with HCl.

Figure 15:
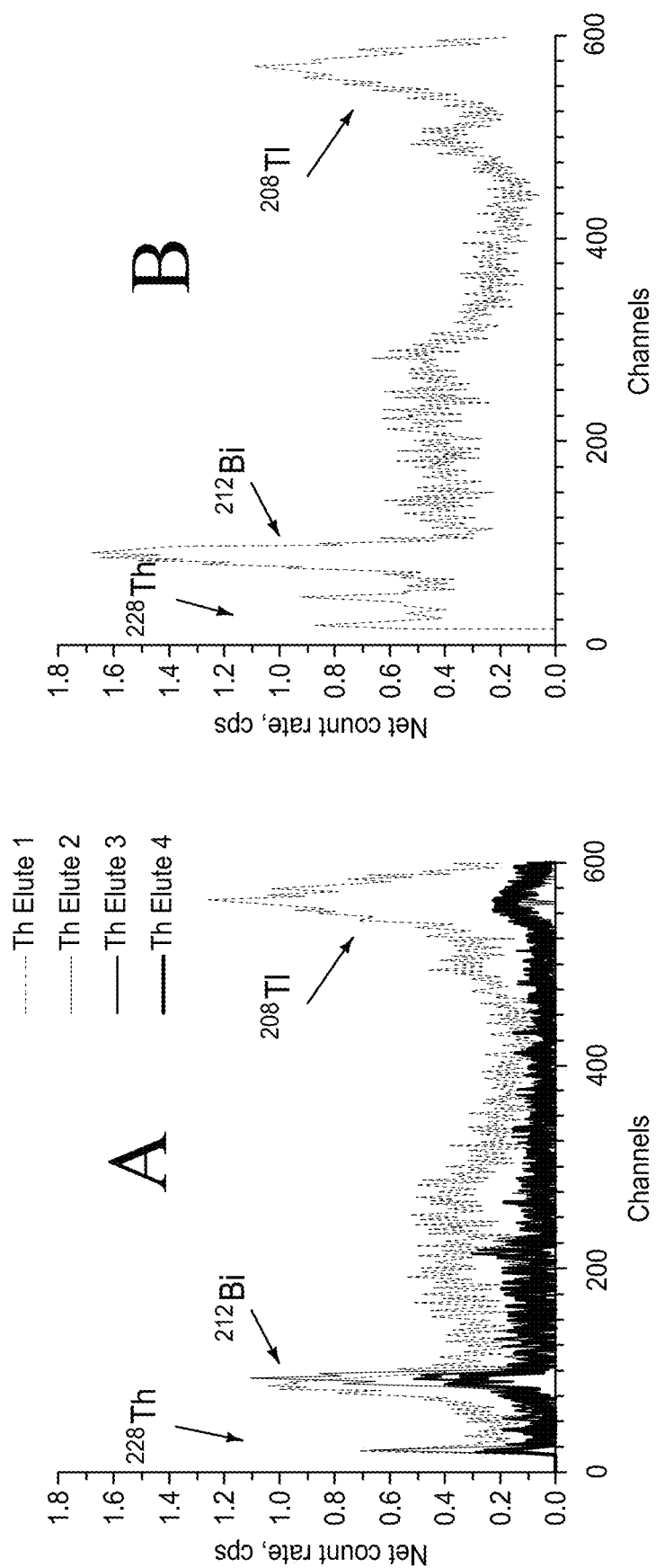

FIG. 15 is (A) Elution of $^{228}$Th, $^{212}$Bi, and $^{208}$Tl from the AnIX$_{poly}$ (defined below in Table 1) resin M1 using 8 M HCl. (B) Spectrum of the AnIX$_{poly}$ (defined below in Table 1) resin M1 following the HCl elution cycle indicates incomplete $^{228}$Th elution.

Figure 16:
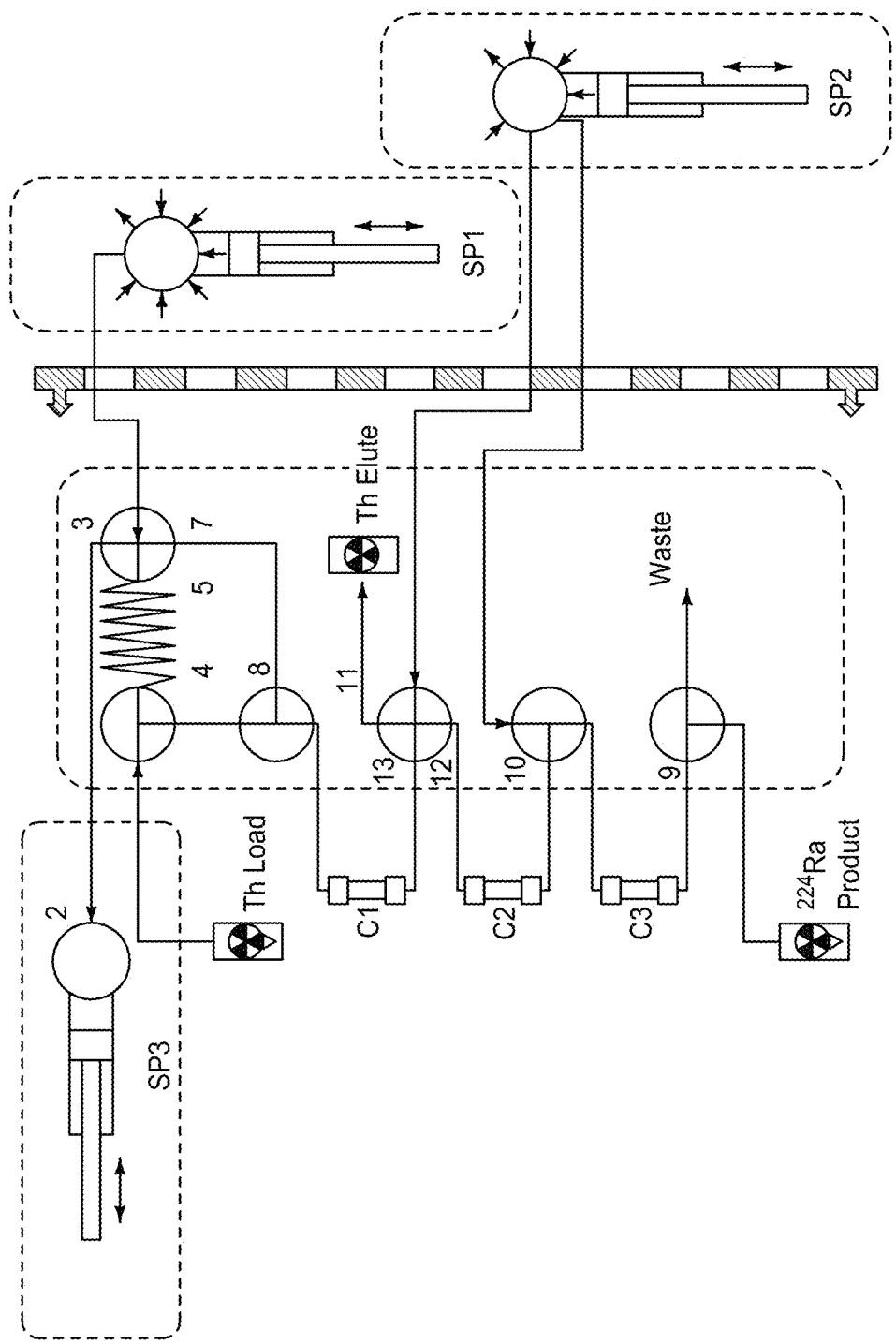

FIG. 16 is fluidic layout schematic of automated triple-column based $^{224}$Ra purification system according to an embodiment of the disclosure.

FIG. 17 depicts (A) stepper motor driven syringe pump for $^{228}$Th stock solution loading operations. (B) Solenoid-based fluid routing system to drive the triple-column $^{224}$Ra isolation procedure according to embodiments of the disclosure.

FIG. 18 is gamma spectra of $^{228}$Th elution chromatogram (A) using 1 M HCl on MP-1M resin (M1). $^{228}$Th elution chromatogram (B) using 8 M HCl on same. Dashed line at 10 mL indicates the beginning of an applied strip solution of EDTA to remove any residual $^{228}$Th from the column.

Figure 19:
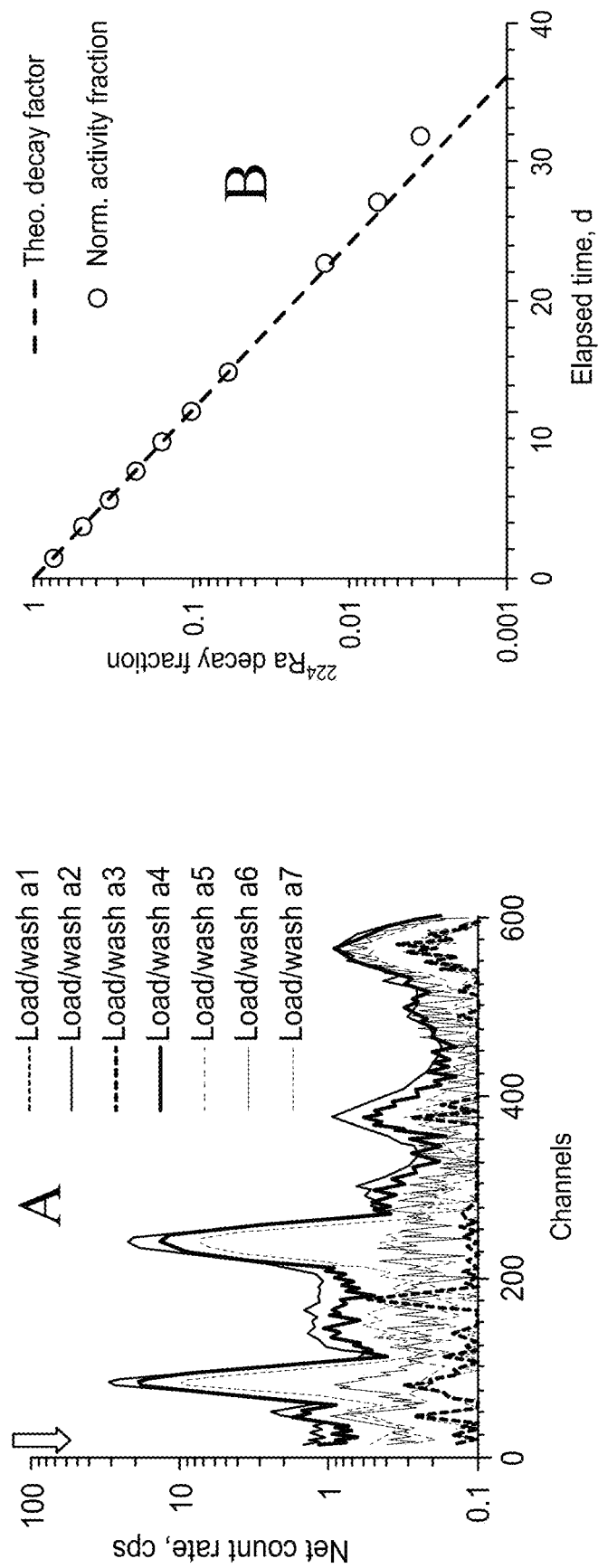

FIG. 19 depicts (A) Load and wash "a" fractions collected from 1 cc TEVA resin effluents in 6 M HNO$_3$. Arrow indicates the location of the absent $^{228}$Th X-ray. $^{212}$Pb, $^{212}$Bi and $^{208}$Tl photon peaks are observed to break through the media (the $^{224}$Ra emission is hidden under the $^{212}$Pb peak at ~240 keV). (B) Analysis of the TEVA resin effluents over time indicate a decay rate consistent with that of $^{224}$Ra; this indicates that $^{228}$Th was well adsorbed on the media during the load/wash "a" steps.

Figure 20:
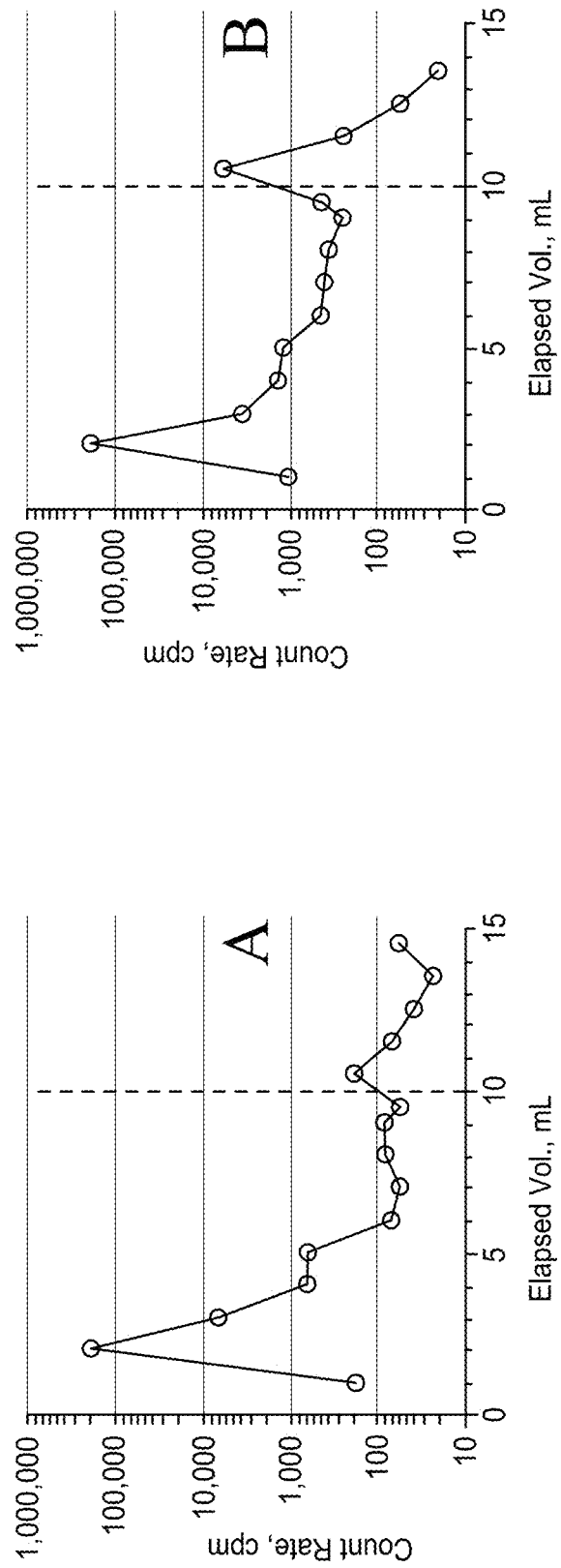

FIG. 20 depicts gamma spectra of $^{228}$Th elution chromatogram (A) using 1 M HCl on TEVA resin (M1). $^{228}$Th elution chromatogram (B) using 8 M HCl on same. Dashed line at 10 mL indicates the beginning of an applied strip solution of EDTA.

Figure 21:
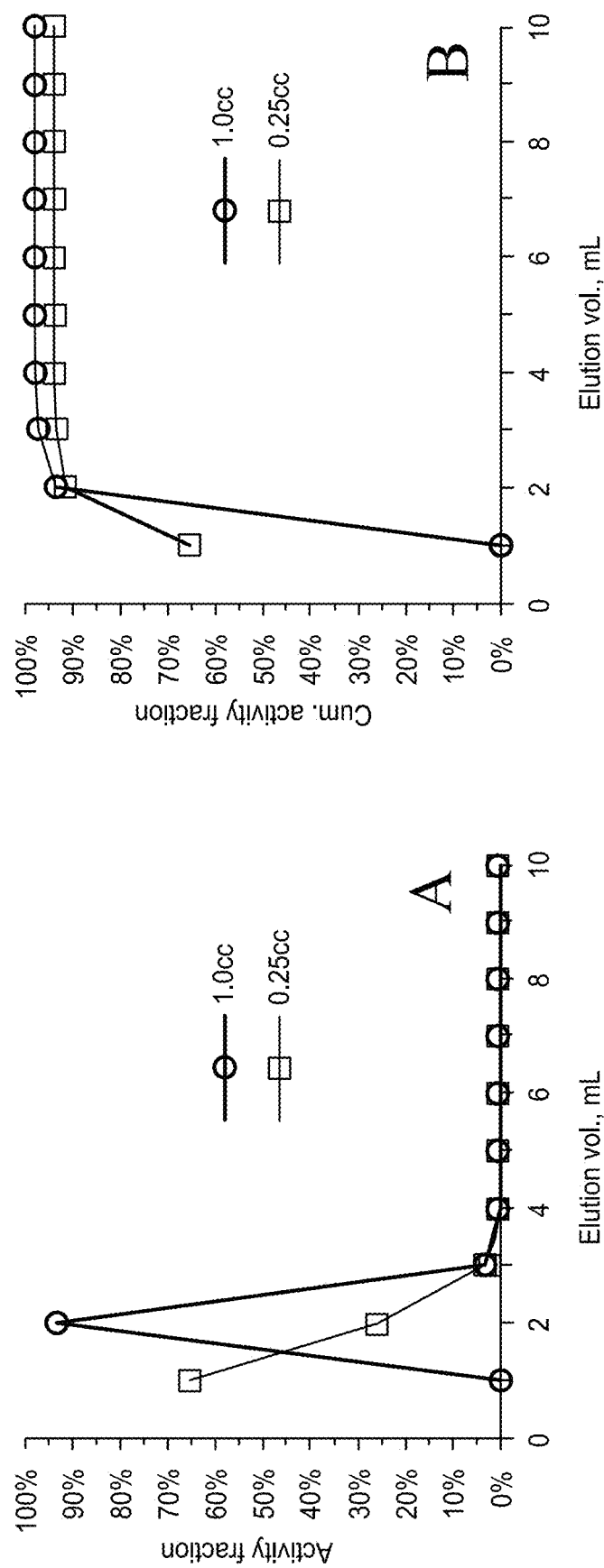

FIG. 21 depicts (A) $^{228}$Th activity fractions as a function of 1 M HCl elution volume from TEVA resins of different column internal volumes. (B) Cumulative $^{228}$Th activity yield for same.

Figure 22:
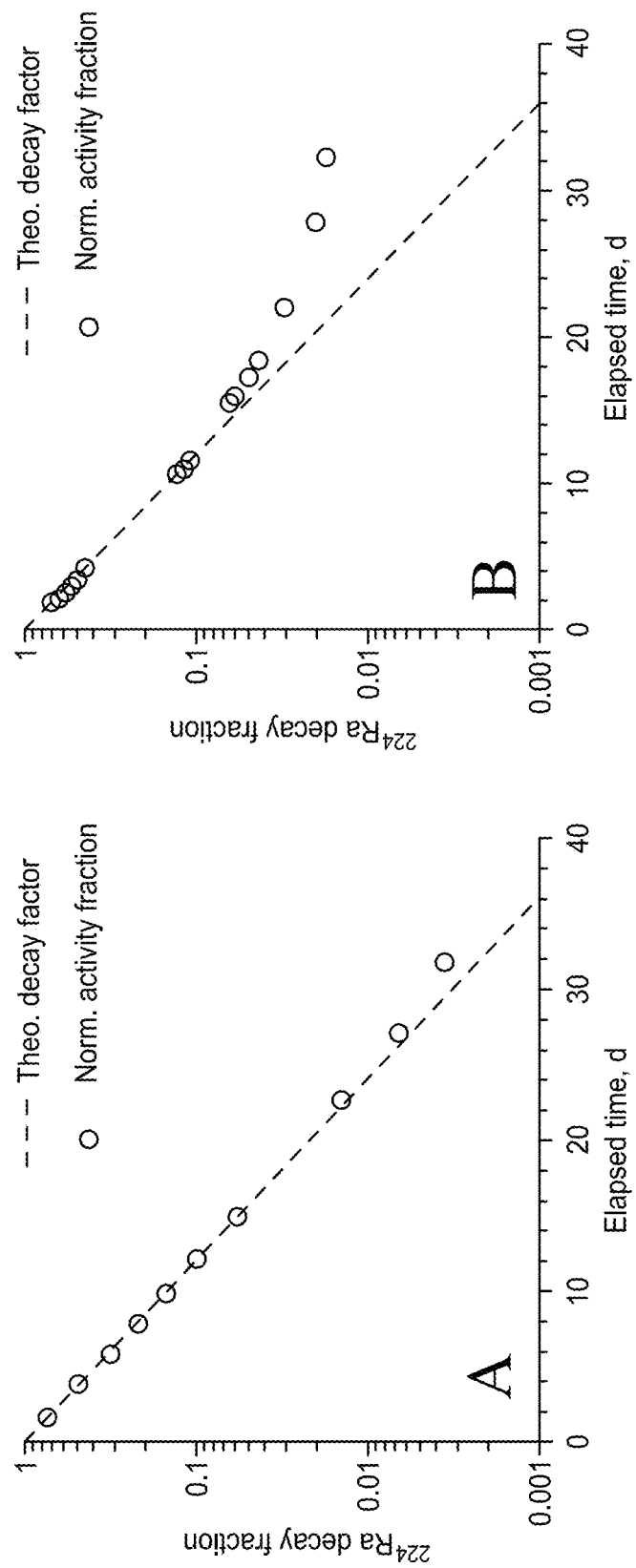

FIG. 22 depicts observed activity decay rate of TEVA resin load fraction (combined loads) for a 1 cc (A) vs. 0.25 cc (B) vessel volume. Dashed line is the theoretical decay rate for $^{224}$Ra. Positive deviation from the $^{224}$Ra curve indicates the presence of $^{228}$Th as TEVA resin column breakthrough.

Figure 23:
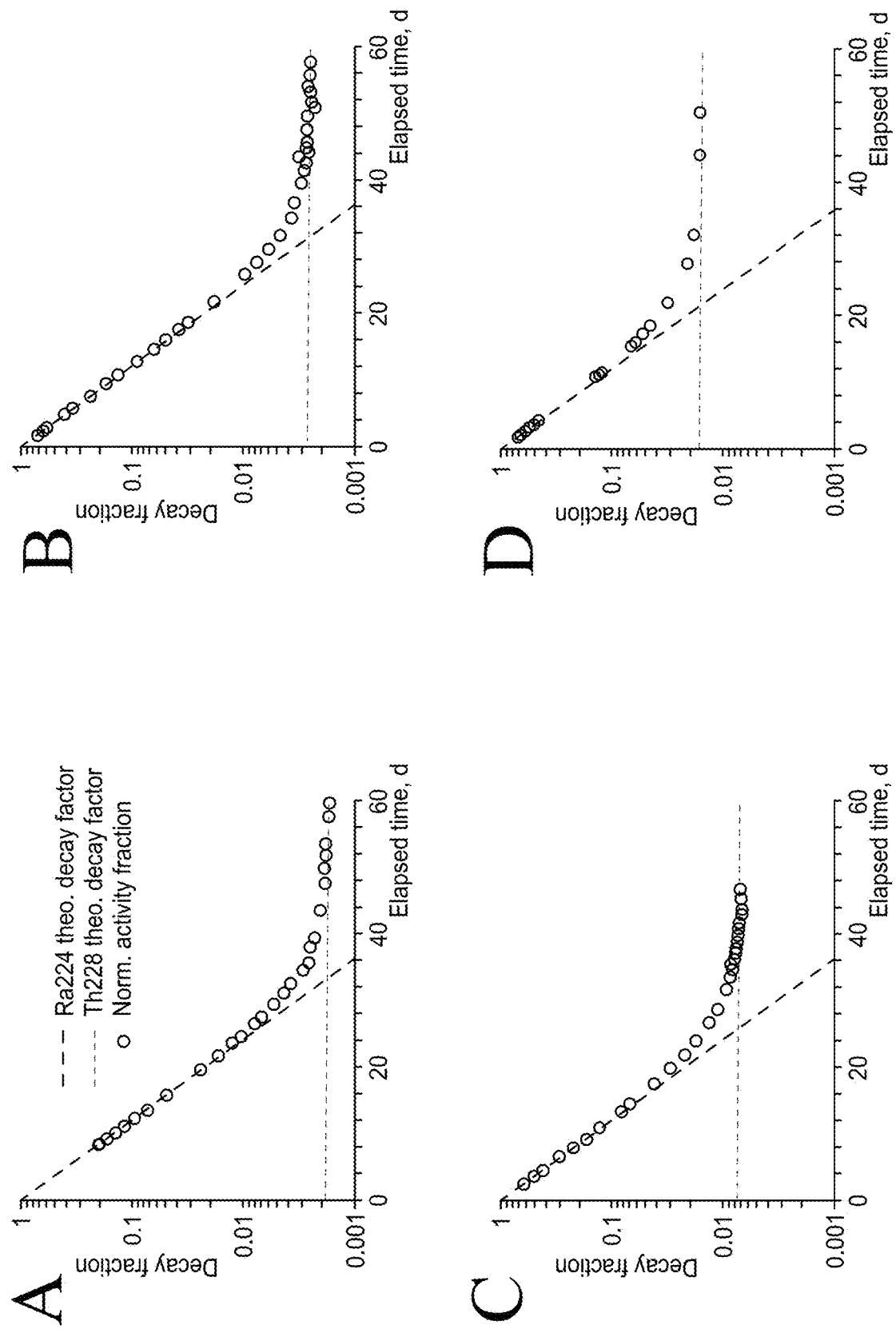

FIG. 23 depicts observed activity decay rate of TEVA cartridge $^{228}$Th load fraction for a 2 cc (A), a 1 cc (B), 0.4 cc HML (half-milliliter)(C), and 0.2 cc QML (quarter milliliter) cartridge (D). Black and grey dashed lines are the theoretical decay rate curves for $^{224}$Ra and $^{228}$Th, respectively. Positive deviation from the $^{224}$Ra curve indicates the presence of $^{228}$Th.

Figure 24:
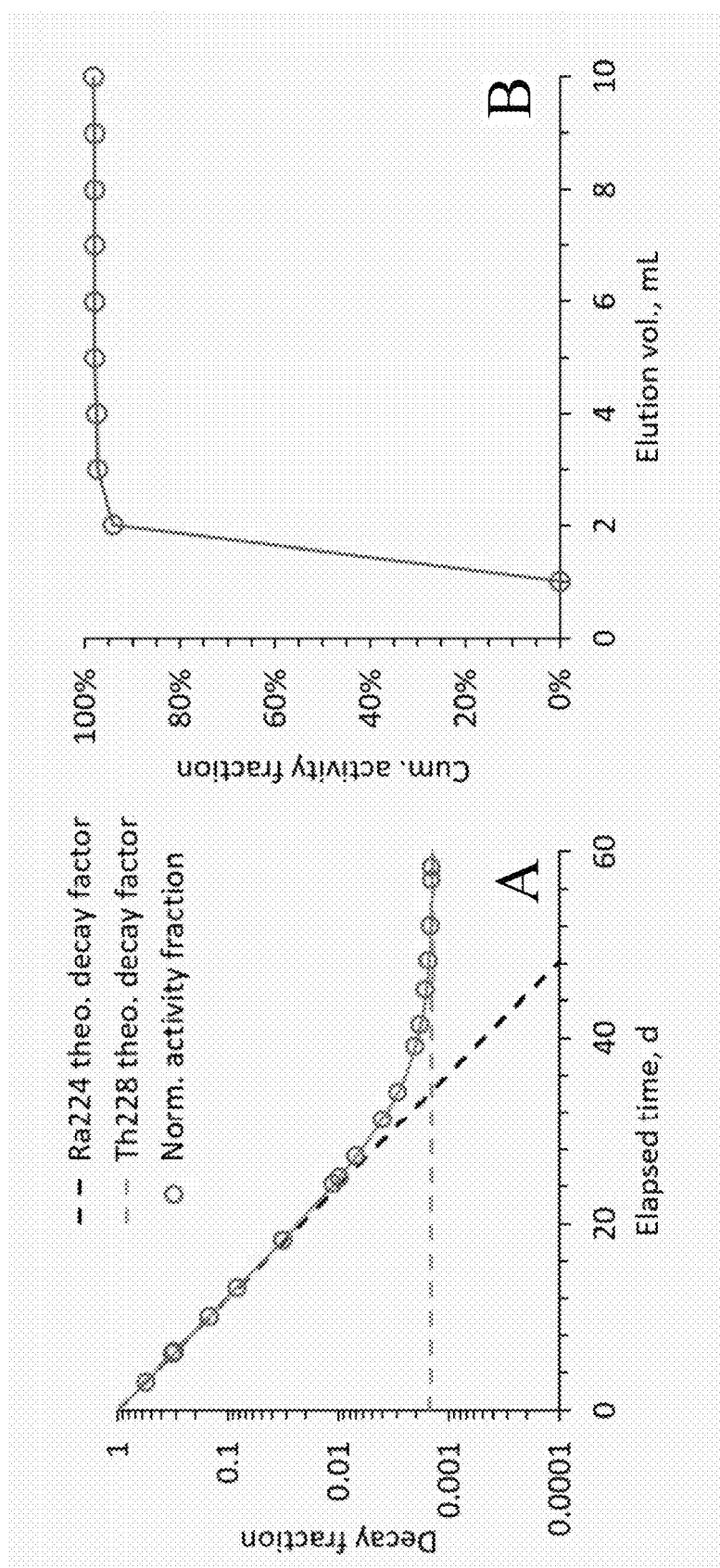

FIG. 24 (A) depicts observed activity decay rate of TEVA column $^{228}$Th load fraction for a 1 cc hand-packed TEVA resin solid phase extraction (SPE) tube column. (B) depicts cumulative $^{228}$Th activity fractions as a function of 1 M HCl elution volume from same.

Figure 25:
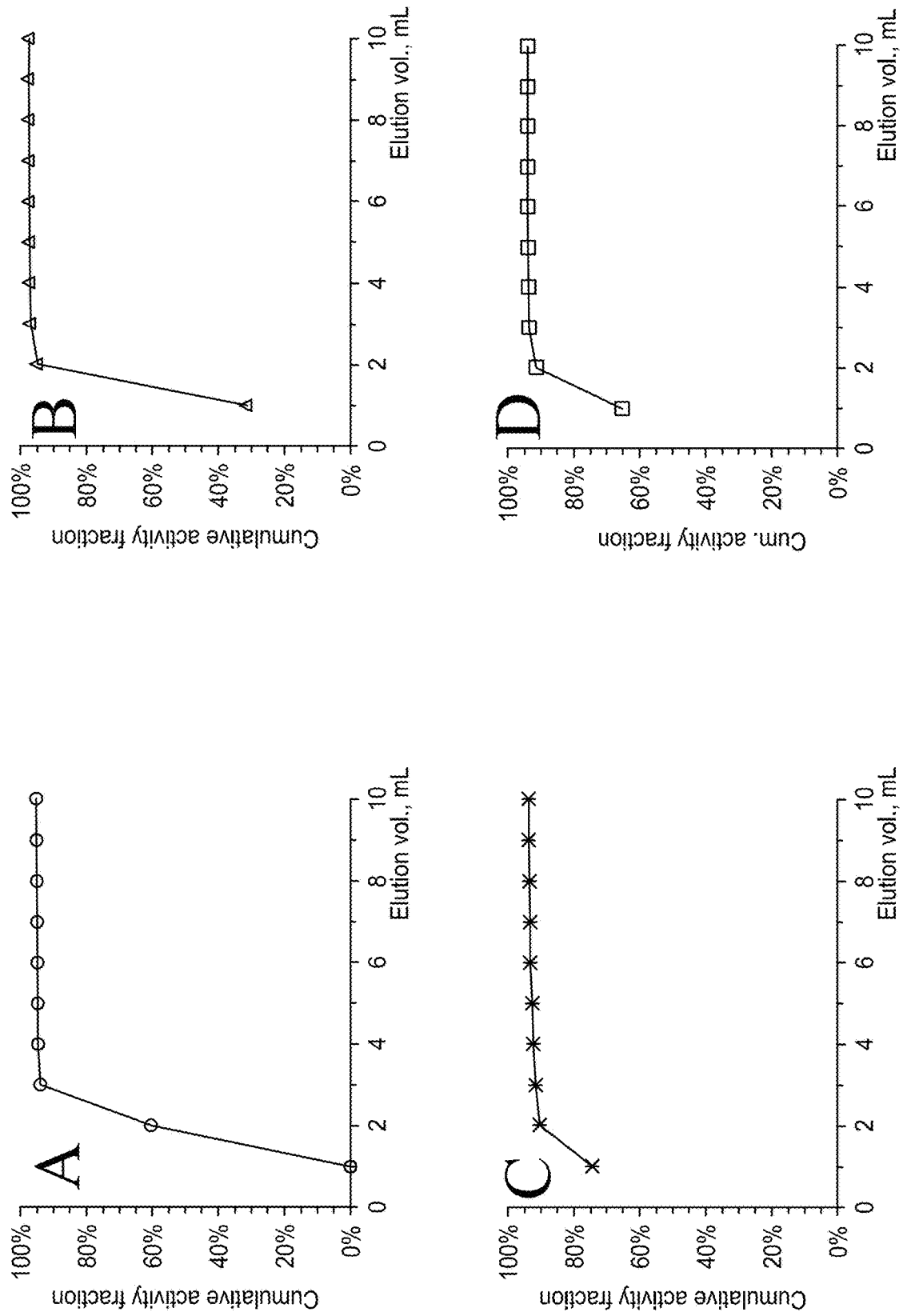

FIG. 25 depicts cumulative $^{228}$Th activity fractions as a function of 1 M HCl elution volume from machine-packed TEVA resin cartridges of decreasing internal resin volume. Cartridge are (A) 2 cc, (B) 1 cc, (C) HML, and (D) QML.

Figure 26:
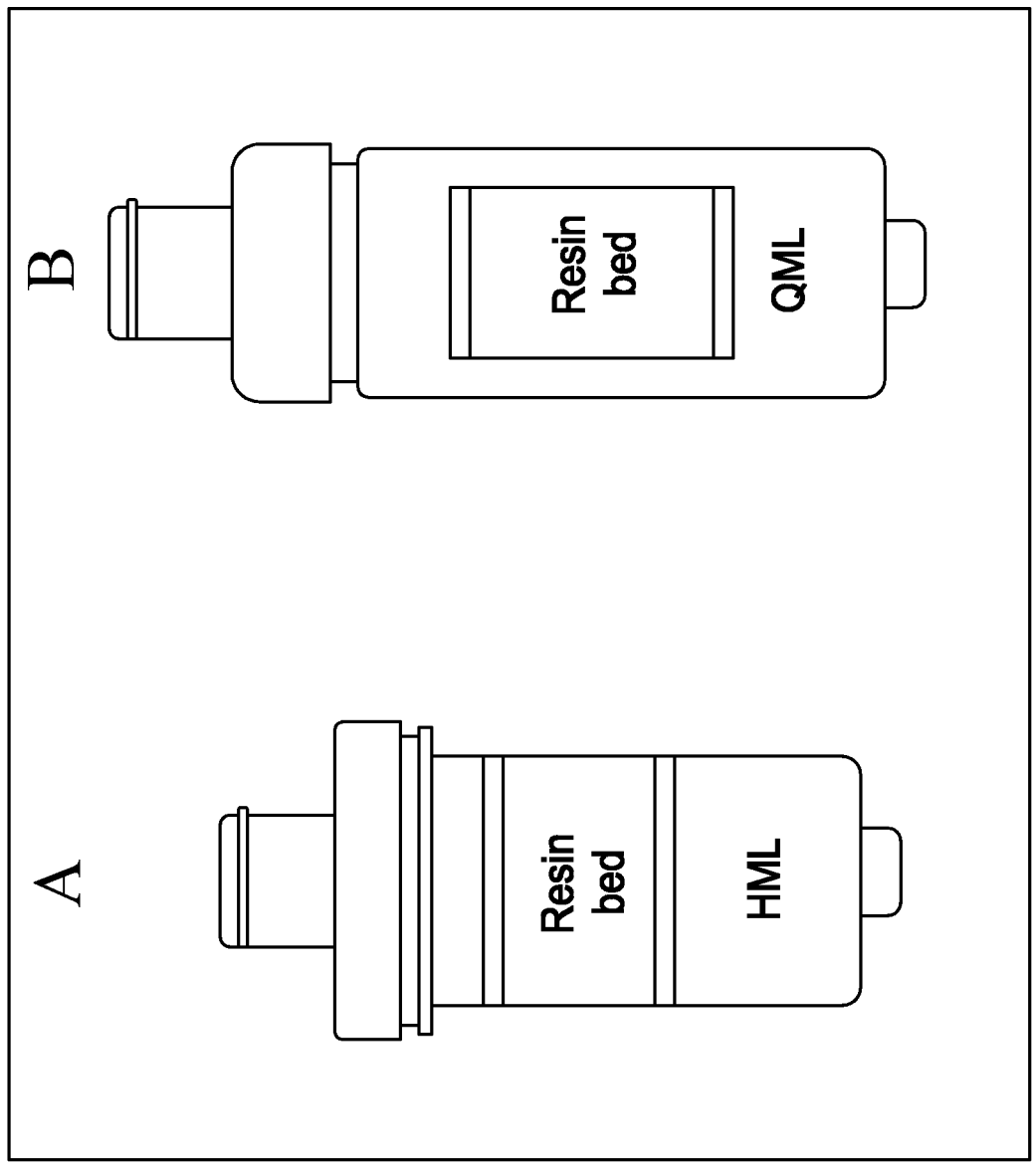

FIG. 26 is HML (0.41 cc) and QML (0.25 cc) cartridges that were evaluated for $^{212}$Pb removal in the C2 position.

Figure 27:
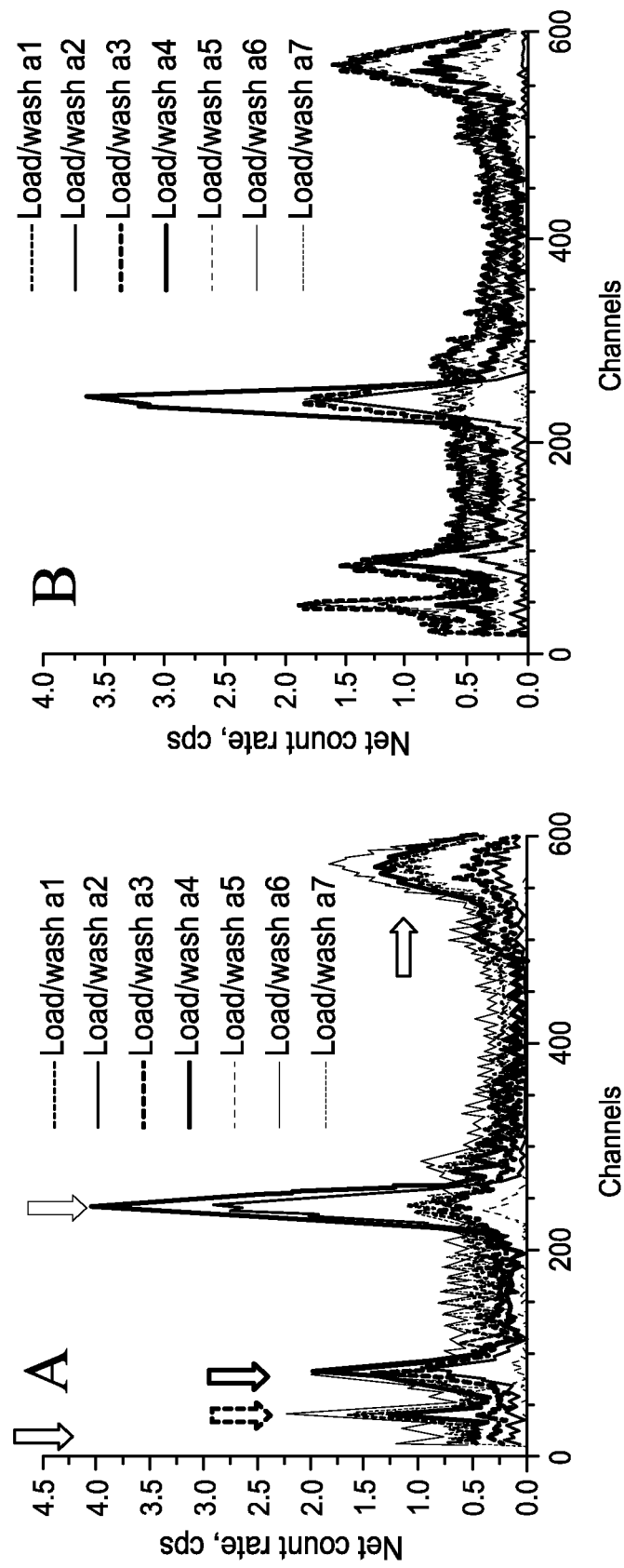

FIG. 27 is gamma spectra of $^{228}$Th/$^{224}$Ra solution effluent fractions from C1+C2 during the load+wash "a" steps in 6 M HNO$_3$. C2 volume was varied between 0.41 cc (A) and 0.25 cc (B) of Sr Resin bed. Colored arrows indicate radionuclides observable in the fractions: blue=$^{228}$Th (absent); grey=$^{212}$Bi; yellow=$^{212}$Pb; green=$^{224}$Ra; orange=$^{208}$Tl.

Figure 27C:
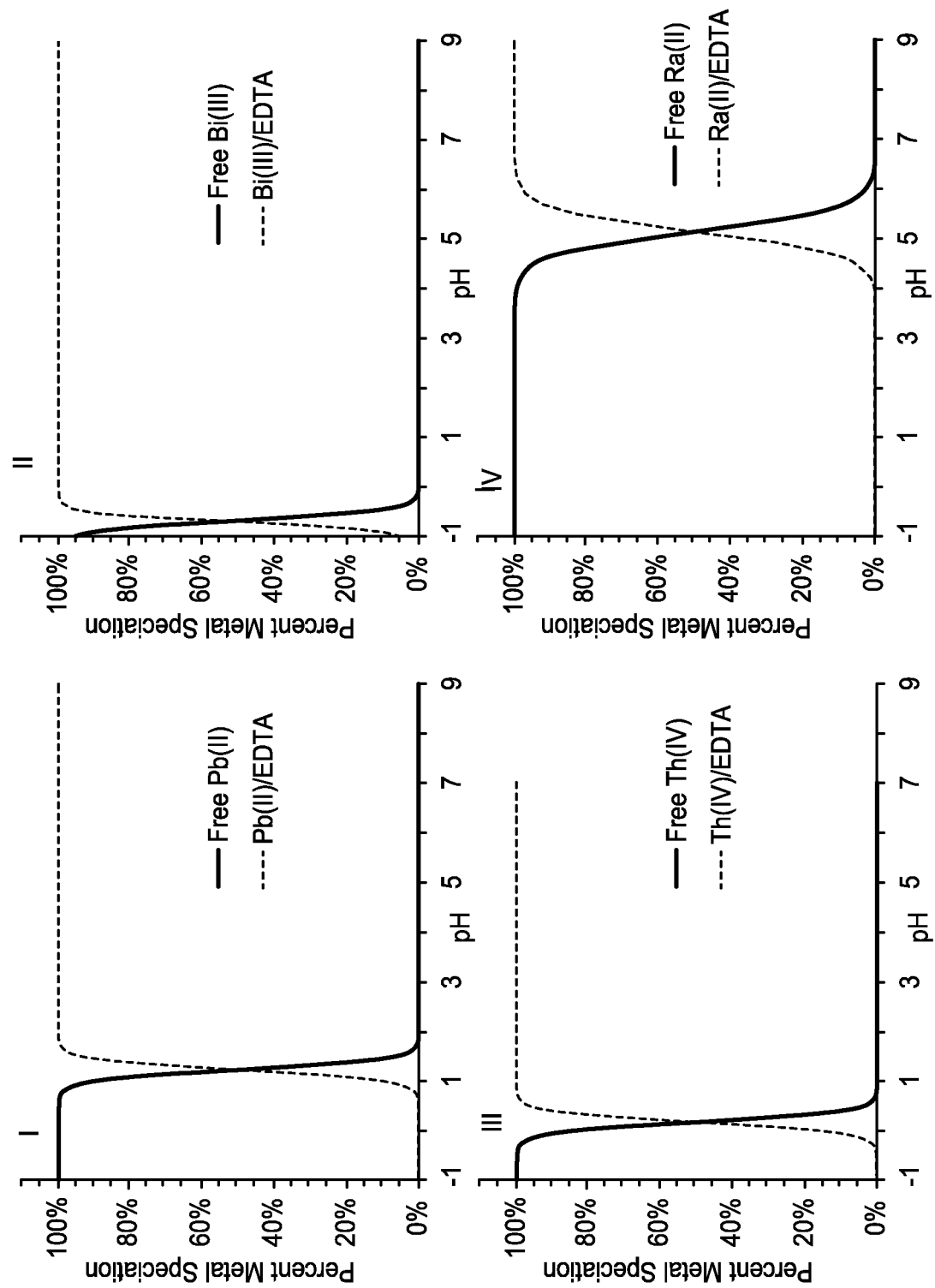
Figure 27D:
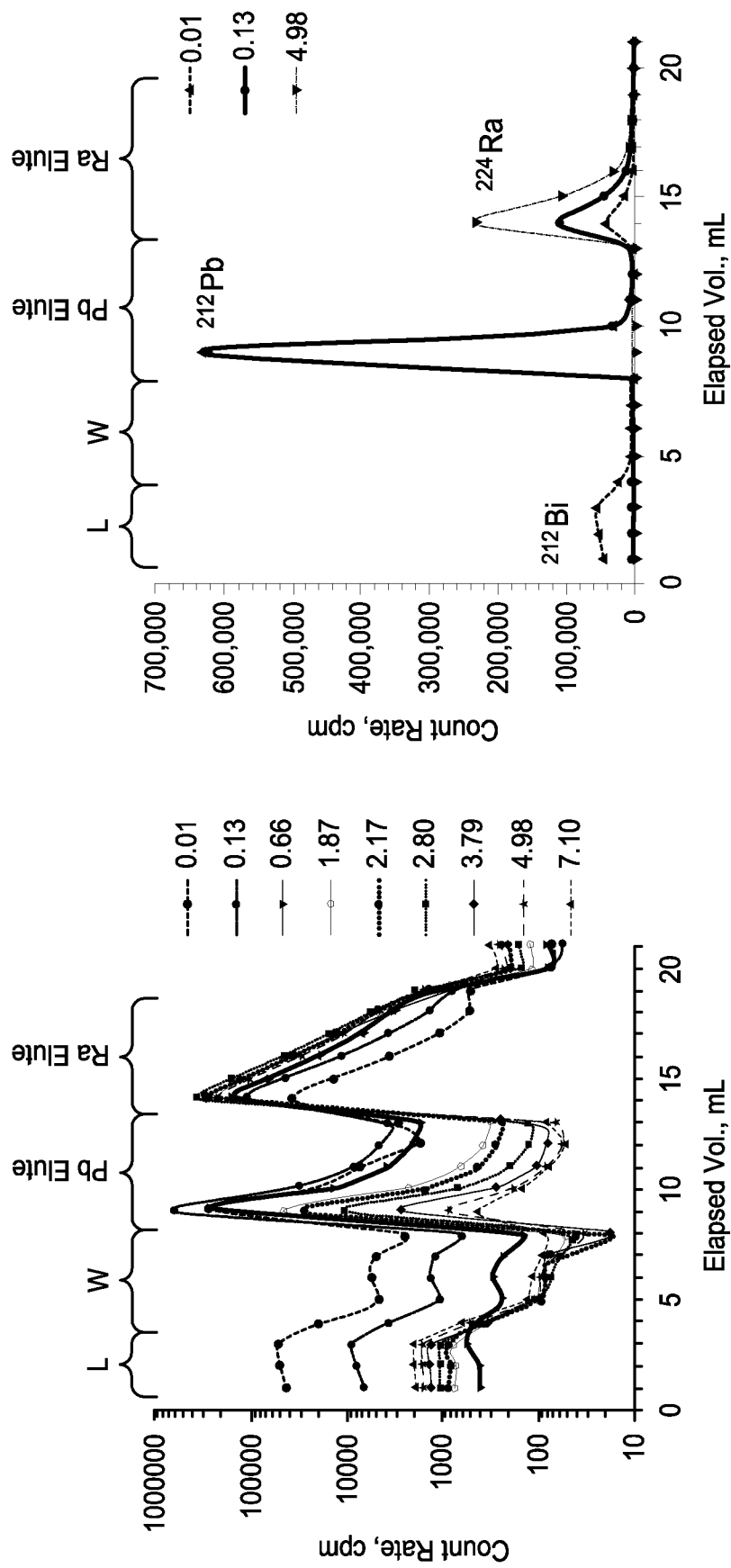

FIG. 27C depicts metals speciation comparison i) Pb/Pb-EDTA; ii) Bi/Bi-EDTA; iii) Th/Th-EDTA; and iv) Ra/Ra-EDTA along the same pH spectrum.

FIG. 27 D i and ii, depicts separation of $^{224}$Ra from $^{212}$Bi and $^{212}$Pb using Ra-01 resin column (3×50 mm) via protocol listed in Table 6B. Column effluent fraction categories are designated at top. Legend is elapsed days between column run and gamma analysis of fractions. (Right) Select elapsed time series indicates radionuclides present across the separation protocol.

Figure 28:
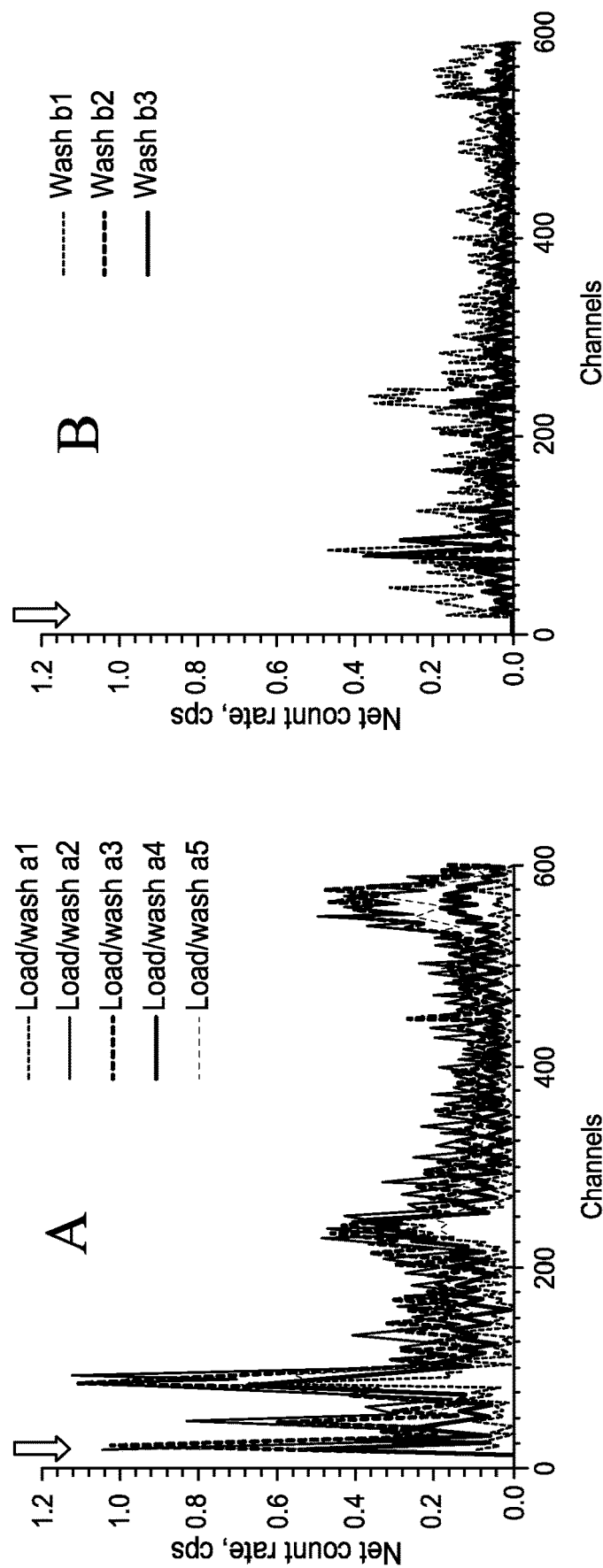

FIG. 28 depicts (A) load+wash "a" effluent fractions from a 0.25 cc Ra-01 resin showing the elution of $^{228}$Th (arrow), some $^{212}$Pb, and $^{212}$Bi/$^{208}$Tl. (B) effluent fractions from wash "b" showing no observable $^{228}$Th X-rays (arrow). $^{212}$Bi/$^{208}$Tl are observed to wash from the media.

Figure 29:
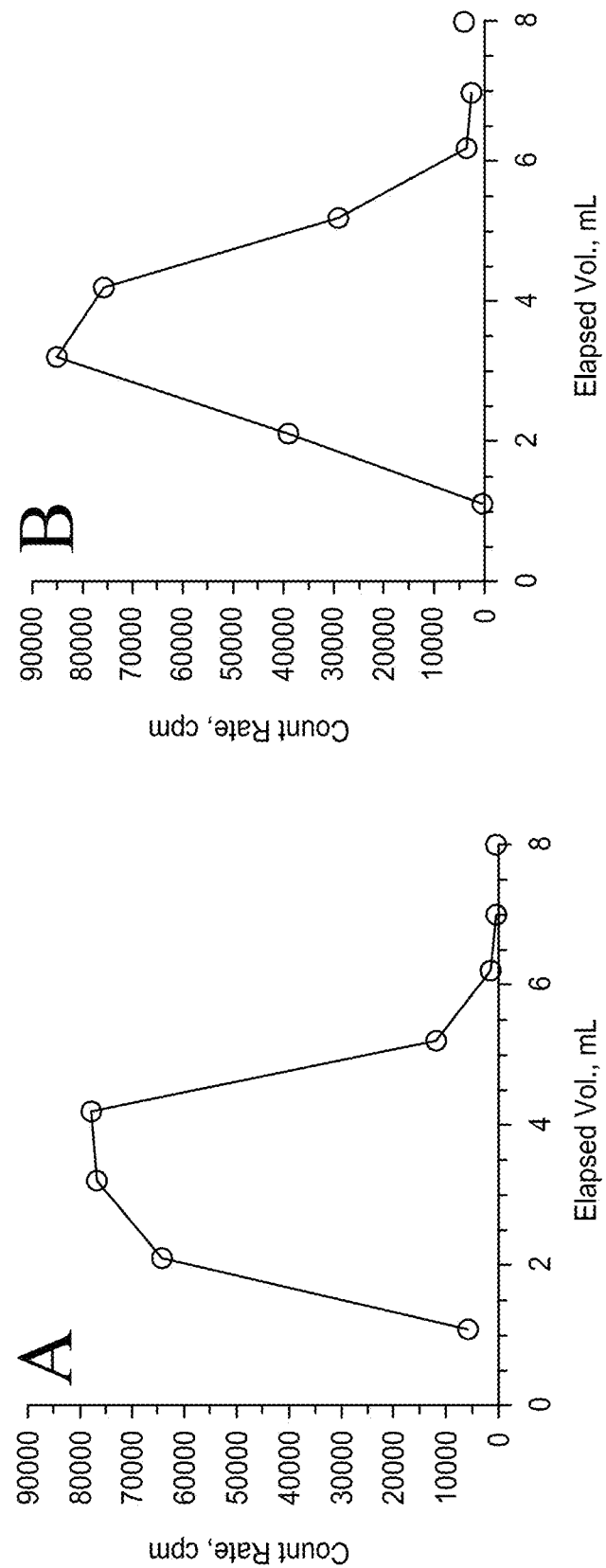

FIG. 29 is Load/wash "a" column effluent fractions showing $^{224}$Ra elution profile through C1+C2, wherein C2 is a (A) HML cartridge or a (B) QML cartridge packed with Sr Resin.

Figure 30:
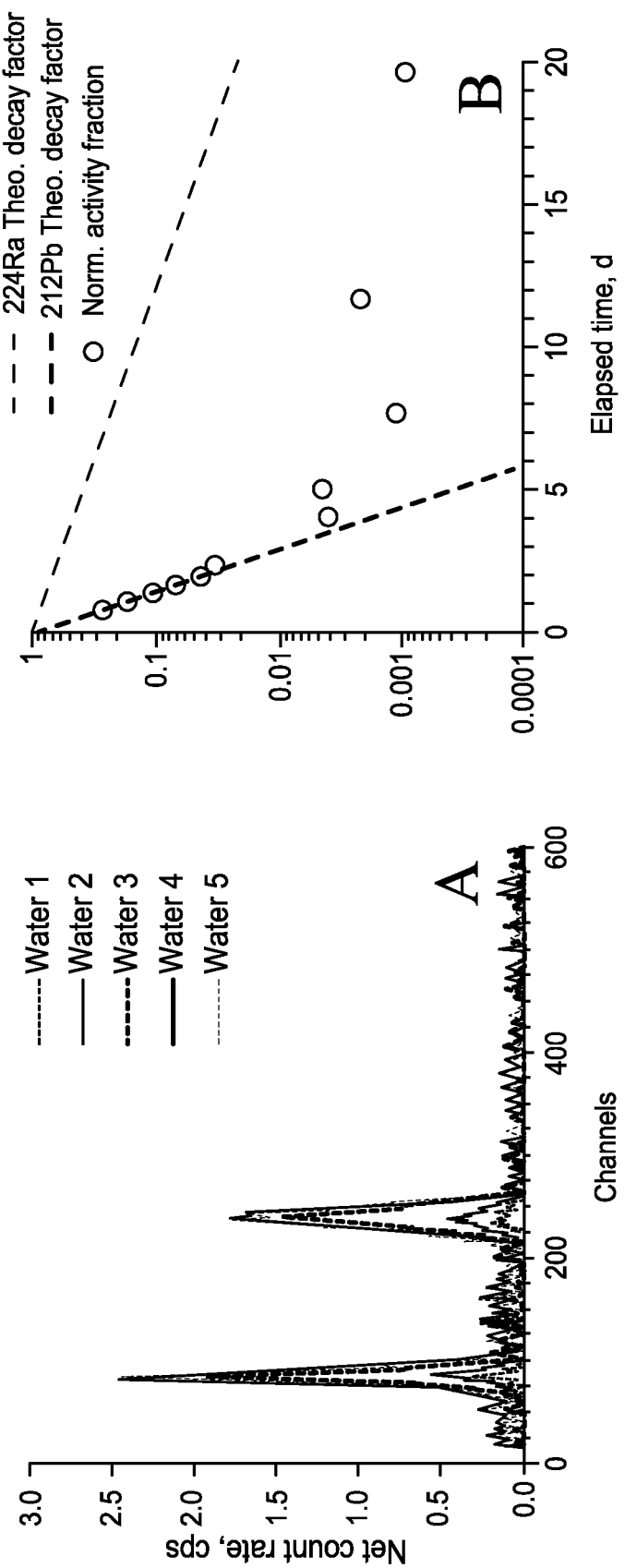

FIG. 30 depicts water wash fractions from the C3 step 3 that was inserted before the $^{224}$Ra elution step. (A) gamma spectra of C3 effluent fractions collected during water wash show $^{212}$Pb removal. (B) the activity decay rate observed from water wash effluents; it matches the decay rate of $^{212}$Pb. Data indicates that $^{224}$Ra remains adsorbed to the media during water wash.

Figure 31:
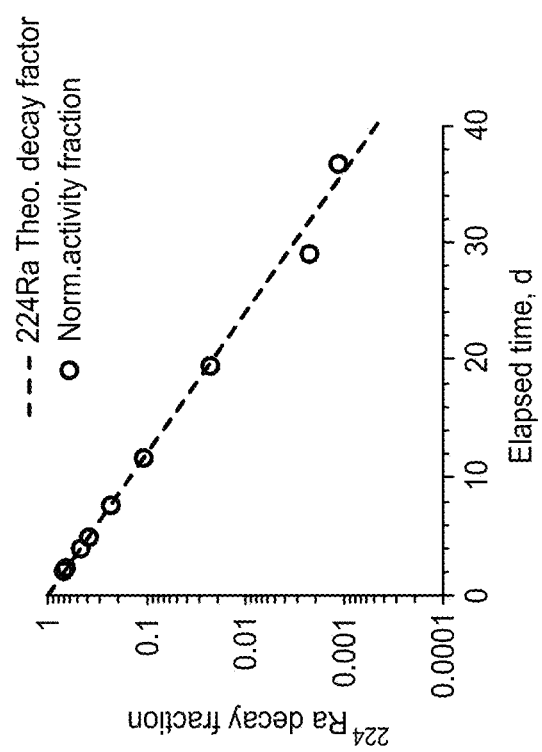

FIG. 31 depicts observed activity decay rate of the primary $^{224}$Ra elution fraction from a Ra-01 resin column (C3) loaded with a $^{228}$Th/$^{224}$Ra solution. Dashed line is the theoretical $^{224}$Ra decay rate.

Figure 32:
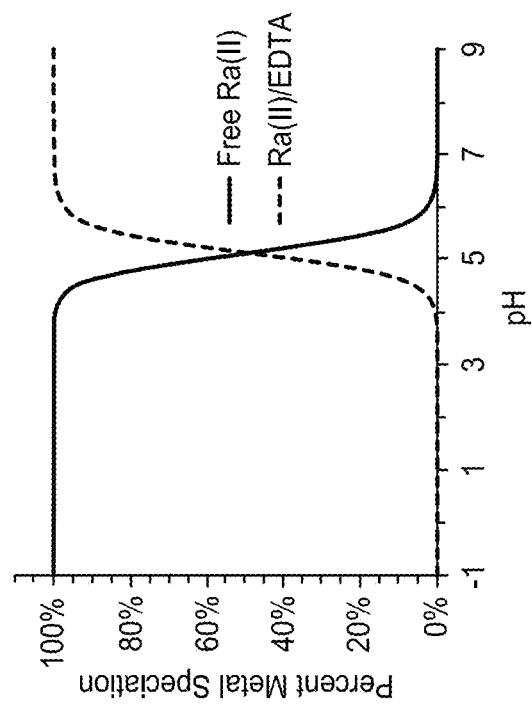

FIG. 32 is a speciation diagram for Ra(II) and Ra(II)/EDTA complex in 0.05 M EDTA across a range of pH.

Figure 33:
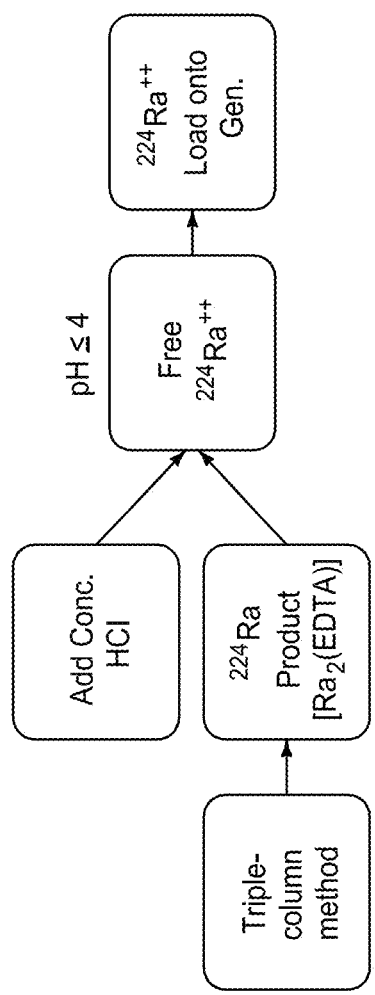

FIG. 33 is a schematic showing the process for loading the $^{224}$Ra from the triple-column method onto a CatIX-based generator column. The purified $^{224}$Ra/EDTA product solution can be acidified by adding a small volume of concentrated acid such as HNO$_3$ or HCl to achieve a pH of <=4, which can free or dissociate the $^{224}$Ra from the $^{224}$Ra/EDTA complex. The acidified $^{224}$Ra$^{2+}$ solution may then be incorporated into a storage/generator vessel assembly.

Figure 34:
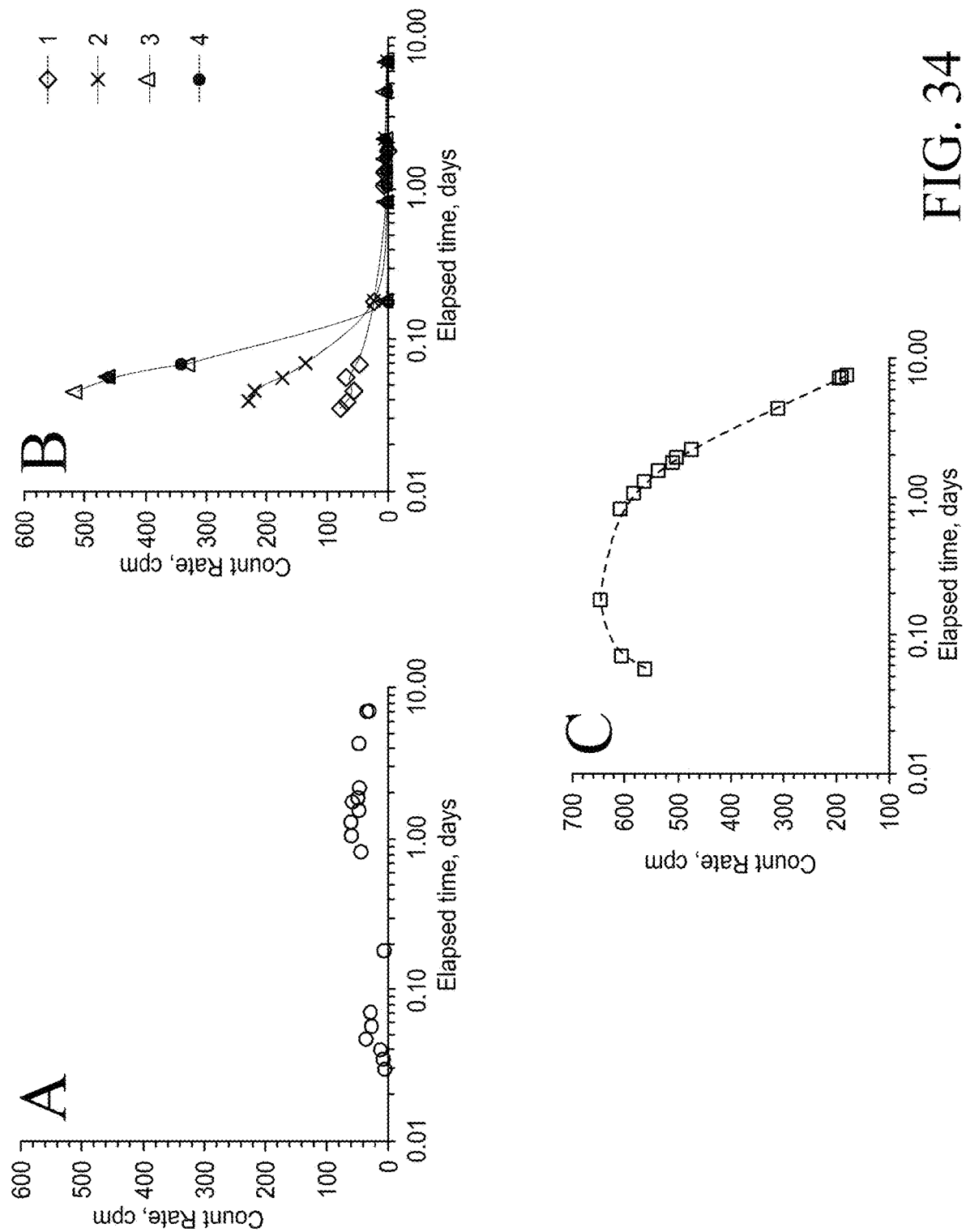

FIG. 34 depicts data acquired upon loading the HCl-acidified, EDTA-dissociated $^{224}$Ra$^{2+}$ product onto a strong cation exchange media. $^{224}$Ra load fraction (A) and wash fractions (B) plotted vs. elapsed time. Legend indicates the collected fractions (1 mL each) of wash solution delivered through the vessel containing the media. The decay rates indicate that all $^{224}$Ra can be adsorbed onto the media during load/wash steps. (C) Direct counts of the $^{224}$Ra-loaded cation exchange media vs. elapsed time indicates the decay rate of $^{224}$Ra beyond the ~1.6 day period wherein progeny equilibrium first occurs.

Figure 35:
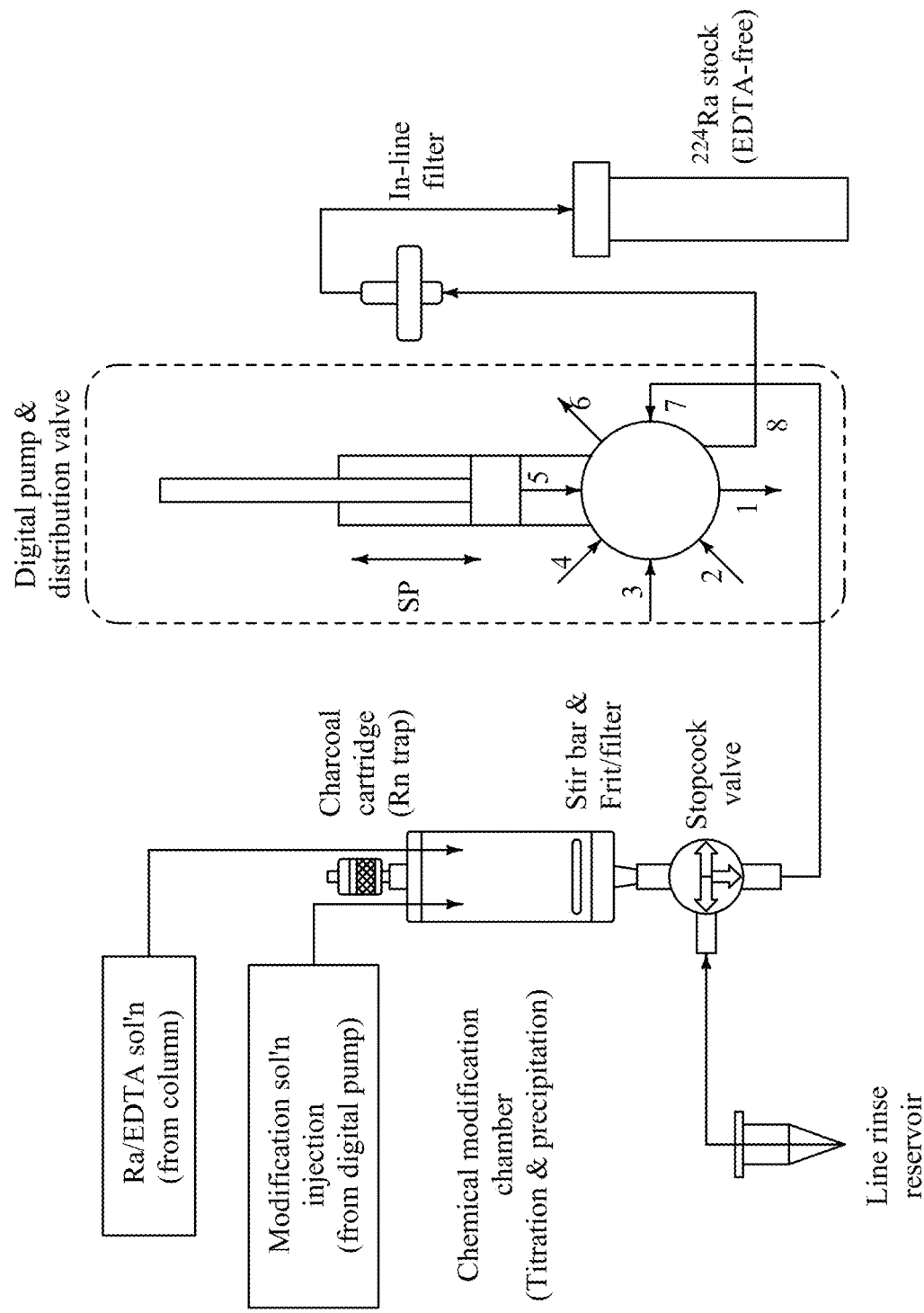

FIG. 35 is a schematic of a system for producing free isotope according to an embodiment of the disclosure.

Figure 36:
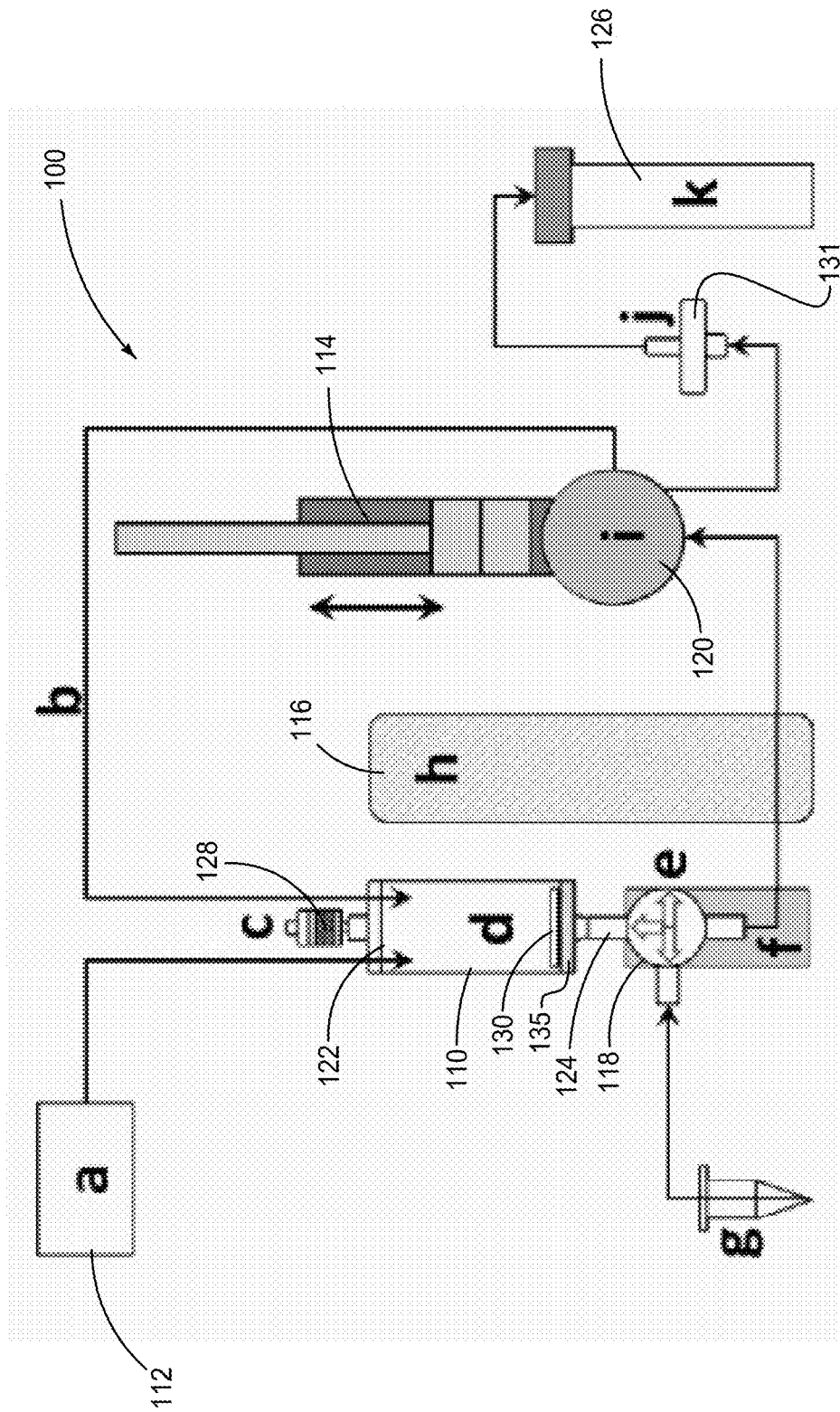

FIG. 36 is a schematic of a system for producing free isotope according to another embodiment of the disclosure. a) $^{224}$Ra bound element elution line from element isolation system; b) acid dispensing line; c) activated charcoal $^{220}$Rn trap; d) 5 mL Rezorian™ column w/ Spin plus® PTFE stir bar & hydrophobic Polyethylene (PE) frit; e) three way stopcock valve; f) servo motor (SvM); g) rinse vessel for line; h) vertical magnetic stirrer; i) inverted digital syringe pump (SP) w/8 port distribution valve; j) 0.45 pm polyethersulfone (PES) filter; and k) $^{224}$Ra collection vessel.

Figure 37:
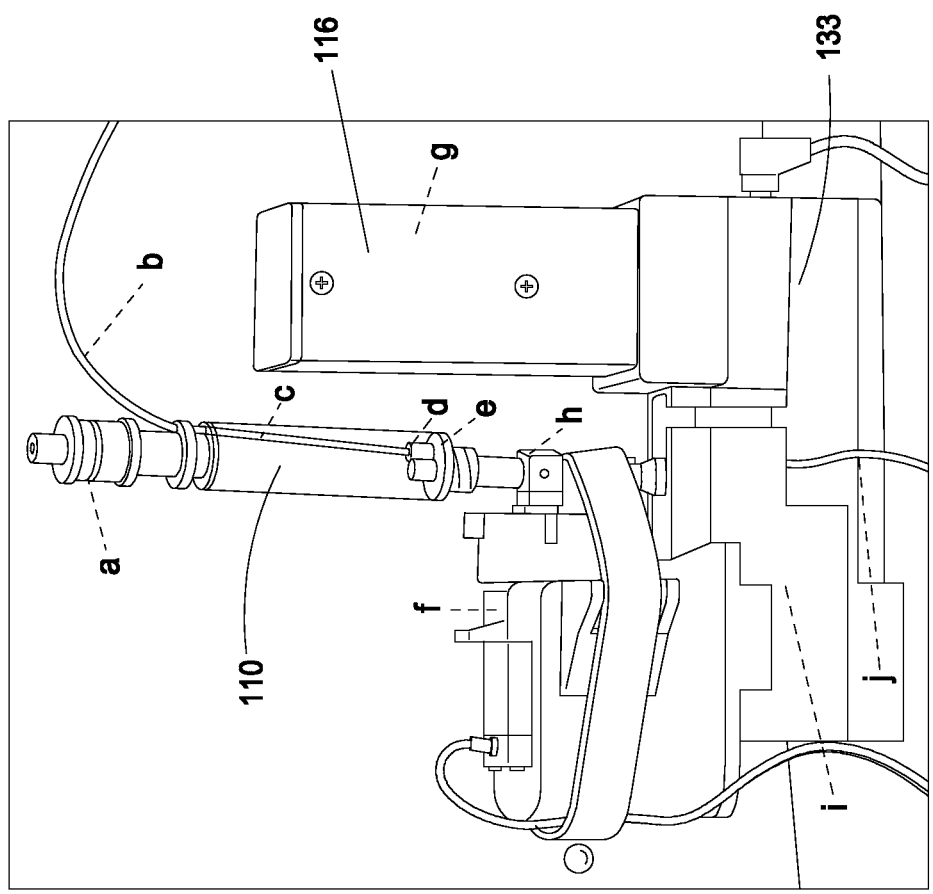

FIG. 37 is an image of a portion of the system of FIG. 36 configured as an EDTA precipitation/filtration device. a) activated charcoal $^{220}$Rn trap; b) acid dispensing line from inverted digital SP; c) 5 mL Rezorian™ column; d) Spin-plus® PTFE stir bar; e) hydrophobic PE frit; f) assembled servo motor with attached servo horn (SvM); g) vertical magnetic stirrer; h) three-way stopcock valve; i) 3D printed device mount; and j) line out to inverted digital SP.

Figure 38:
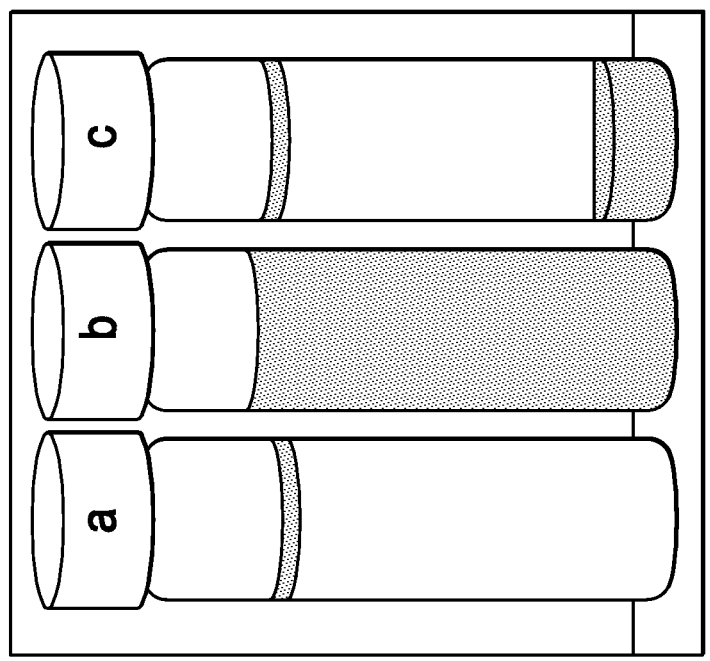

FIG. 38 is an image of pre acidified $^{224}$Ra-EDTA (a), acidified & agitated $^{224}$Ra-EDTA (b), and post acidified & agitated $^{224}$Ra-EDTA solution (c).

Figure 39:
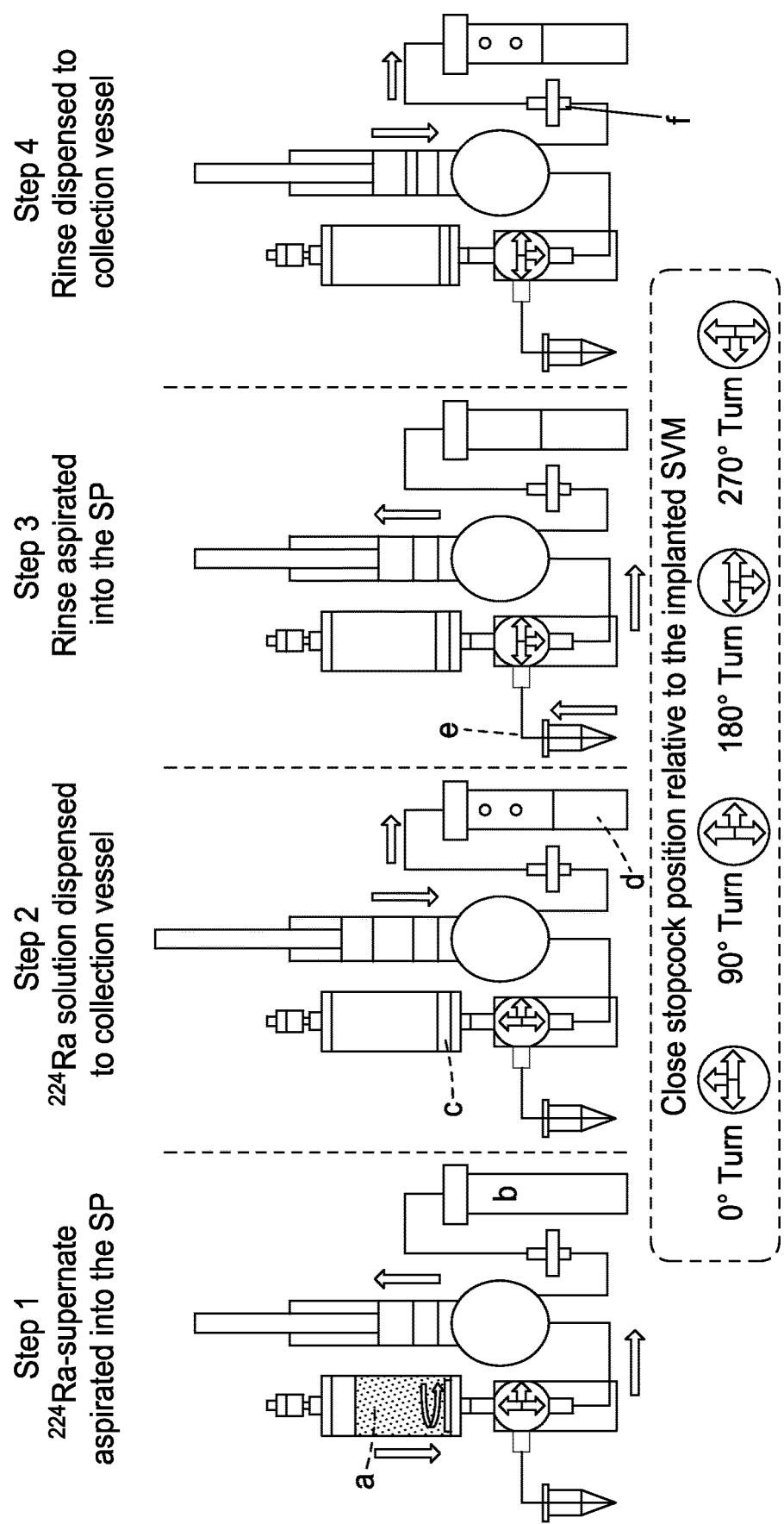

FIG. 39 is an image of a sequence of configurations of a system for producing free isotope according to an embodiment of the disclosure. (a) acidified & agitated $^{224}$Ra-EDTA solution mixing, precipitation, and filtration vessel; (b) $^{224}$Ra collection vessel; (c) filtered EDTA precipitate; (d) free $^{224}$Ra solution; (e) line rinsate reservoir; and (f) in-line membrane filter.

Figure 40:
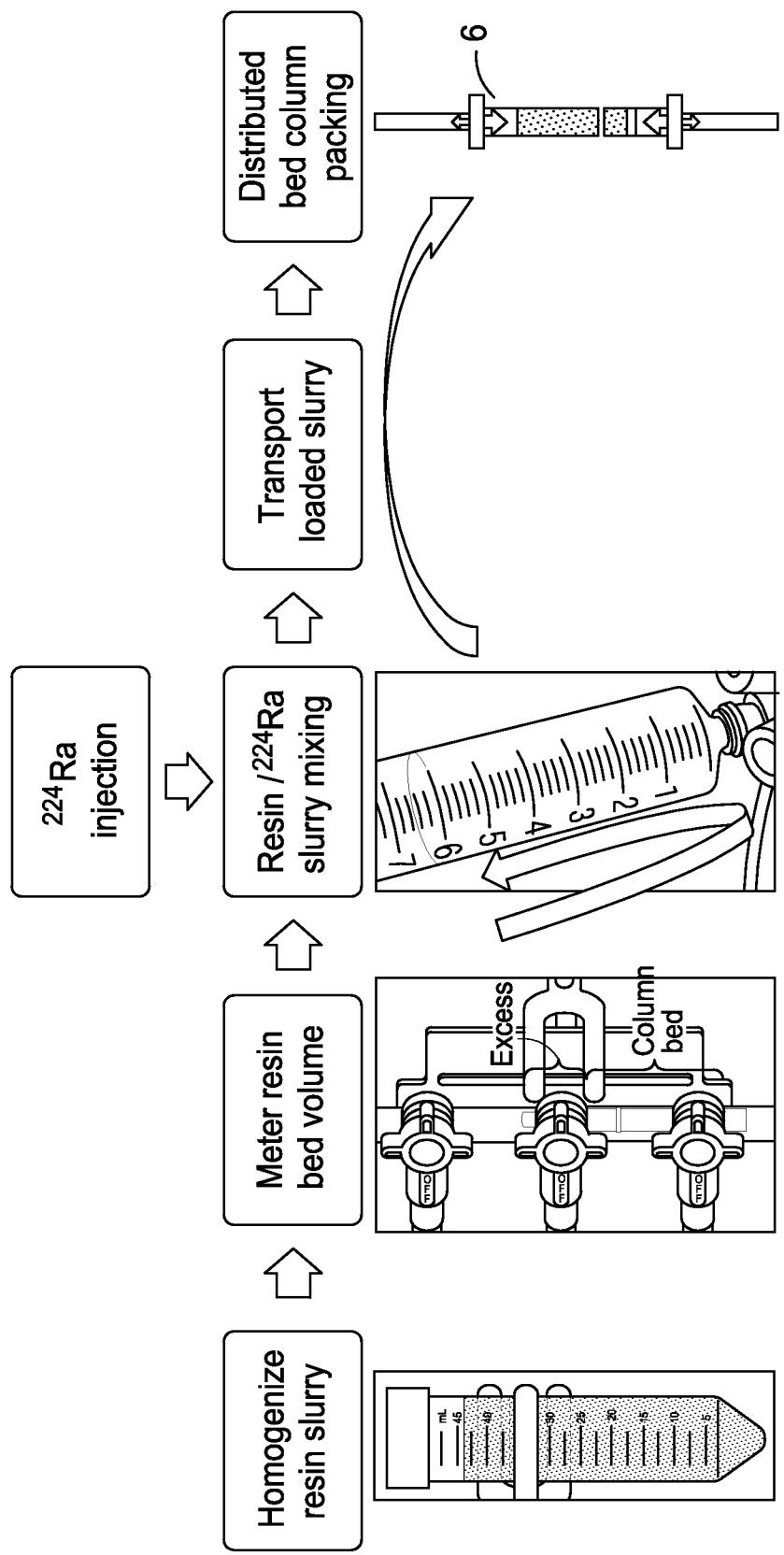

FIG. 40 is an overall schematic for preparing a storage/generation vessel assembly according to an embodiment of the disclosure.

Figure 41:
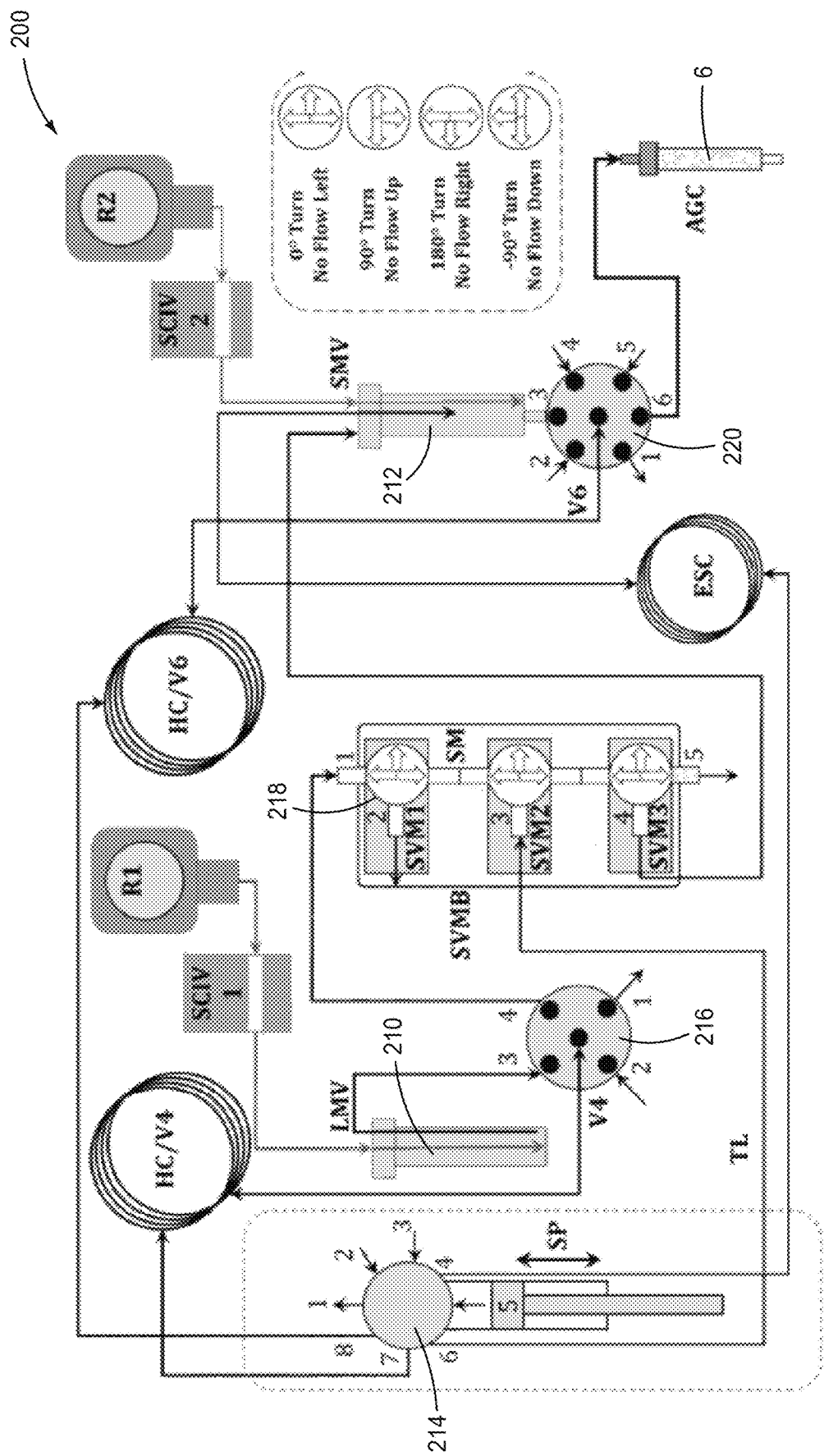

FIG. 41 is a system for producing a metal storage/generation vessel assembly according to an embodiment of the disclosure. Syringe pump w/8-port distribution valve (SP); 4-port and 6-port selector valves (V4 or V6); assembled generator column (AGC); holding coil to 4-port and 6-port valves (HC/V4 or HC/V6); excess supernatant coil (ESC); transport line (TL); large mixing vessel (LMV); small mixing vessel (SMV); 3 stopcock manifold (SM); servo motor block (SVMB) with three servo motors (SVM1, SVM2, and SVM3); solenoid-controlled isolation valves (SCIV1 and SCIV2); and N$_2$ gas regulators (R1 and R2).

Figure 42:
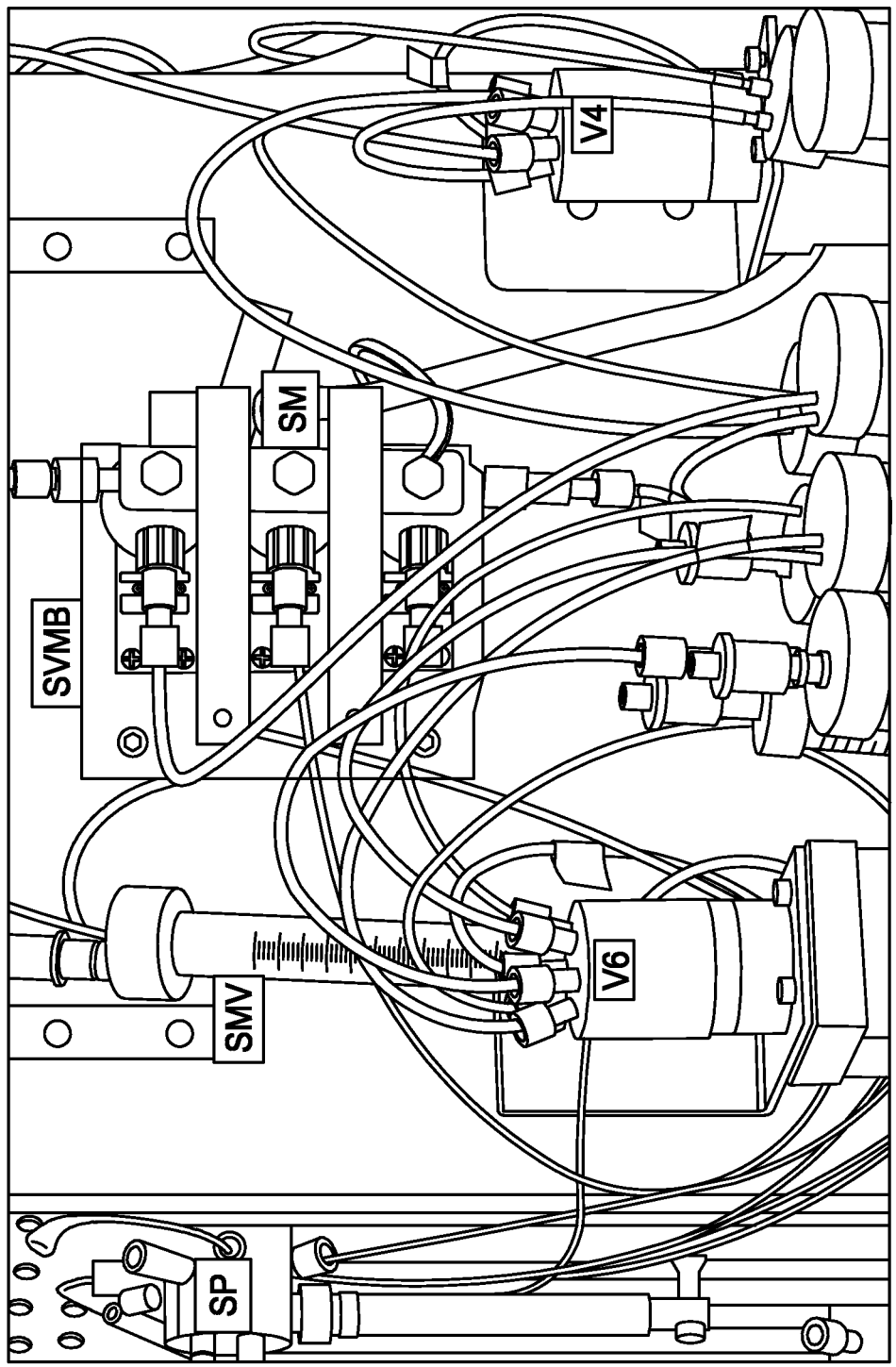

FIG. 42 is an image of a system for producing a metal storage/generation vessel assembly according to another embodiment of the disclosure. Labels are identified in FIG. 41.

Figure 43:
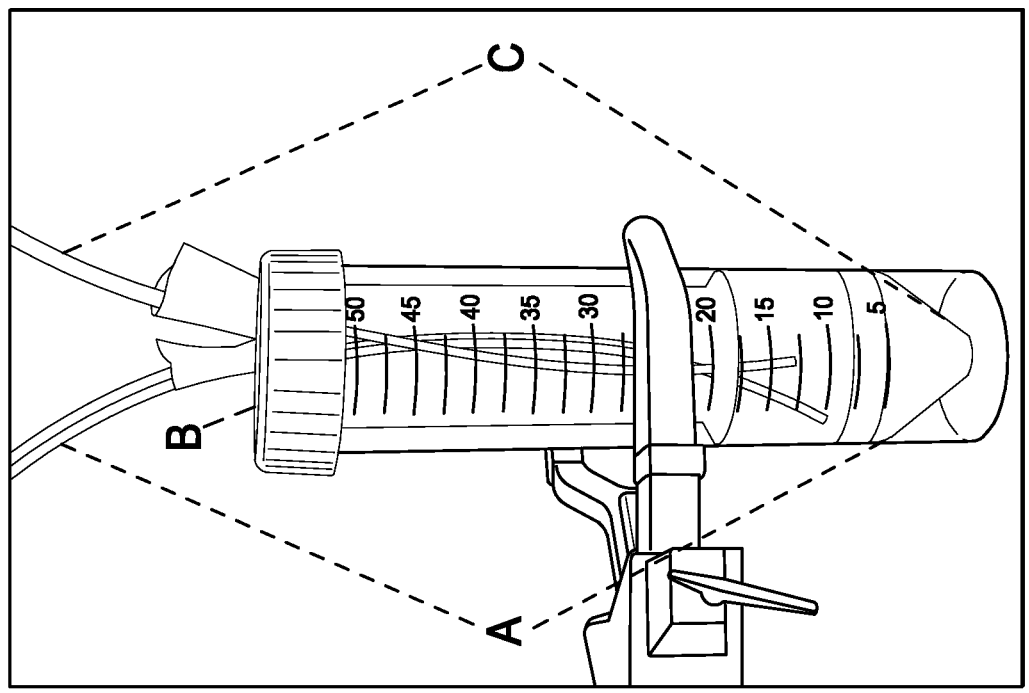

FIG. 43 is an image of a mixing vessel of the system of FIGS. 41 and 42 according to an embodiment of the disclosure (LMV) using $N_2$ gas agitation for mixing. A) Resin slurry aspiration line (outlet); B) $N_2$ gas vent (outlet) port; and C) $N_2$ gas (inlet) line. Five milliliters of settled resin bed in 20 mL deionized water (D1) can be seen in the vial.

Figure 44:
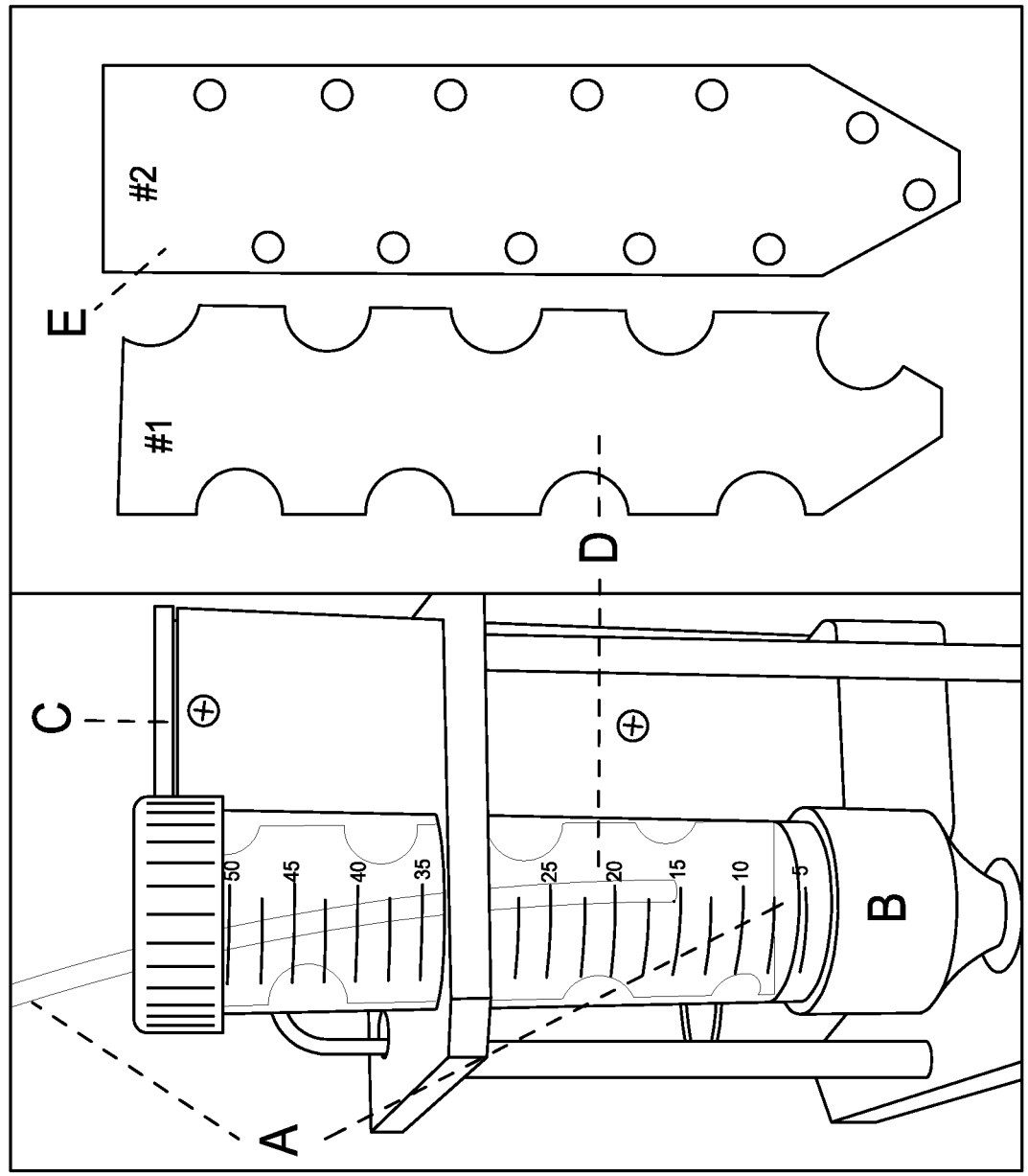

FIGS. 44A and 44B are images a mixing vessel and stirrers of the system of FIGS. 41 and 42 according to another embodiment of the disclosure (LMV), using the Multi-Stirrus mixer. A) Resin slurry aspiration line (outlet); B) rotating magnet base; C) vertical magnetic spinning device; D) fabricated vane #1 with alternating 7/16" diameter holes and edges; and E) fabricated vane #2 with alternating 3/16" diameter holes at 5/16" intervals.

Figure 45:
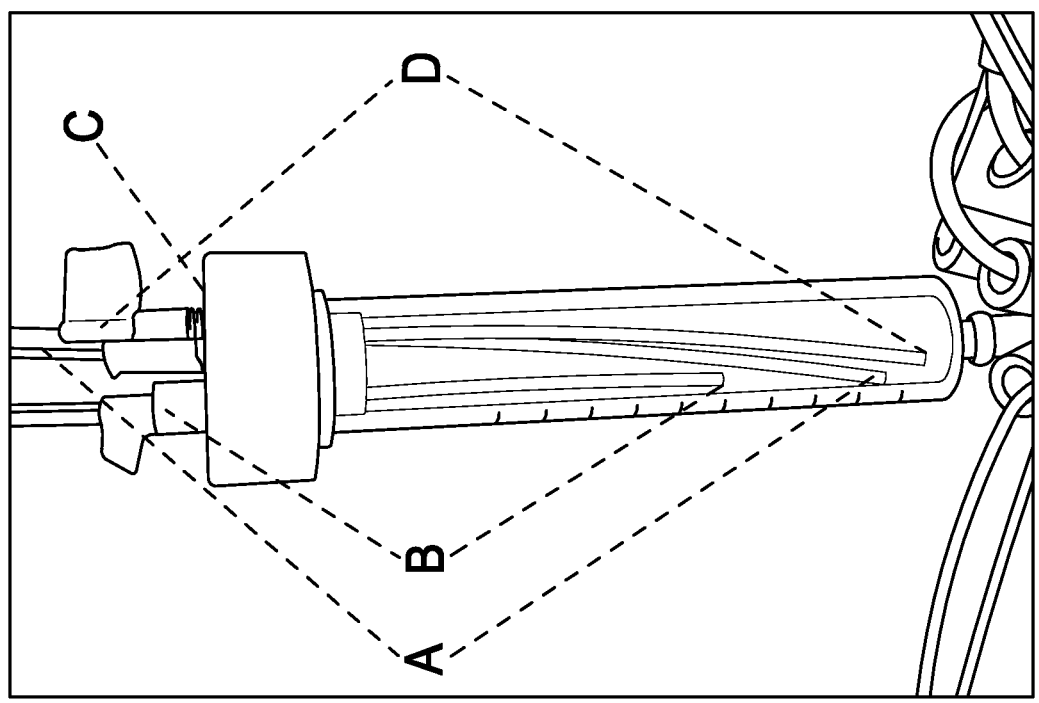

FIG. 45 is an image of another mixing vessel of the system of FIGS. 41 and 42 according to an embodiment of the disclosure (SMV). A) ESC (inlet/outlet) line; B) resin slurry dispenser (inlet) line; C) $N_2$ gas vent (outlet) port; and D) $N_2$ gas (inlet) line.

Figure 46:
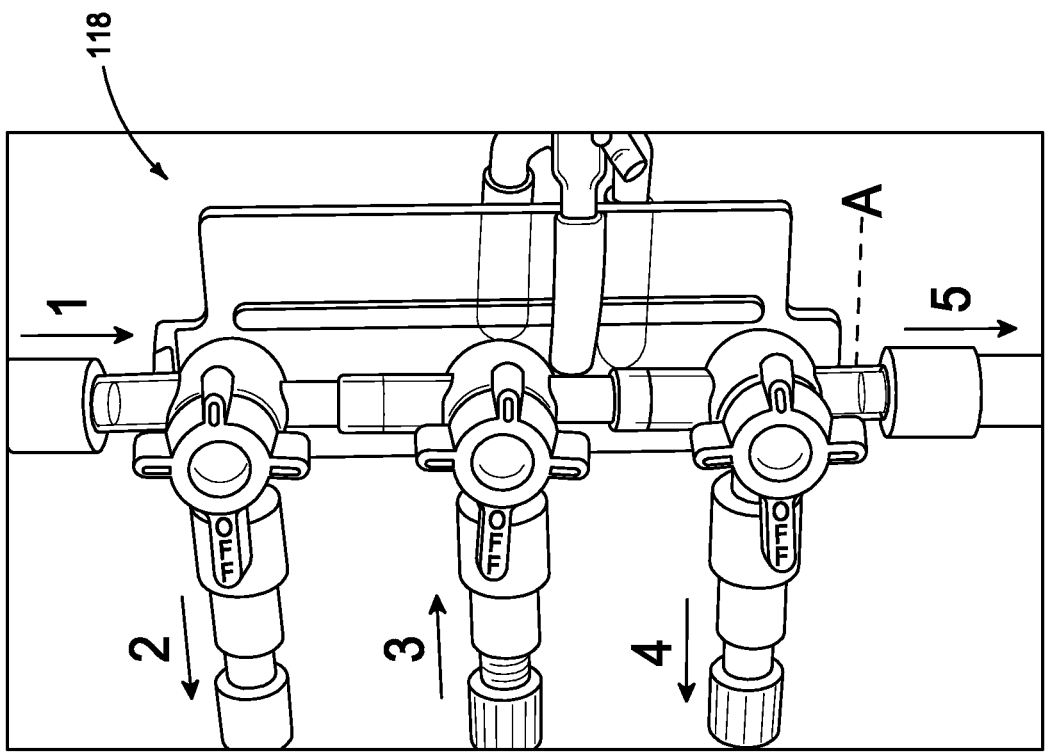

FIG. 46 is an image of a multiport manifold (SM) assembly for use with the systems of FIGS. 41 and 42. A) Resin-screening frit.

Figure 47:
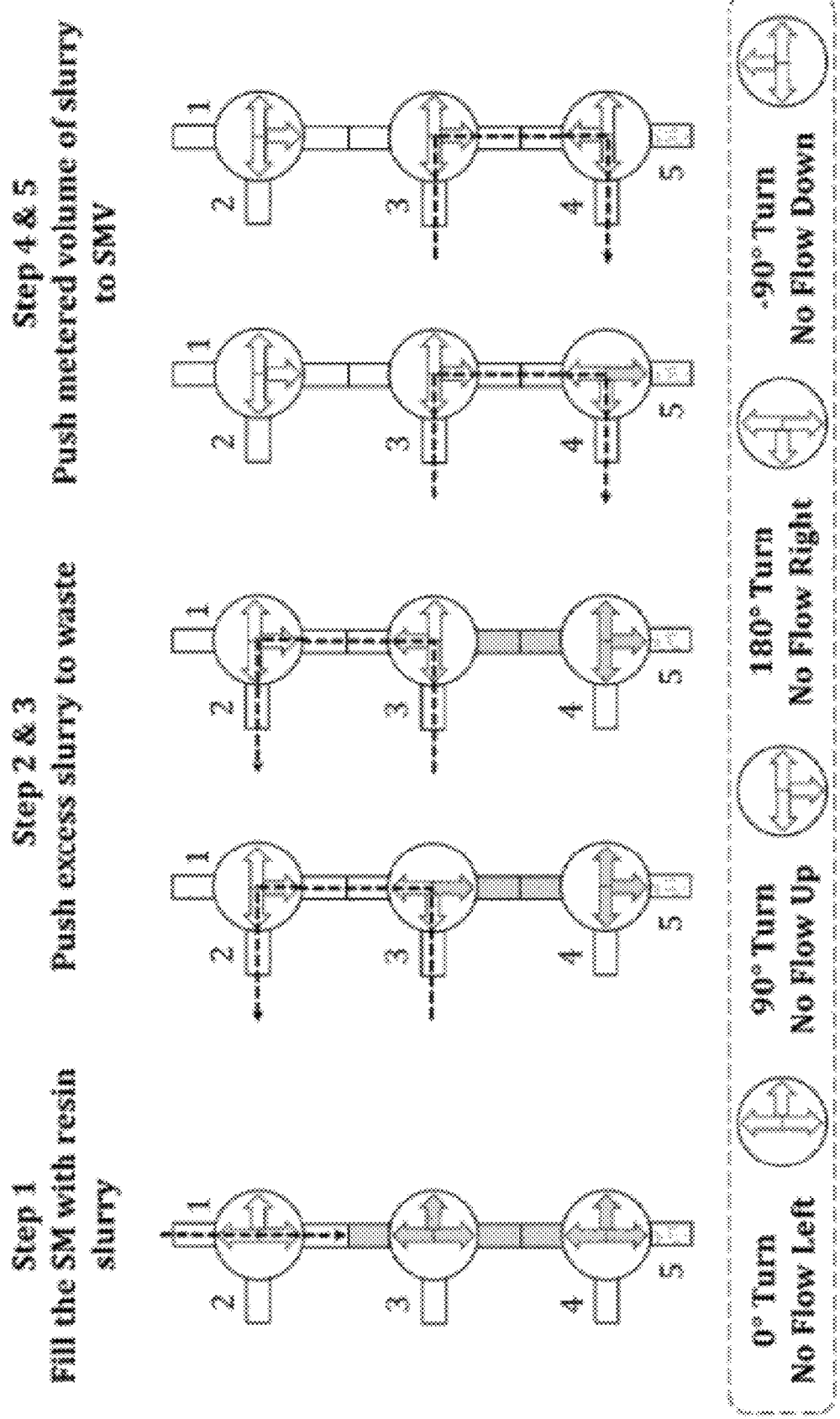

FIG. 47 is a schematic of a series of manifold configurations for use with the systems of FIGS. 41 and 42 according to an embodiment of the disclosure.

Figure 48:
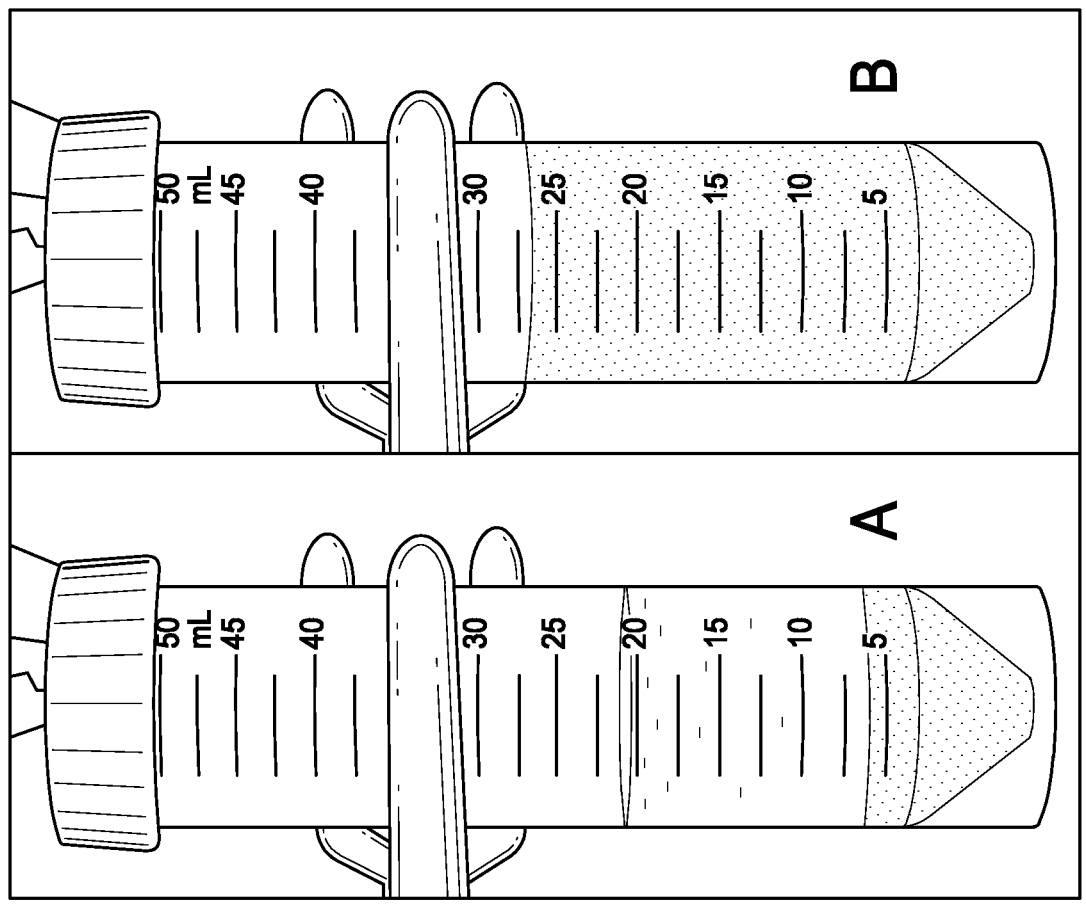

FIG. 48 depict images of a resin slurry in a mixing vessel of the system of FIGS. 41 and 42 (LMV) unagitated (A) and agitated (B) with a 2 PSI $N_2$ gas sparge.

Figure 49:
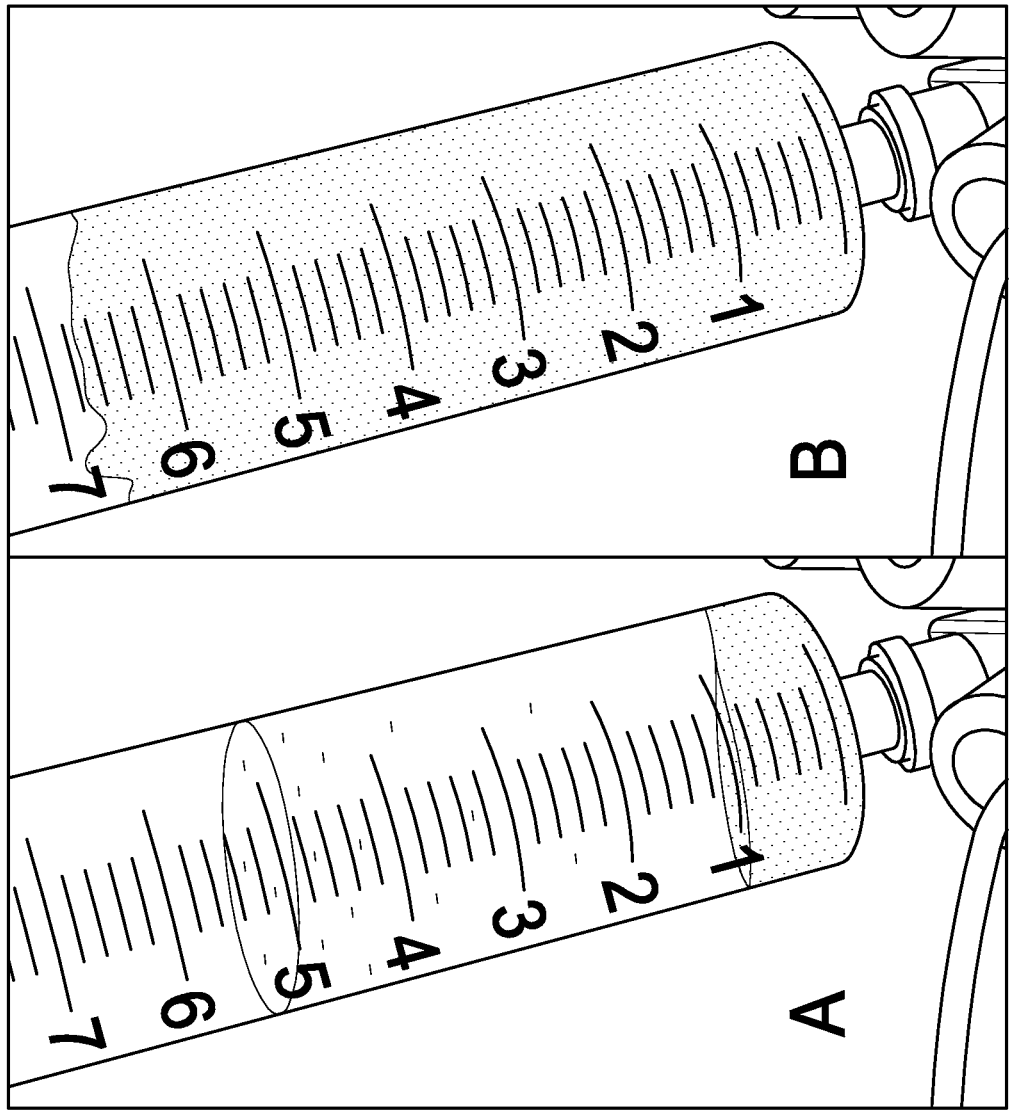

FIG. 49 depicts images of a resin slurry in another mixing vessel of the system of FIGS. 41 and 42 (SMV) unagitated (A) and agitated (B) with a 3 PSI $N_2$ gas sparge.

Figure 50:
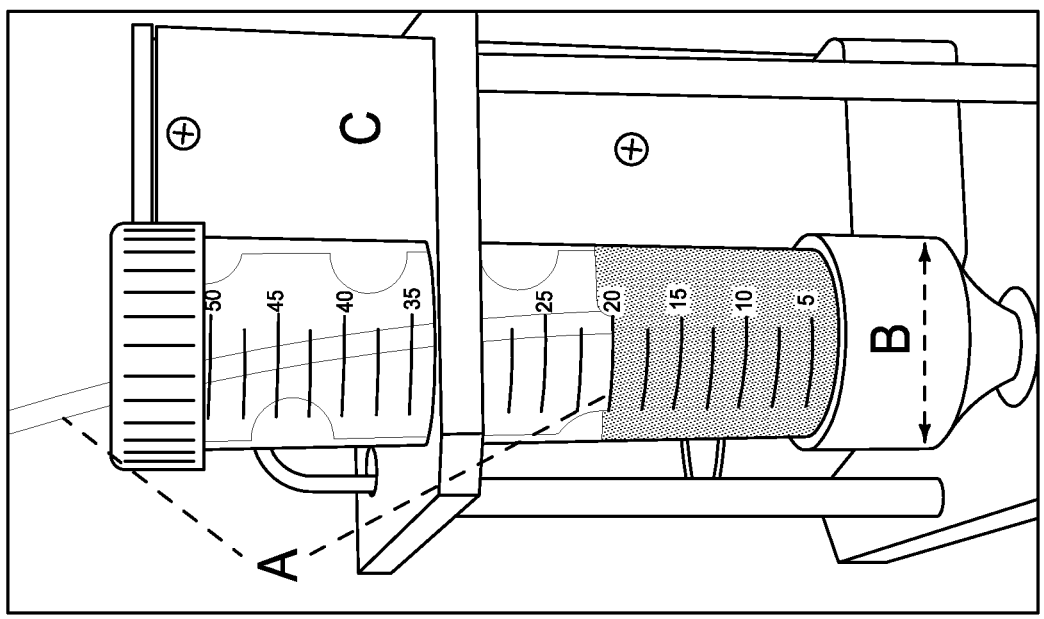

FIG. 50 is an image of a resin slurry in a mixing vessel of the system of FIGS. 41 and 42 (LMV) being homogenously mixed using vane #1 at a Multi-Stirrus mixer setting of 60 RPM. A) Resin slurry aspiration line (outlet); B) rotating magnet base; and C) vertical magnetic spinning device.

Figure 51:
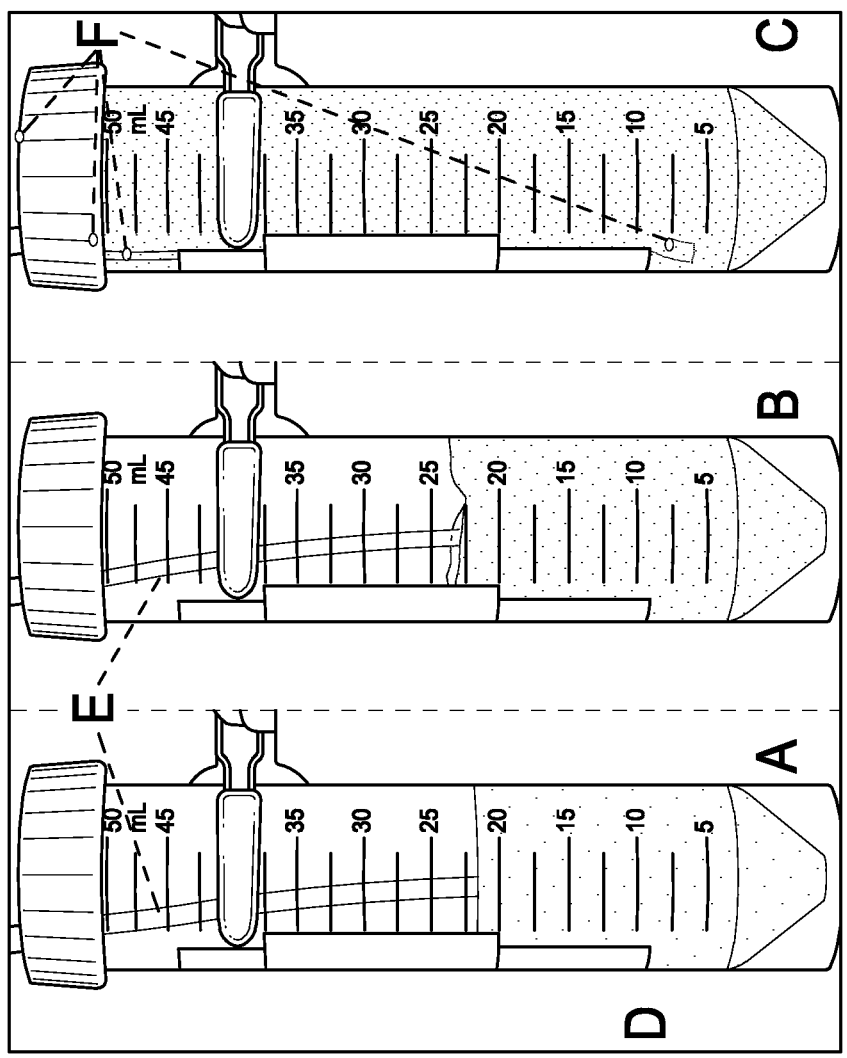

FIG. 51 is an image of a resin slurry in a mixing vessel of the system of FIGS. 41 and 42 (LMV) being undermixed (A), mixed homogenously (B), and overmixed (C). D) Gravity settled resin bed; E) $N_2$ gas (inlet) line; and F) droplets of ejected resin slurry.

Figure 52:
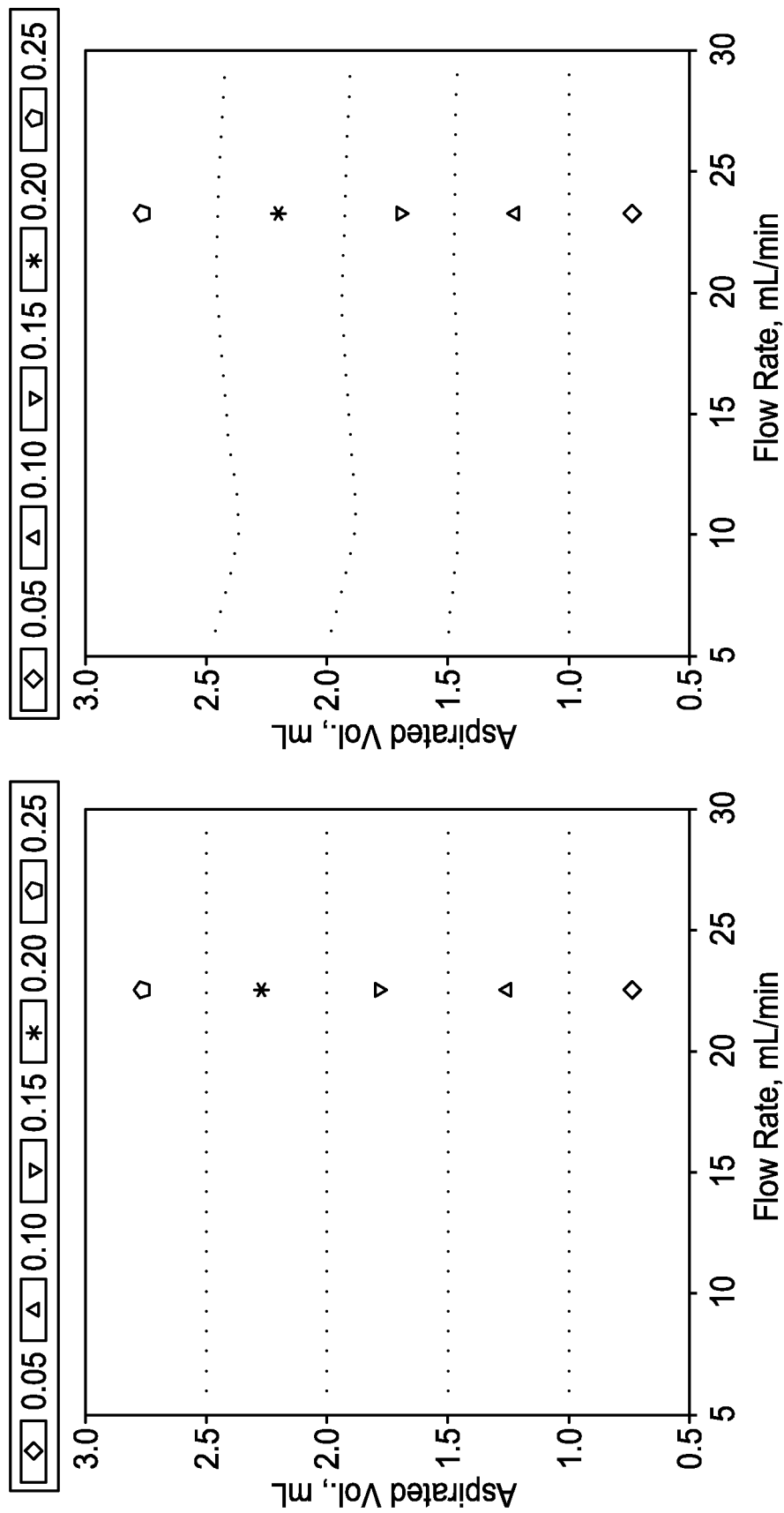

FIG. 52 depicts color contour maps of calculated (left) and empirically determined (right) dry resin masses dispensed as a function of varying flow rates and aspirated volumes. Legend is dry AG MP-50 resin mass (g) delivered.

Figure 53:
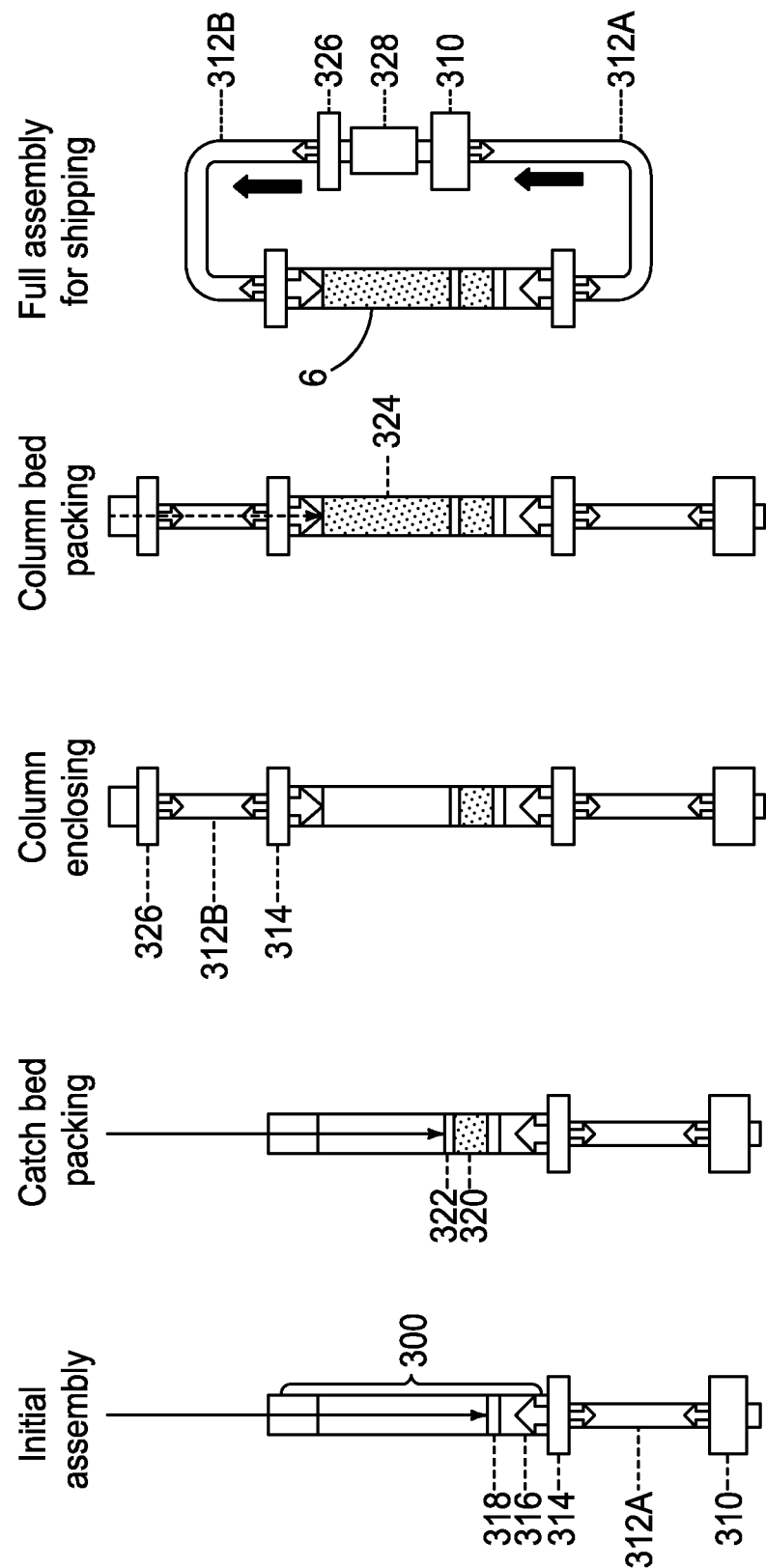

FIG. 53 is a schematic of stages of storage/generator vessel assembly preparation according to an embodiment of the disclosure.

Figure 54:
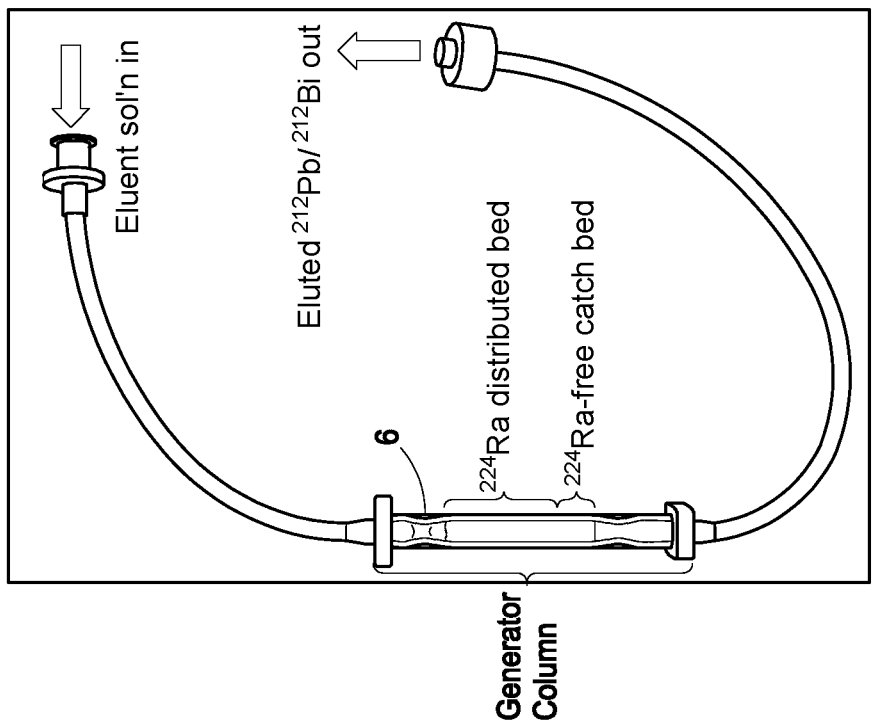

FIG. 54 is an image of a storage/generator vessel assembly according to an embodiment of the disclosure.

Figure 55:
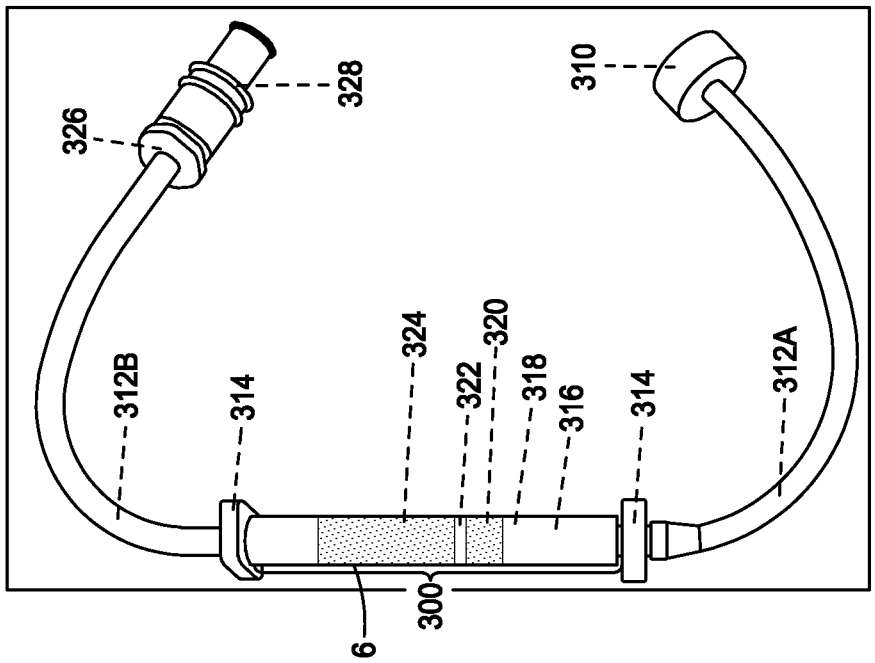

FIG. 55 is an image of a storage/generator vessel assembly according to another embodiment of the disclosure.

Figures 56A, 56B:
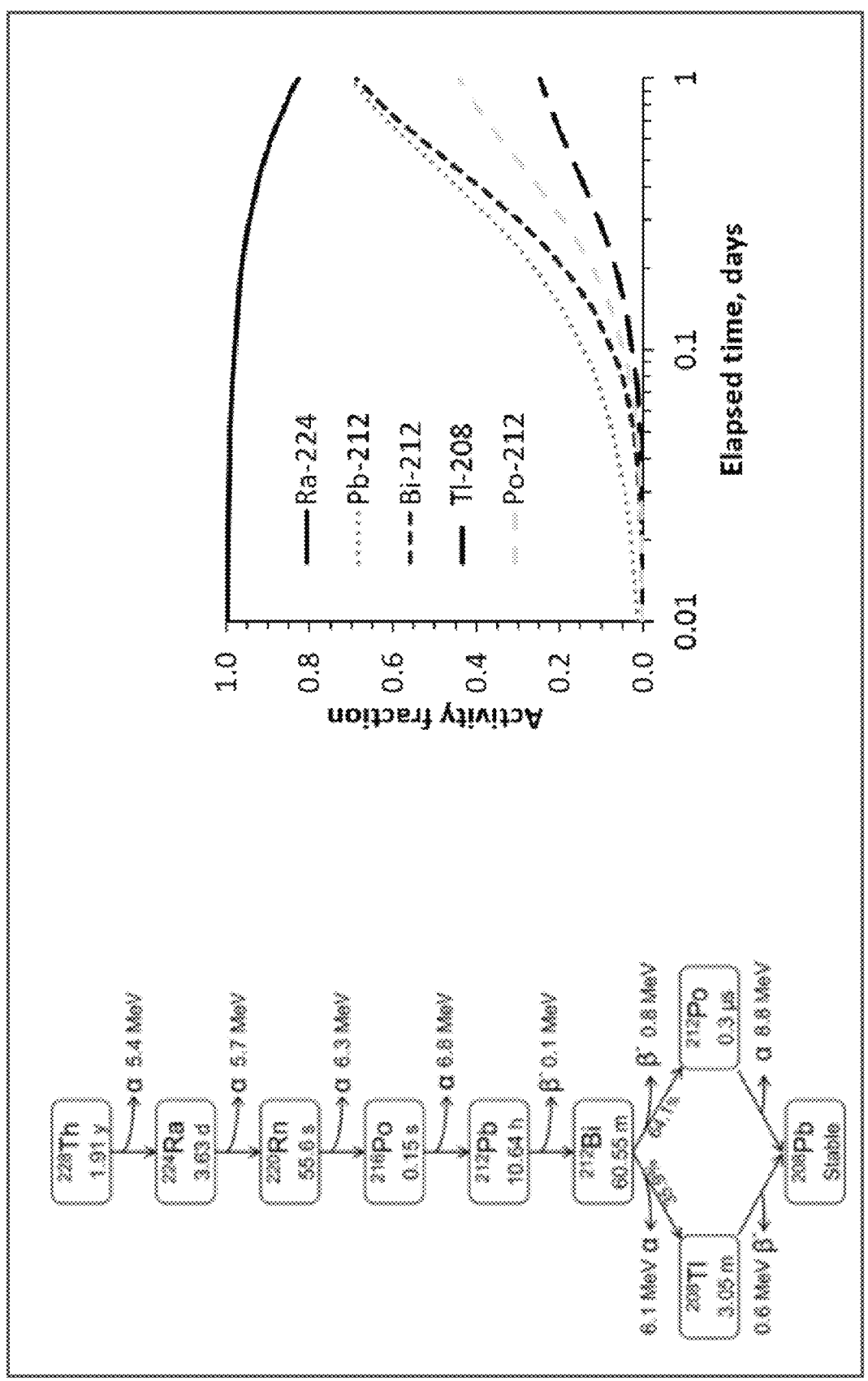

FIG. 56A-56B depict the Thorium-228 decay chain image (56A) and Radium-224 decay and progeny ingrowth curves (56B) over a 1 day interval.

Figure 57:
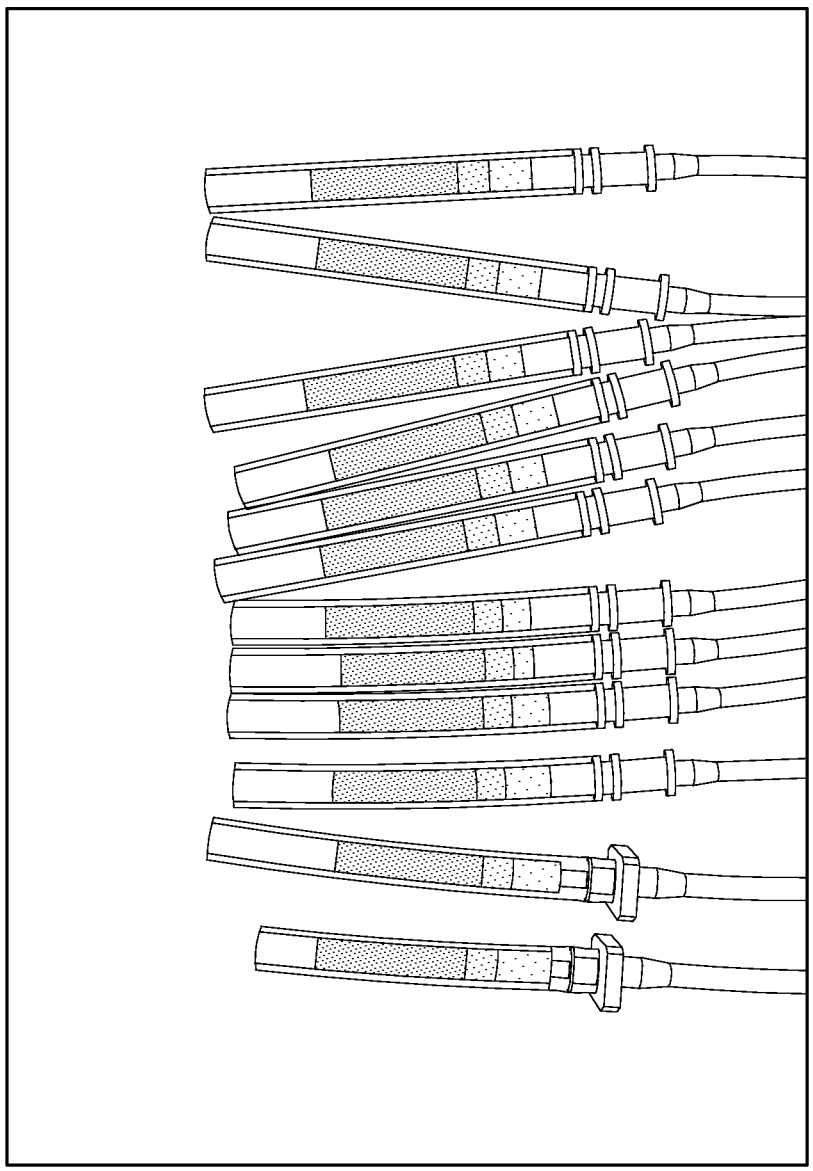

FIG. 57 depicts a series of a replicate storage/generator vessel assemblies prepared according to embodiments of the disclosure.

Figure 58:
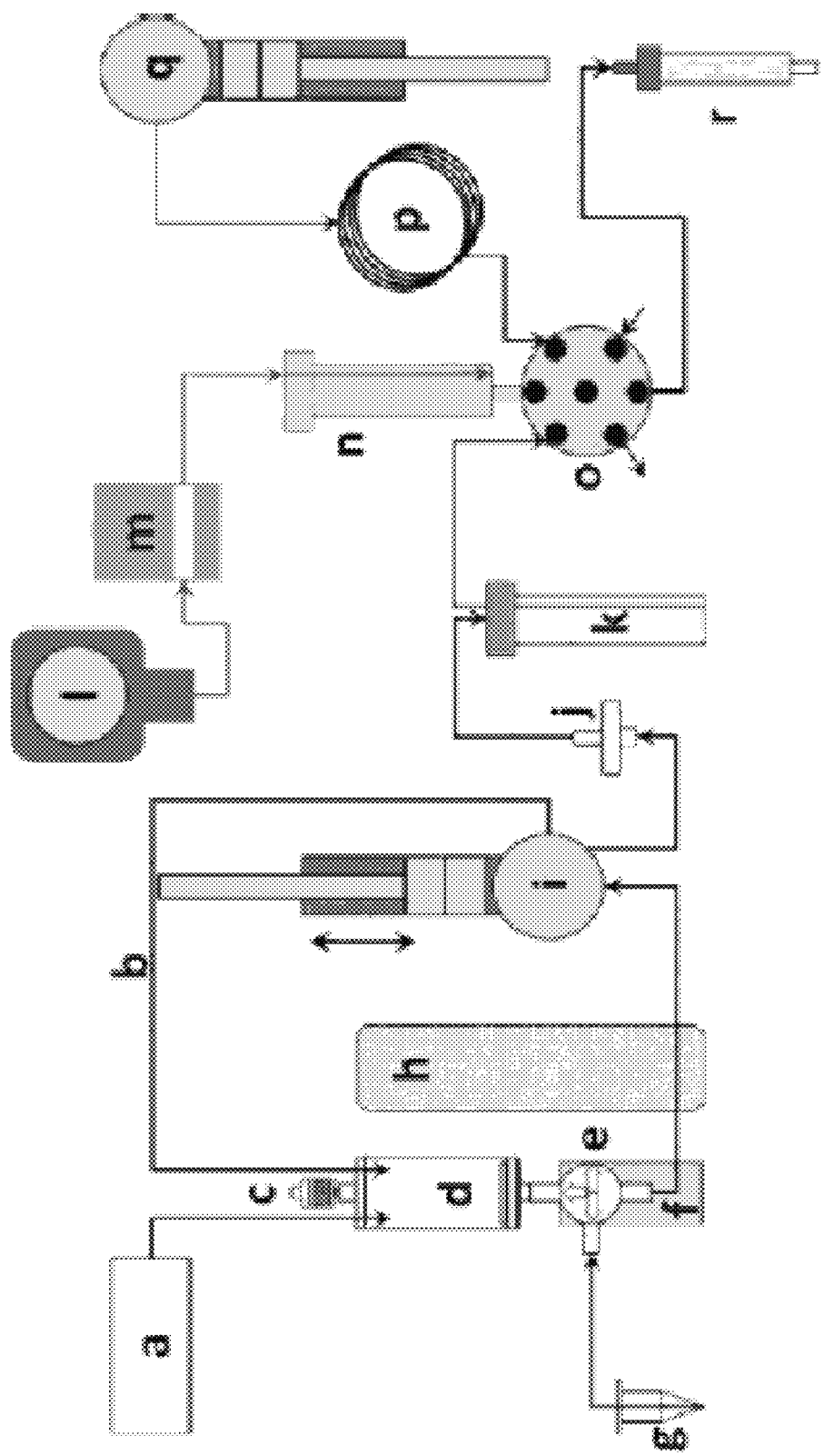

FIG. 58 is a schematic of a system that includes both free isotope preparation and storage/generator vessel assembly preparation according to an embodiment of the disclosure.

Figure 59:
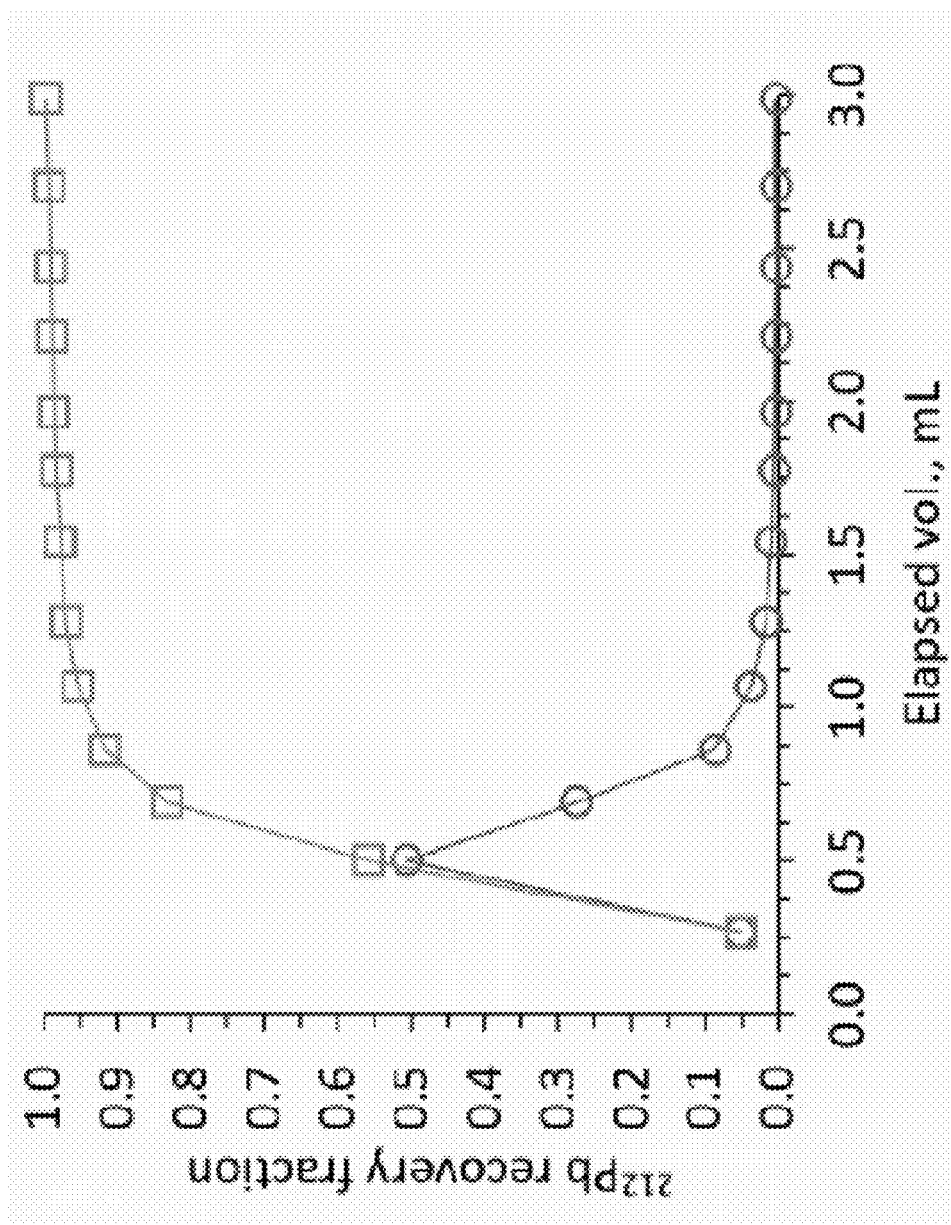

FIG. 59 depicts individual (○) and cumulative (□) $^{212}$Pb fraction recovery relative to the sum eluted activity as a function of 2 M HCl volume loaded onto the $^{224}$Ra generator column data.

Figure 60:
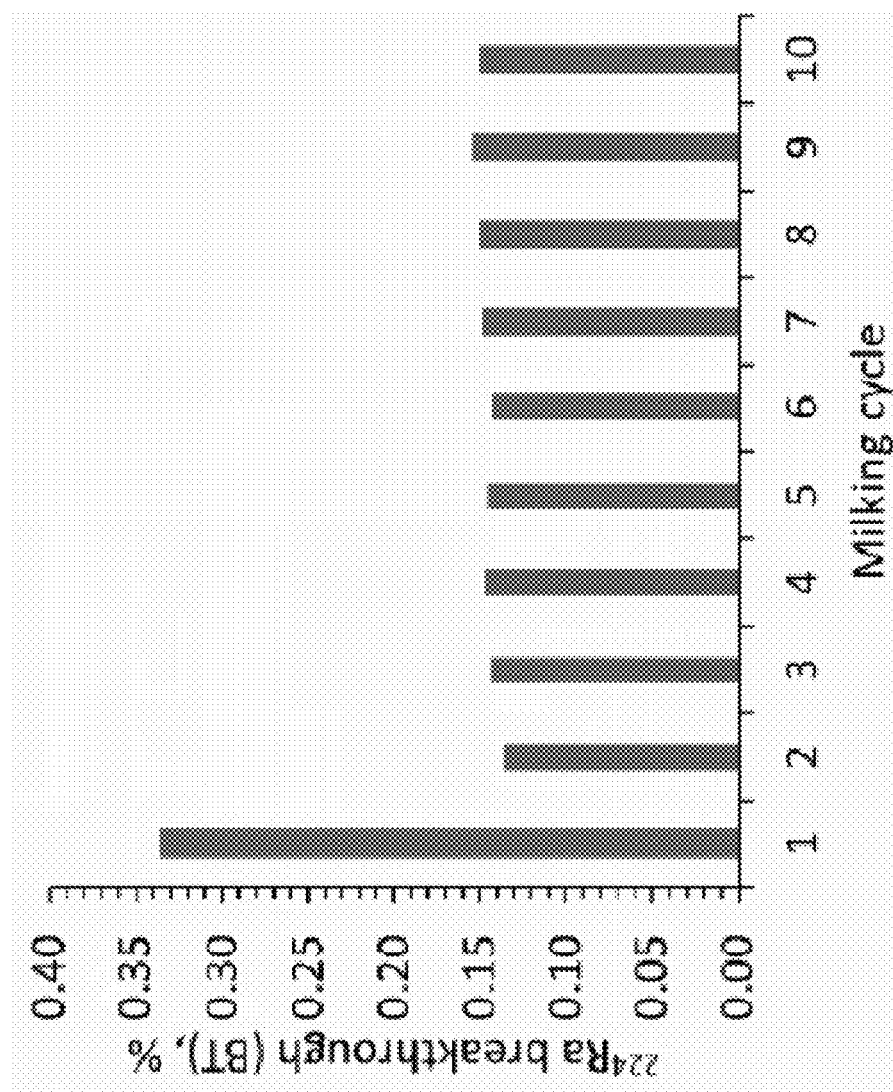

FIG. 60 depicts data indicating some metal ($^{224}$Ra) breakthrough (BT) from a single storage/generator vessel assembly as a function of ten sequential $^{212}$Pb milking cycles. Each milking cycle was 1.0 mL 2 M HCl followed by 1.0 mL deionized water (DI).

Figure 61:
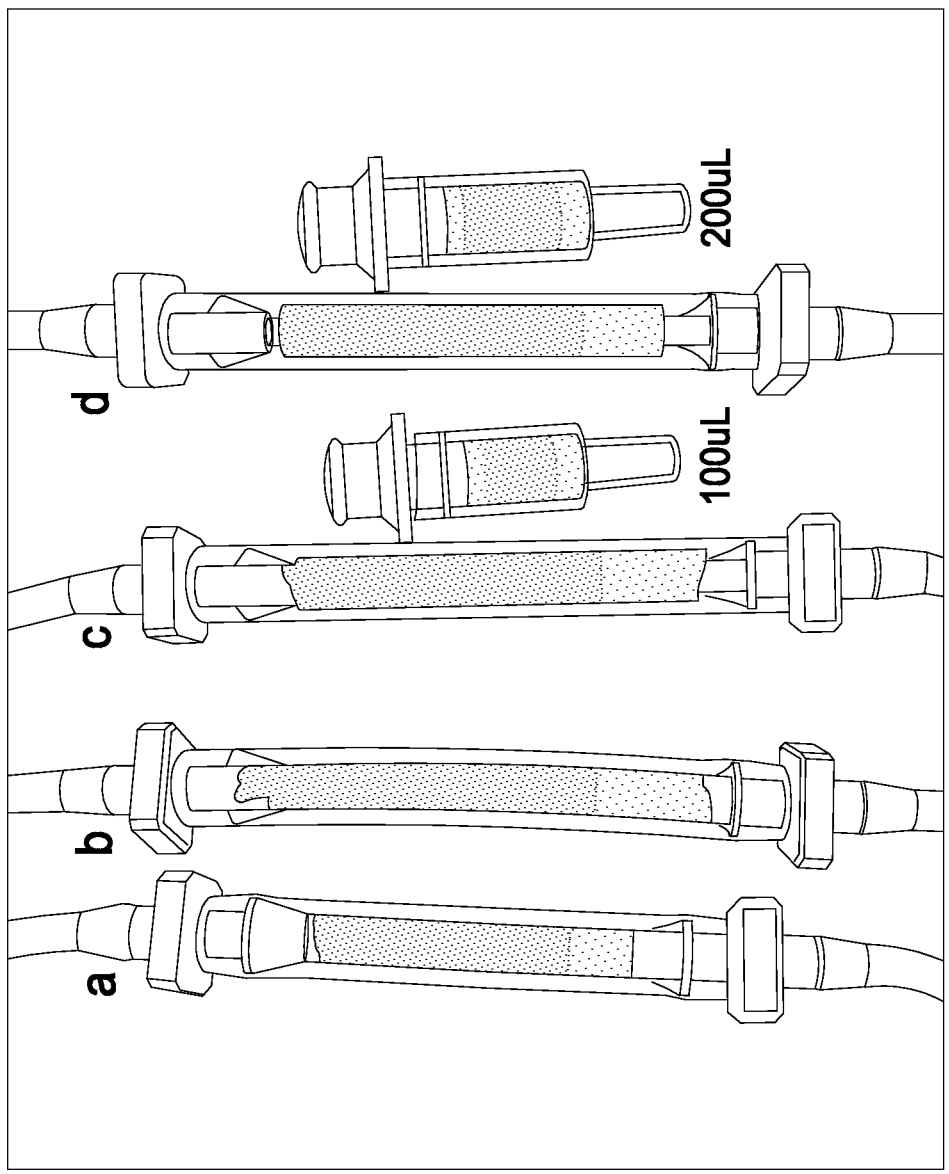

FIG. 61 depicts images of $^{224}$Ra/$^{212}$Pb storage/generator vessel assemblies and supplemental catch bed cartridges according to embodiments of the disclosure.

Figures 62A, 62B:
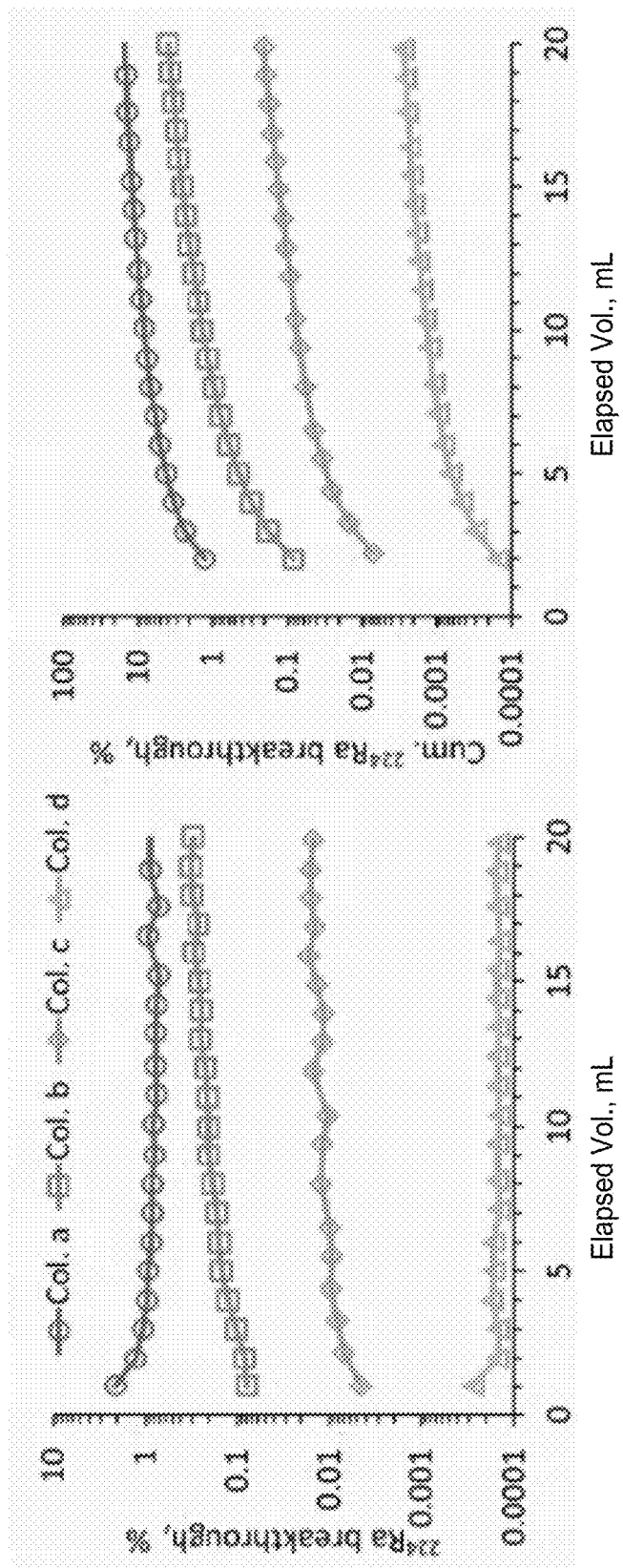

FIG. 62A depicts incremental breakthrough of $^{224}$Ra from different storage/generator vessel assembly configurations across ~20 mL of 2 M HCl $^{212}$Pb eluent.

FIG. 62B depicts cumulative $^{224}$Ra breakthrough for the assemblies of 61B. In this panel, the sacrificial first milking has been omitted from the cumulative plots.

Figures 63A, 63B:
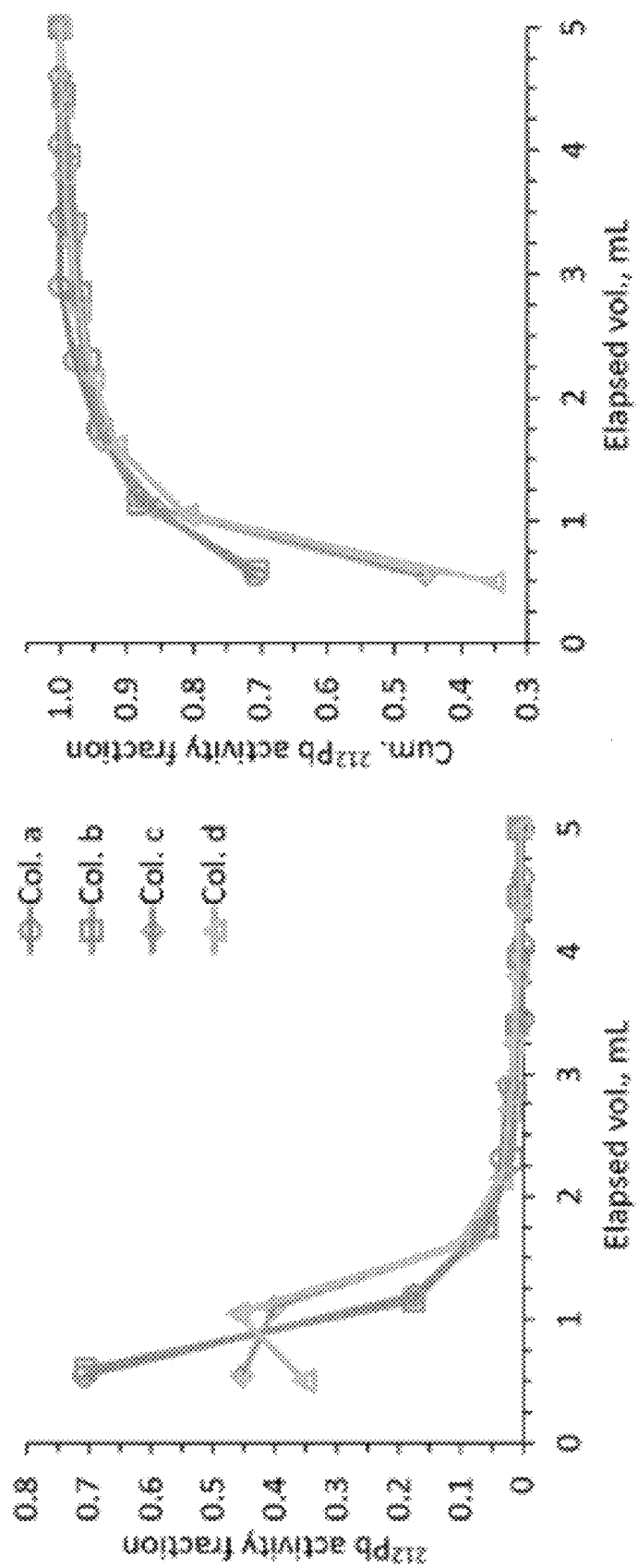

FIG. 63A depicts fractional $^{212}$Pb elution profiles using 2 M HCl for the four storage/generator vessel assemblies.

FIG. 63B depicts cumulative $^{212}$Pb activity fraction yields for the assemblies of FIG. 60A.

DESCRIPTION

This disclosure is submitted in furtherance of the constitutional purposes of the U.S. Patent Laws "to promote the progress of science and useful arts" (Article 1, Section 8).

Figure 1:
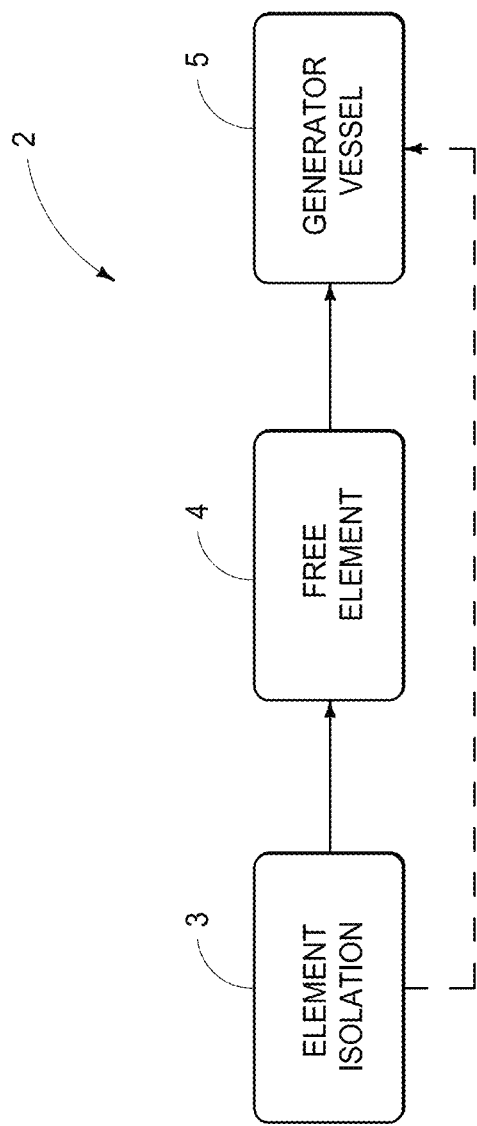
FIG. 1 depicts an overall scheme for isolating, freeing, and generating storage/generator vessel assemblies according to an embodiment of the disclosure.

The present disclosure will be described with reference to FIGS. 1-63B. Referring first to FIG. 1, an overall scheme 2 for producing storage and/or generator vessel assemblies is shown that can begin with an element isolation system/module 3 and continue to a free element producing system/module 4 then continue to a generator vessel producing system/module 5. Implementations of these systems/modules can be used in the above order given or in different combinations to facilitate desired means. For example, single systems/modules can be used or they can be used as combinations of pairs of systems/modules. Specific implementations, as directed in FIG. 1, can utilize system/module 3 in combination with system/module 5 without utilizing system/module 4, for example. In accordance with example implementations, embodiments of the disclosure provide techniques that can be used remotely or hands-free, as well as automated, to allow for the safe and efficient production and transfer of valuable elements such as radioisotopes, for example.

Figure 2:
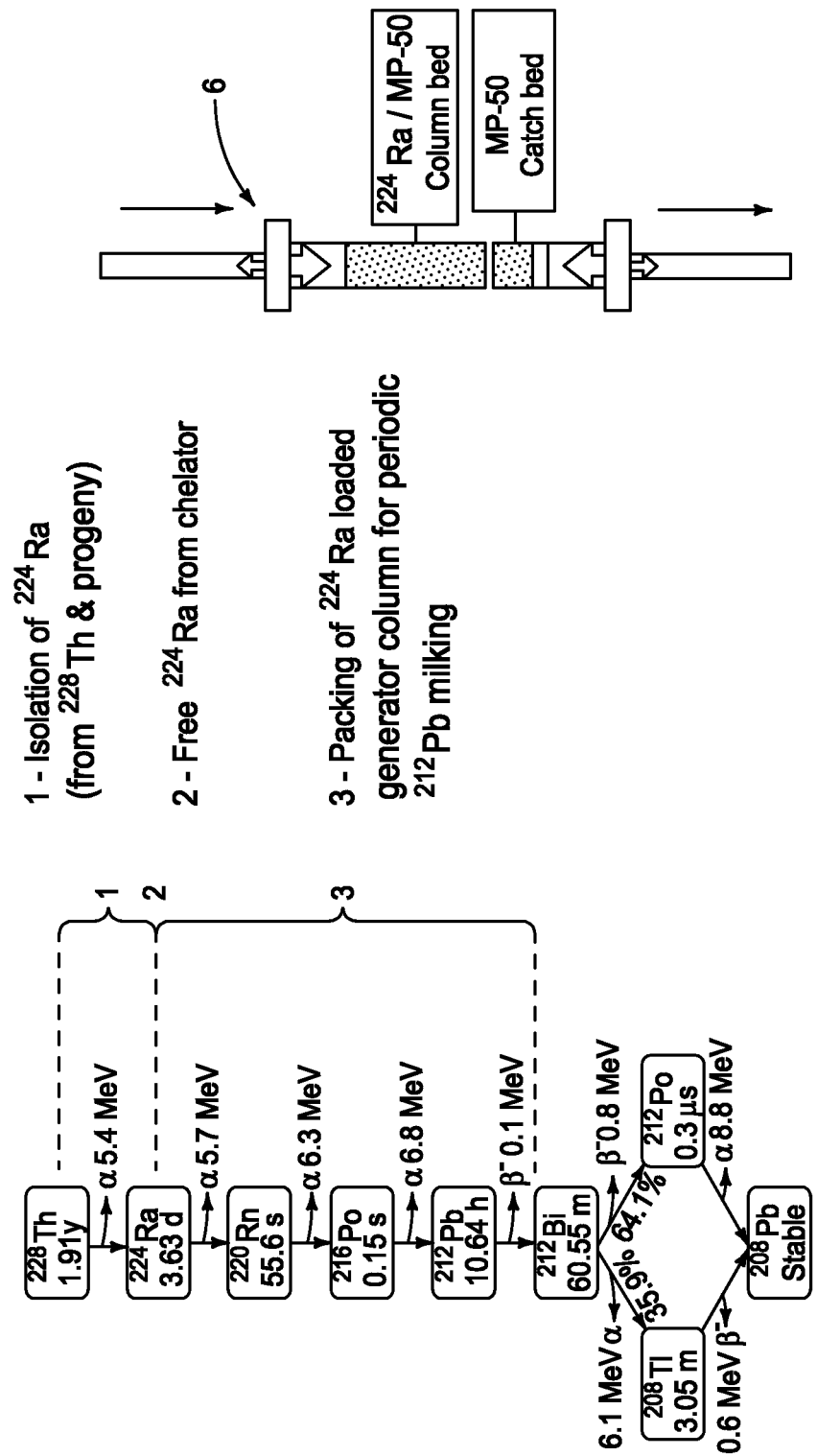
FIG. 2 represents a more specific scheme also depicting an example storage/generator assembly and the generation of isotopes using the storage/generator vessel assembly according to an embodiment of the disclosure.

Generally, element isolation system/module 3 can generate an element from another element within a vessel and then isolates same via systems/methods of the present disclosure. As depicted in FIG. 1, this isolated element can be provided to system/module 4 or system/module 5. Referring to FIG. 2, an example overview of element isolation is shown in the context of Th and Th-progeny. In accordance with the systems and methods of the present disclosure, Ra can be isolated from a mixture of Th and Ra.

Referring again to FIG. 1, upon element isolation as described herein, for example, an element can be produced that is complexed or bound to another material. In keeping with the scheme of FIG. 2, Ra can be isolated as a complex of EDTA. System/module 4 can provide a free element, for example a free Ra. In accordance with FIG. 1, this free element can be provided to system/module 5.

System/module 5 can be configured to prepare a storage/generator vessel assembly. System/module 5 can receive isolated element from system/module 3 or free element from system/module 4. In keeping with the example of FIG. 2, free Ra can be provided to system/module 5 and a storage/generator vessel assembly 6 can be prepared that generates Pb and/or Bi. The vessel can be configured for the storage of the element and the generation of element-progeny on demand. In accordance with example implementation, the $^{224}$Ra can be isolated from $^{228}$Th and then provided as a storage/generation vessel assembly 6 as shown. In accordance with example implementations, this storage/generation vessel assembly 6 can be "milked," taking advantage of radioisotope decay to produce lead and/or bismuth isotopes as detailed herein as a $^{224}$Ra/$^{212}$Pb/$^{212}$Bi generator column. The scope of this disclosure is not limited to Th and Th-progeny. Additional elements that can be processed/provided using one or more of the systems/modules of the present disclosure can include, but are not limited to: $^{99}$Mo/$^{99m}$Tc; $^{113}$Sn/$^{113m}$In; $^{44}$Ti/$^{44}$Sc; $^{52}$Fe/$^{52m}$Mn; $^{68}$Ge/$^{68}$Ga; $^{72}$Se/$^{72}$As; $^{118}$Te/$^{118}$Sb; $^{82}$Sr/$^{82}$Rb; $^{134}$Ce/$^{134}$La; $^{140}$Nd/$^{140}$Pr; $^{90}$Sr/$^{90}$Y; $^{188}$W/$^{188}$Re; $^{166}$Dy/$^{166}$Ho; $^{194}$Os/$^{194}$Ir; $^{226}$Ra/$^{222}$Rn; $^{225}$Ac/$^{213}$Bi; $^{83}$Rb/$^{83m}$Kr; $^{113}$Sn/$^{113m}$In; $^{103}$Pd/$^{103m}$Rn; 167Tm/$^{167m}$Er; $^{172}$Hf/$^{172}$Lu; $^{140}$Ba/$^{140}$La; $^{144}$Ce/$^{144}$Pr; $^{109}$Cd/$^{109m}$Ag; $^{178}$W/$^{178}$Ta; $^{191}$Os/$^{191m}$Ir; $^{62}$ZN/$^{62}$Cu; $^{110}$Sn/$^{110m}$In; $^{122}$Xe/$^{122}$I; and/or $^{128}$Ba/$^{128}$Cs. Accordingly, the present disclosure can have particular use where elements are forming mixtures of the element and the element-progeny. Therefore, the generator vessel assemblies can include elements and element progeny, system/module 3 can be configured to isolate element progeny from element/element progeny mixtures, for example.

Further, the disclosure will define columns by the media present in the columns. This is to be considered media within vessels. Therefore, when an element is retained or bound to a column, it is recognized that the element is bound or retained to media within the column/vessel.

Additionally, chelating agents are described as ligands which bind a metal with more than one coordination site, for example, EDTA. Organic compounds that coordinate metal ions into circular structures (chelate circles) are considered chelating reagents. Most chelating reagents include oxygen, nitrogen, or sulfur atoms in their molecules. Chelate structures with five or six member rings form the most stable chelate circle. More generally, chelating agents possess an organic backbone with functional groups to coordinate to the metal. These functional groups include but are not limited to phosphonates, phosphinates, phosphines, sulfonates, carboxylates, imines, and amines. In chelating reactions of typical chelating reagents, including but not limited to ethylenediamine, acetylacetone, and oxine, molecules are coordinated with one metal ion. Ethylenediamine tetraacetic acid (EDTA), which has many coordinated atoms, forms a very stable chelate between one molecule of EDTA and metal ion. Phosphonic acid-based chelates may be used as well.

In accordance with example implementations, the entirety or portions of the above can be performed hands-free, automated, and/or remotely, in that users can be separated from potentially toxic or harmful elemental compounds including isotopes through the use of mechanical direction modules. In accordance with example implementations, the systems and methods of the present disclosure can be performed with mechanical servos and/or pumps including syringe pumps that can be operated and operatively coupled to computer processing circuitry that can be operable to control the pumps, servos, and valves in a predetermined manner or remotely via a computer interface, for example.

Example systems and/or methods for producing elements are provided below with reference to FIGS. 3-32.

Example implementations of systems and methods for free element production are described below with reference to FIGS. 33-39, for example. An additional step or procedure that can be accomplished after production of free element can be a system or method for producing a storage/generator vessel assembly as shown in FIG. 1.

Systems and methods for producing the storage/generator vessel assembly are described below with reference to FIGS. 40-58. The storage/generator vessel assemblies produced in accordance with example implementations of the present disclosure as well as the use of same are described with reference to FIGS. 59-63B of the present disclosure.

The present disclosure provides systems and methods for the separation of materials that can be used for the acquisition of targets for alpha radiation when performing targeted radioimmunotherapy applications. In one example the $^{212}$Pb/$^{212}$Bi isotope pair shows good promise. The parent isotope, $^{224}$Ra, must be periodically isolated from $^{228}$Th via radiochemical separation. The purified $^{224}$Ra can then be used to prepare $^{224}$Ra/$^{212}$Pb/$^{212}$Bi generators. The present disclosure provides a $^{224}$Ra purification method that can be safer and more efficient than existing prior art methods resulting in reduced personnel dose, reduced labor cost, and reduced preparation time; and may be fully, but at least partially, automated using laboratory fluidics.

Figure 3:
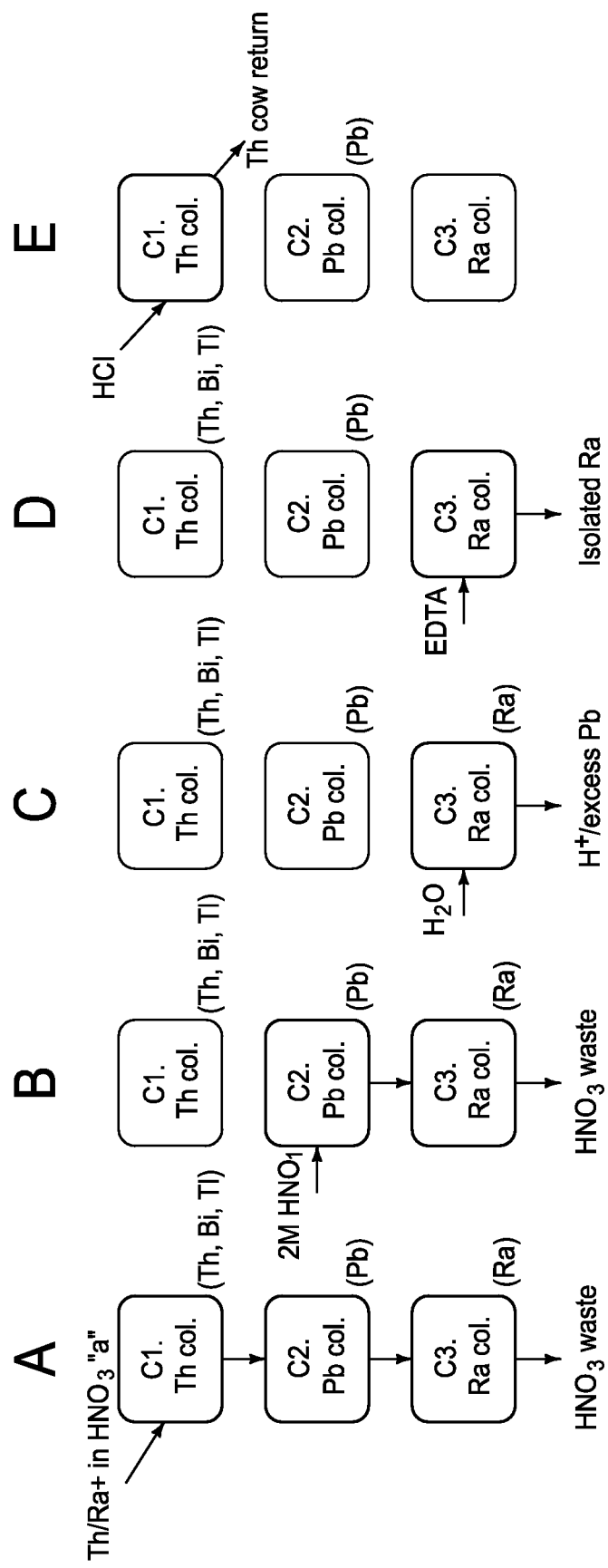
FIG. 3 depicts an example modified triple-column $^{224}$Ra isolation scheme; green cells indicate active flow paths at each step A through E. (A) Load and wash "a" to adsorb Th, Pb, and Ra on C1-C3, respectively; (B) Secondary wash "b" for C2-C3; (C) Water rinse through C3 to remove H+ ions; (D) Ra elution from C3; and (E) Elution of Th from C1 for reuse.

With reference to FIG. 3, the present disclosure provides systems and/or methods for separating Ra from a mixture comprising at least Ra, Pb, Bi, and Th. As can be seen in FIG. 3, there are three vessels (C1, C2, and C3), but there can be two or at least one. These vessels can house media. For example, C1 can house media M1, C2 can house media M2, and C3 can house media M3. One or all three of these vessels can be in fluid communication via conduits for example. Each of the conduits can be controlled via a valve or valves for example. Referring to FIG. 4, in accordance with an example implementation, a mixture (Th/Ra+("+" subsequent progeny can be present) in HNO$_3$) that can provide Ra, Pb, Bi, and Th, can be exposed to vessels C1-C3 and thereby M1-M3. Each of the Media can be different from one another.

Accordingly, the media can be (in fluidic introduction order, and as shown in Table 1) AnIX-M1 (AG MP-1M, Bio-Rad, or TEVA resin, Eichrom); 18-crown-6 ether in a 1-octanol diluent-M2 (Sr Resin, Eichrom); M3 (Ra-01 resin, IBC Advanced Technologies). In accordance with example implementations, a $^{228}$Th/$^{224}$Ra/$^{212}$Pb/$^{212}$Bi/etc. mixture can be passed through all three vessels in strong HNO$_3$ (6M, however concentrations as low as 0.5 to 1M or even 2M HNO$_3$ can be utilized as well); a 3-column wash (strong HNO$_3$) can be delivered, and Th+Bi is partially retained in C1; Pb retains in C2; Ra retains in C3 (the system configuration of which is shown in FIG. 4 as (A).

Accordingly, systems of the present disclosure can include a first vessel housing a first media and either Pb or Bi and/or Th (C1 or C2); and a second vessel in fluid communication with the first vessel, the second vessel housing a second media and Ra (C3), wherein the first media is different from the second media. Additionally, systems of the present disclosure can include a first vessel housing a first media and Th and/or Bi (C1); and a second vessel in fluid communication with the first vessel, the second vessel housing a second media and Pb (C2), wherein the first media is different from the second media. Embodiments of the present disclosure can also include systems having a first vessel housing a first media and Th or Bi (C1); a second vessel in fluid communication with the first vessel, the second vessel housing a second media and Pb (C2); and a third vessel in fluid communication with the second vessel, the third vessel housing a third media and Ra (C3), wherein at least one of the first, second, or third medias are different from the other medias.

Methods are also provided that can include providing a mixture having Ra, Pb, Bi, and/or Th; providing the described system having vessel (C1) housing the media (M1), and vessel (C2 or C3) in fluid communication with vessel (C1), with vessel (C2 or C3) housing media (M2 or M3); exposing the mixture to media (M1) within vessel (C1) to separate the Th and Bi from the Ra and Pb; then, through the fluid communication, exposing the remaining mixture to media (M2 or M3) in vessel (C2 or C3) to associate the Pb or Ra with the M2 or M3 media. In accordance with example implementations, Th (with Bi) of C1 can be eluted from M1 in strong HCl for dry-down and storage for re-use as desired.

Additionally, as shown and described, vessel (C3) can be in fluid communication with vessel (C2), and vessel (C3) can house a media (M3). The methods can include exposing the mixture to media (M1) within the vessel (C1) then, through the fluid communication, exposing the first remainder (that which passes through C1 or is washed through C1) to media (M2) in vessel (C2), then, through fluid communication, exposing the next remainder (that which passes through C2 or is washed through C2) to media (M3) in vessel (C3), the exposing separating the Th and Bi from the Ra and Pb, and the Ra from the Pb to sequester the Th and Bi in one vessel, the Pb in another vessel, and the Ra in still another vessel.

Upon distributing the materials within the system, and with reference to configuration B of FIG. 3, vessels C2 and C3 are washed with less strong or weaker $HNO_3$ (<7 M, between 2 M and 7 M, or <=6 M, and in some embodiments 0.5 to 1 M $HNO_3$). In accordance with example implementations, M3 can then be washed with water to remove H+/excess Pb in configuration C. In configuration D, Ra can be eluted from M3 (to which it was associated) with dilute EDTA solution (pH adjusted to >7), or a chelating solution with a bonding constant that is higher than that of the M3 resin in C3. For example, per FIG. 32, the Ra is EDTA bound ~100% at a pH of ~6, and is ~50% EDTA bound at pH ~5.3. Accordingly, methods of the present disclosure provide for separating Ra from being associated with a media by exposing the Ra and media to a chelating agent to form a mixture comprising the Ra complexed with the chelating agent.

The Ra/EDTA product solution is not compatible with loading onto a CatIX-based generator column. Adding enough HCl to the Ra/EDTA solution to drop the pH below ~2 (Per FIG. 32, Ra is freed from EDTA at pH ~4. By pH ~2, the EDTA is rendered insoluble and precipitates out, leaving Ra in supernate) can decouple or disassociate the Ra from the EDTA (thereby producing free $Ra^{2+}$ ions in solution). The weakly acidified $Ra^{2+}$ solution can then be adsorbed onto the CatIX-based generator column.

The systems and methods of the present disclosure can provide isolated and free a $^{224}Ra$ product that can be loaded onto the CatIX generator column. Embodiments of the disclosure can be performed without boil-down or acid transposition steps. The purified Ra (without $^{212}Pb$ and $^{212}Bi$ progeny) can be handled in a low-dose state for several hours. This can allow for packing the generator column, removing the column from containment, and packing it for shipping before the dosage becomes an issue. Additionally, the present disclosure also provides fluidic systems to perform the methods. This can provide a fluidic platform.

TABLE 1

Commercial resins evaluated for the triple-column process to isolate $^{224}Ra$ from $^{228}Th$.

| Column ID | Resin type | Resin ID | Particle size, μm | Manufacturer | Purpose |
|---|---|---|---|---|---|
| C1 | $AnIX_{poly}$ [a] $AnIX_{org}$ [b] | AG MP-1M TEVA | 37-74 50-100 | Bio-Rad Eichrom | Th extraction & recovery |
| C2 | 18-C-6 [c] | Sr Resin | 50-100 | Eichrom | Pb extraction |
| C3 | 21-C-7 [d] | Ra-01 | 150-250 | IBC | Ra extraction & recovery |

[a] Functional group: Quaternary amine on macroporous polystyrene divinylbenzene copolymer.
[b] Functional group: Aliquat 336, an organic quaternary amine salt on Amberchrom CG-71 ("Pre-Filter") polymer support.
[c] Functional group: 18-crown-6 and 1-octanol on Amberchrom CG-71 polymer support.
[d] Functional group: Proprietary; presumed to be a 21-crown-7 (in part) on silica support.

An example overall fluidic protocol for the modified triple-column method is shown in Tables 2 and 3.

TABLE 2

Protocol for modified triple-column purification of $^{224}Ra$ from $^{228}Th$. Example resins and column volumes are included. [a]

| Step | Purpose | Column connections | Reagent | Reagent conc., M | Vol., mL |
|---|---|---|---|---|---|
| 1 | Col. condition | C1-C3 | $HNO_3$ | 6 | 5 |
| 2 | Load [b] | C1-C3 | $HNO_3$ | 6 | 3 |
| 3 | Wash a | C1-C3 | $HNO_3$ | 6 | 3 |
| 4 | Wash b | C2-C3 | $HNO_3$ | 2 | 5 |
| 5 | Water wash | C3 | $H_2O$ | — | 5 |
| 6 | Ra elute | C3 | EDTA [c] | 0.05 | 5 |
| 7 | Th elute | C1 | HCl | 1 | 5 |

[a] C1 = 1 $cm^3$ TEVA resin; C2 = 0.25 $cm^3$ Sr Resin; C3 = 0.25 $cm^3$ Ra-01 resin.
[b] $^{228}Th$ in equilibrium with $^{224}Ra$ and progeny.
[c] pH was adjusted to ~11.

TABLE 3

Description of Steps for the Schematic of FIG. 3.

| Step | Description |
|---|---|
| A | Load and wash "a" to adsorb Th, Pb, and Ra on Col. 1-3, respectively. |
| B | Secondary wash "b" for Col. 2-3 to assure complete transport of Ra between Col. 2 and 3. |
| C | Water rinse through Col. 3 to remove nitric acid. |
| D | Ra elution from Col. 3 via transchelation with EDTA solution. |
| E | Elution of Th from Col. 1 for recovery and eventual reuse. |

During Step A, the prepared $^{228}Th$/progeny stock solution (in 6 M $HNO_3$) can be passed through three columns, each fluidically interlinked. The 6 M $HNO_3$ concentration can provide high affinity of Th on the AnIX media (1) and high affinity of Pb on the Sr media (M2). During the load step, Th (and Bi/Tl daughters) are adsorbed on M1, Pb is adsorbed on M2, and Ra is adsorbed on M3.

Following up the load solution is wash "a", comprising 6 M $HNO_3$. This can provide for complete fluid transport of the load solution through the three tandem columns.

The Step A process efficacy is demonstrated by gamma spectra in FIG. 5. In this instance, M1 was an $AnIX_{poly}$. Solutions can be delivered to the three columns at 1 mL/min. The $^{228}Th$/progeny load (A) and initial "wash a" solution (B) triple-column effluent fractions can be collected in test tubes and counted by gamma spectrometer. It was observed that no activity was present from the fractions that has passed through all three columns during the load and wash "a" steps; all activity was adsorbed onto the columns.

Additionally, a direct gamma count of the C1 immediately after the completion of the load/wash "a" steps shows the presence of $^{228}$Th, $^{212}$Bi, and $^{288}$Tl (FIG. 5 (C)). No $^{212}$Pb or $^{224}$Ra gamma peaks are observed on M1, as these radionuclides have been adsorbed onto M2 and M3, respectively.

The passage of $^{224}$Ra out of C1 and C2 can be confirmed by evaluating a wash "a" effluent fraction that was diverted away from C3. In FIG. 6, rather pure $^{224}$Ra in the C2 effluent can be observed, along with a trace of $^{212}$Bi and $^{208}$Tl. A trace $^{212}$Pb peak is visible at channel ~80. The general absence of $^{212}$Pb spectral lines indicates the good collection efficiency of Pb on the Sr Resin (C2). Any freshly ingrown $^{212}$Bi and $^{208}$Tl daughters of the C2-bound $^{212}$Pb would likely not be retained on M2 during this step, but would rather be swept from C2 and pass through C3 to waste.

The role of M2 is to adsorb $^{212}$Pb from the $^{212}$Pb/$^{224}$Ra mixture that passes through C1. The 18-crown-6 ether extracting agent on the Sr Resin has strong affinity for Pb(II) ions, and low affinity for Ra(II) ions and Bi(III) ions in multi-Molar concentrations of HNO$_3$ (see FIG. 7 and FIG. 8). Consequently, $^{224}$Ra can pass through the Sr Resin and thereby collect onto M3. Any $^{212}$Bi/$^{208}$Tl generated by $^{212}$Pb on the M2 is unretained and will pass out of C2 along with $^{224}$Ra to C3. As the $^{212}$Bi/$^{208}$Tl is likewise unretained on M3, it will pass to waste while $^{224}$Ra is being loaded.

In Step B, C1 can be disconnected from the chain of vessels and remain static until the end of the method, when the adsorbed $^{228}$Th is recovered via a separate elution step as Step E. By disconnecting, the fluid communication is simply blocked off, but the conduit associating C1 and C2 can remain.

Wash "b", comprising 2 M HNO$_3$, can be passed through C2 and C3 to assure quantitative transfer of Ra from C2 to C3. The Pb is strongly bound onto M2 and remains there. 2 M HNO$_3$ can be used in this step because it provides the high level of affinity of Pb on the Sr Resin.

The Ra has a low level of affinity for the Sr Resin (M2) at 2 M HNO$_3$ (k'≈2, FIG. 8). This is evident by the slight retardation of Ra during the load/wash "b" step shown in FIG. 8 (B). Here, the $^{212}$Bi trace represents an unretained ion (k' of <0.4) passing through the vessel ahead of the $^{224}$Ra passage. Because of this slight Ra/resin affinity, wash "b" can require a volume of ~10 mL to assure complete Ra passage through the Sr Resin column.

The wash "b" process data is demonstrated in FIG. 9 (A). The C2/C3 effluent fractions show no indication of $^{212}$Pb or $^{224}$Ra breakthrough from the columns. Once wash "b" is complete, FIG. 9 (B) demonstrates that a pure $^{212}$Pb spectrum is observed on the Sr Resin column (C2).

Referring next to FIG. 10, in step C, C2 can be disconnected from C3, as M3 now contains the isolated $^{224}$Ra fraction. Again, the disconnection does not remove the conduit connecting vessels C2 and C3, it simply prohibits fluid flow through the conduit.

Water can be flushed through the C3 in order to remove the HNO$_3$ from the system. Ra remains strongly bound to M3 during the water flush as Ra affinity for Ra-01 resin generally increases as HNO$_3$ concentration drops. Additionally, the water wash through C3 can result in removal of $^{212}$Pb that may reside on the column. This $^{212}$Pb could be from C2 breakthrough or freshly ingrown $^{212}$Pb produced by the M3-bound $^{224}$Ra. A series of five 1 mL water effluent fractions were collected and analyzed by gamma spectroscopy. The removal of $^{212}$Pb from C3 during the water wash is shown in FIG. 11(A). By evaluating the water fraction decay rate over time, it was confirmed that the water fractions did not contain $^{224}$Ra. The rate of activity loss was in agreement with the $^{212}$Pb decay factor (FIG. 11 (B)). This indicates that no $^{224}$Ra was co-eluted with $^{212}$Pb during the water wash.

As $^{228}$Th, $^{212}$Bi, and $^{208}$Tl are locked onto M1 of the now-disconnected C1 vessel and $^{212}$Pb is locked onto M2 of the now-disconnected C2, and traces of $^{212}$Pb on M3 were removed during the water rinse, the isolated $^{224}$Ra that is bound onto M3 has a low associated dose rate. This is temporary, as $^{224}$Ra progeny ingrowth quickly escalates dose on M3.

Referring next to FIG. 12, in Step D, the $^{224}$Ra on M3 was eluted using 5 mL of 0.05 M EDTA that had been adjusted to pH 11 using NaOH. Column effluent fractions were collected, and gamma spectrometry was performed. The resulting radiochromatogram is shown in FIG. 13 (A). In this $^{224}$Ra elution, four milliliters contained the vast majority of the $^{224}$Ra activity (it is hypothesized that higher concentrations of EDTA, or a stronger chelating agent, or a smaller column volume, would result in sharper $^{224}$Ra elution peaks.).

The series of $^{224}$Ra elution fractions was counted repeatedly over the course of ~35 days in order to gauge the decay rate and assess the radionuclidic purity of the isolated $^{224}$Ra. FIG. 13 (B) shows that the rate of activity diminishment of the C3 elution product tracks with the theoretical $^{224}$Ra rate of decay across several orders of magnitude. Importantly, the decay rate data indicates that no $^{228}$Th is present in the $^{224}$Ra product fraction, at least down to ~0.1% of the original activity fraction.

Referring next to FIG. 14, the recovery of $^{228}$Th from M1 of C1 can be performed. In accordance with example implementations, methods for separating Ra from Pb, Bi, and Th can include separating one or more of Bi and/or Th from the Ra. The separating can associate Th and/or some of the Bi with a media (M1). The method can further include disassociating the Bi and/or Th from the media (M1) to form a mixture comprising the Bi and Th and transferring the mixture to a vessel housing at least Ra and additional Bi and/or Th. In accordance with some implementations, this vessel can be considered a "cow" that through decay generates additional Ra which can be used to initiate step A. In accordance with alternative implementations, to avoid a tremendous radiation dose to the C1 resin, the Th can be eluted and keep separate from the polymer-based AnIX resin of C1.

Th was eluted from the AnIX$_{poly}$ media (M1) using 5 mL 8 M HCl. (Th can be eluted from 1M to 12M). About 8M will be sufficient if the concentration is sufficient to elute the Bi and/or Th. FIG. 15 (A) shows the resulting spectra from these Th elute fractions. The first and second elutions showed most of the recovered Th. Additionally, it was observed that $^{212}$Bi and $^{208}$Tl were co-eluted with $^{228}$Th, primarily in the first elute fraction. Complete $^{228}$Th recovery from the AnIX$_{poly}$ media (M1) was not possible in a 5 mL delivery of 8 M HCl. A direct count of C1 post-elution indicated that some fraction of Th remained on the column FIG. 15 (B). Subsequent to this $^{228}$Th retention observation, 5 mL of 0.05 M EDTA (pH ~3.5) was passed through C1. This secondary elution treatment can provide Th removal from the M1.

Referring next to FIGS. 16 and 17, fluidic systems capable of performing the methods of the present disclosure in a fully automated fashion are provided. The fluidic system architecture is presented as a schematic in FIG. 16. The system was designed with an eye towards operation remotely or in a shielded facility. Two digital syringe pumps (SP1, SP2) are responsible for reagent delivery to the vessels (C1, C2, and C3); these pumps can be located outside of the shielded zone to eliminate chances of radiolytic or chemical degradation.

Within the shielded zone can be a third syringe pump (SP3). This pump can include a stepper motor and a disposable plastic syringe, for example. A role of SP3 is to withdraw the $^{228}$Th "cow" solution (the first mixture, for example) into the sample injection loop indicated at the top of FIG. 16 and in FIG. 17(B) (upper left of image). Once the cow is loaded into the loop, the digital syringe pumps located outside of the shielded zone can access the cow solution in the loop and direct it through the columns.

As the stepper motor can drive the syringe pump from voltage signals originating outside the shielded zone, and the stepper motor has no integrated circuits within it, the chances of radiolytic degradation of this component is small. For example, two of these stepper motors can be irradiated using a $^{208}$ R/hr $^{137}$Cs source within a hot cell. The motors received a total dose of 33,700 R over the course of 6.75 days. After removal of the motors from the hot cell, each was tested for functionality; both remained functional.

The fluids can be routed through a multitude of pathways using Teflon FEP tubing for example and solenoid-actuated valves that feature fluoropolymer wetted surfaces for example (FIG. 18 (B)). As the solenoids are electromagnetically actuated by voltages applied from outside the shielded zone, the potential for radiation-based component failure are low. The fluidic system can be routinely utilized in a radiological fume hood (or in a glove box or shielded location using multi-mCi levels of $^{228}$Th/224Ra) using $^{228}$Th/$^{224}$Ra spiked solutions.

$^{228}$Th elution performance on AnIX$_{poly}$ resin between 1 M and 8 M HCl were compared. The results are shown in FIG. 18.

As shown, the 8 M HCl demonstrated better $^{228}$Th elution performance than in 1 M HCl on the AnIXpoly resin columns. TEVA resin is an extraction chromatographic resin loaded with Aliquat 336, an organic quaternary ammonium salt. The load/wash "a"/elute performance of $^{228}$Th on 1 cc TEVA resin columns was evaluated. Load/wash "a" was again performed using 6 M HNO$_3$, and elution was performed at 1 M and 8 M HCl.

The $^{228}$Th load/wash "a" performance from C1 (1 cc TEVA resin) is shown in FIGS. 19 (A and B). No discernable break-through of $^{228}$Th was observed. As with MP-1 M resin, $^{212}$Bi and $^{208}$11 had low retention; they began breaking through the column at the third load/wash "a" fraction.

The subsequent C1 $^{228}$Th elutions from TEVA resin with 1 M (FIGS. 20 (A) and 8 M HCl (FIG. 20 (B)) are shown. Here, the reduced HCl concentration results in improved $^{228}$Th recovery relative to that obtained from the stronger HCl concentration eluent. The use of lower concentration HCl is advantageous in a shielded environment, as less corrosion to the containment and equipment would be anticipated.

The 1 cc column elution recovery fractions for $^{228}$Th from FIG. 18 (MP-1 M) and FIG. 20 (TEVA resin) for 1 M ((A)/(B)) and 8 M ((C)/(D)) HCl eluents are provided in Table 4. From this table, it can be concluded that the optimal $^{228}$Th elution recovery is obtained from a TEVA resin column, using 1 M HCl as the eluting solution.

TABLE 4

$^{228}$Th column yields (%) for MP-1M and TEVA resin columns (1 cm$^3$) as a function of ~1 mL elution fraction volumes in 1M and 8M HCl. Primary recovery fractions are indicated in large bolded print.

| Elution fraction (~1 mL) | TEVA resin, 1M HCl elute | TEVA resin, 8M HCl elute | MP-1M, 1M HCl elute | MP-1M, 8M HCl elute |
|---|---|---|---|---|
| 1 | 0.09% | 0.51% | 1.46% | 0.97% |
| 2 | 93.93% | 86.97% | 16.31% | 73.67% |
| 3 | 3.29% | 1.75% | 5.59% | 4.99% |
| 4 | 0.33% | 0.67% | 3.99% | 3.05% |
| 5 | 0.32% | 0.57% | 3.10% | 3.15% |
| 6 | 0.04% | 0.20% | 2.53% | 0.86% |
| 7 | 0.03% | 0.19% | 2.21% | 0.72% |
| 8 | 0.04% | 0.17% | 1.96% | 0.60% |
| 9 | 0.04% | 0.11% | 1.79% | 0.73% |
| 10 | 0.03% | 0.21% | 1.83% | 0.80% |
| Cumulative HCl elute | 98.13% | 91.35% | 40.77% | 89.53% |
| EDTA strip $^a$ | 0.19% | 2.88% | 23.22% | 2.70% |
| Total recovery | 98.32% | 94.23% | 63.99% | 92.23% |

$^a$ Cumulative activity fraction from a 5 mL 0.05M EDTA (pH 3.5) strip, applied at the conclusion of the HCl elution.

As shown in Table 4, TEVA resin and MP-1M can have a roughly equivalent ability to adsorb $^{228}$Th from a load solution in a 6 M HNO$_3$ matrix. 8 M HCl provides better (but incomplete) $^{228}$Th elution from MP-1M relative to 1 M HCl. TEVA resin can provide improved $^{228}$Th elution profiles relative to MP-1 M in both 1 M and 8 M HCl. $^{228}$Th elution profiles from TEVA resin are better in 1 M HCl vs. 8 M HCl.

Other column geometries and volumes may be utilized as well. For example, the 1 cc SPE column geometry described above (0.56×4.1 cm) as well as 0.61×0.865 cm (0.25 cc volume, QML cartridge).

The results of the evaluation are shown in FIG. 21 (A), where the $^{228}$Th elution profile is plotted (fractions were aged 32 days to allow $^{228}$Th progeny ingrowth). The smaller-volume column resulted in earlier $^{228}$Th release; $^{228}$Th yield reached ~96% after a 3 mL elution (FIG. 21 (B)). In comparison, the 1 cc column began its elution at the 2nd 1 mL fraction, and recovery reached ~94% after a 3 mL elution. These recoveries are within experimental uncertainty of each other.

Parallel column evaluations were performed with identical $^{228}$Th load solutions (6 M HNO$_3$) through a 1 cc and a 0.25 cc column of TEVA resin. The load effluents, which contain $^{224}$Ra, were collected and aged over a ~1 month period. The decay rate of the $^{224}$Ra-bearing TEVA effluent fraction can be used to determine its degree of purity from $^{228}$Th. The results are shown in FIG. 22 (A) for a 1 cc and in FIG. 22 (B) for a 0.25 cc TEVA media. There is a divergence of the $^{224}$Ra-bearing fraction decay rate from the theoretical $^{224}$Ra decay rate lay beyond ~28 d for the 1 cc column and beyond ~12 d for the 0.25 cc column. The 0.25 cc column exhibits significantly greater $^{228}$Th breakthrough during the load step than the 1 cc column.

TABLE 5

TEVA resin cartridges and column evaluated for $^{228}$Th sorption, desorption, and breakthrough. [a]

| Col. ID | Inner radius, cm (top, bottom) | Height, cm | Calc. volume, cm$^3$ | Residence time, s [b, c] | Linear flow velocity, cm/s [b] |
|---|---|---|---|---|---|
| 2 mL Cartridge | 0.46 0.43 | 2.58 | 1.60 | 1.45 | 0.40 |
| 1 cm$^3$ SPE tube | 0.28 0.28 | 4.50 | 1.11 | 1.00 | 1.00 |
| 1 mL Cartridge | 0.46 0.43 | 1.37 | 0.85 | 0.77 | 0.40 |
| HML Cartridge [d] | 0.43 0.42 | 0.70 | 0.39 | 0.36 | 0.43 |
| QML Cartridge [e] | 0.30 0.29 | 0.77 | 0.21 | 0.19 | 0.90 |

[a] Some column chambers are slightly tapered cylinders; reported volumes based on a conical frustum.
[b] Normalized value, relative to the 1 cm$^3$ SPE column
[c] Transit time for non-retained species in the resin bed.
[d] HML = "half-milliliter"
QML = "quarter-milliliter In both cases, the column effluent fractions were aged over 30 days to allow for nearly complete $^{228}$Th progeny ingrowth. The resulting $^{228}$Th+progeny gamma spectra was used to quantify the $^{228}$Th activity in each fraction.

The four TEVA resin cartridges and the TEVA resin SPE column listed in Table 5 received identical $^{228}$Th-spiked solutions in 6 M HNO$_3$. Delivered flow rate was 1 mL/min. C1 effluents were collected and aged for up to two months. During this time, the decay rate of each $^{224}$Ra-bearing TEVA load/wash "a" effluent fractions were tracked to determine its degree of purity over $^{228}$Th. The results are shown in FIG. 23 for the four machine-packed cartridges and FIG. 24 (A) for the hand-packed 1 cc SPE tube.

Accordingly, a 1 cc and 0.25 cc TEVA resin provided roughly equivalent $^{228}$Th elution yields after a 3 mL elution volume in 1 M HCl (FIG. 21). The 1 cc TEVA resin retained a greater fraction of $^{228}$Th during the load/wash "a" step than the 0.25 cc column volume, as some $^{228}$Th breakthrough was observed (FIG. 22). The 1 cc TEVA resin therefore provides a higher purity $^{224}$Ra fraction passing into the remaining fluidic system.

The measured column load fraction activity values can begin to deviate from the theoretical $^{224}$Ra decay curve at progressively earlier elapsed times as the cartridge bed volume decreases. These observed decay curve deviations can be related to increasing levels of $^{228}$Th in the $^{224}$Ra-bearing column load fractions. Next, the $^{228}$Th decay profile can be fitted atop the data points that lay beyond 40 elapsed days. Extrapolation of the curve to the y-intercept provided an estimate of the $^{228}$Th activity fraction present in the $^{224}$Ra-bearing column load effluents. It is observed that the calculated $^{228}$Th activity fraction increases as the TEVA cartridge volume decreases (FIG. 23, grey dashed lines also show this).

These calculated $^{228}$Th activity fractions are presented in Table 6A. From these, $^{228}$Th decontamination factors (DF) in the $^{224}$Ra-bearing TEVA column load fractions can be obtained. The QML cartridge (the smallest TEVA resin bed volume evaluated) had a surprisingly high calculated $^{228}$Th load/wash "a" breakthrough of ~1.6% (DF=61). This breakthrough fraction can be reduced to 0.018% for the largest bed volume (2 mL) cartridge (DF=548).

TABLE 6A

Observed performance of TEVA resin columns/cartridges of the resin bed geometries listed in Table 5: $^{228}$Th decontamination factors (DF) in the $^{224}$Ra elution fraction, and $^{228}$Th yields from the load/wash/elute process.

| Col. ID | $^{228}$Th activity Fraction (×10$^{-3}$) [a] | $^{228}$Th DF [b] | $^{228}$Th elution yields, % [c] |
|---|---|---|---|
| 2 mL Cartridge | 1.82 | 548 | 95 |
| 1 cm$^3$ SPE tube | 1.20 | 833 | 98 |
| 1 mL Cartridge | 2.65 | 377 | 97 |
| HML Cartridge [d] | 7.47 | 134 | 94 |
| QML Cartridge [e] | 16.3 | 61 | 94 |

[a] Values based on $^{228}$Th "load" fraction decay profiles.
[b] Obtained from the inverse of $^{228}$Th activity fraction
[c] Values based on sum of column load/wash/elute fractions (see cumulative yield traces in FIG. 22 and FIG. 23).
[d] HML = "half-milliliter"
[e] QML = "quarter-milliliter"

It is interesting to note that the $^{228}$Th activity fractions for the four TEVA resin cartridge type load/wash "a" effluents follow a negative power function when modeled against each cartridge's resin bed volume (provided in Table 5). The modeled curve is y=0.00268x$^{-1.1112}$ (R$^2$=0.9797), and, the 1 cc SPE tube activity fraction does not fit this curve.

It is noted that the data presented may indicate that the hand-packed 1 cc SPE tube provided the highest $^{228}$Th decontamination factor (even higher than the 2 cc TEVA cartridge).

The second cartridge/column performance evaluation was to assess the quality of the $^{228}$Th elution profile. After the load/wash "a" solution had been delivered to each of the TEVA cartridges shown in Table 6A, the $^{228}$Th was eluted with 10 mL of 1 M HCl, delivered at 1 mL/min. Approximately 1 mL fractions were collected. The cumulative $^{228}$Th fraction yields are shown for the four TEVA resin cartridge types in FIG. 25 and the TEVA resin in SPE tube column in FIG. 24 (B).

The $^{228}$Th elution profiles are consistent with the anticipated peak broadening associated with increasing TEVA resin bed volumes. However, even for the largest (2 mL) TEVA cartridge, the $^{228}$Th recovery was virtually complete after the third fraction. The $^{228}$Th cumulative yield for the 1 cc SPE tube is shown in FIG. 24 (B); its yield is likewise virtually complete after 3 mL of eluent. The $^{228}$Th elution yields, calculated from the sum of all load/wash/elute fractions, is shown in Table 6A. $^{228}$Th elution yields between 94% and 98% were observed, and this spread is within experimental uncertainty.

The machine-packed/commercially available TEVA cartridges exhibited $^{228}$Th breakthrough levels that increased with decreasing cartridge bed volume. The hand-packed 1 cc SPE tube provided the least degree of $^{228}$Th breakthrough vs. the cartridges. The TEVA SPE vessel and cartridges exhibited nearly complete $^{228}$Th elutions after 3 mL of 1 M HCl eluent had been delivered at 1 mL/min. Overall, the hand-packed 1 cc SPE TEVA column provided a higher-purity $^{224}$Ra fraction relative to the machine-packed TEVA cartridges.

Regarding Media M2, the 18-crown-6 ether extracting agent on the Sr Resin column has strong affinity for Pb(II) ions, and low affinity for Ra(II) ions and Bi(III) ions in HNO$_3$. Consequently, $^{224}$Ra is able to pass through the Sr Resin column be collected onto C3, Ra-01 resin). The $^{212}$Bi and $^{208}$Tl, which passed with $^{224}$Ra through the C2, are likewise unretained on Col. 3, so this dose-causing radionuclide pair is sent to waste while $^{224}$Ra is being loaded. The $^{212}$Pb removal by C2, and the transference to waste of $^{212}$Bi/$^{288}$Tl following C3 can reduce the radiological dose imparted by $^{224}$Ra progeny.

The HML (0.41 cc) and QML (0.25 cc) cartridges both from Eichrom, as shown in FIG. 26 may be used for M2. The Sr Resin-bearing cartridges were loaded into the triple-column system in the C2 slot, and the C1 slot was configured with 1 cc TEVA resin columns. No C3 was installed. Flow rate was 1 mL/min. C1→>C2 effluent fractions of ~1 mL each were collected during the column load+wash "a" steps, wherein the load solution was $^{228}$Th in secular equilibrium with $^{224}$RA and its progeny.

The results for the 0.41 cc HML and the 0.25 cc QML cartridge effluents are shown in FIG. 27 (A) and FIG. 27 (B), respectively. The gamma spectra (FIG. 27) are virtually the same; in both cases, $^{212}$Pb was successfully scrubbed from the $^{224}$Ra-bearing stream. The cartridges are between 0.41 cc and 0.25 cc in volume, and each of these performed virtually the same at removing $^{212}$Pb from the $^{224}$Ra-bearing load stream.

In accordance with another example implementation, $^{228}$Th/$^{224}$Ra can be provided as a solution directly through C3, and C3 effluent fractions collected throughout the process.

Referring to FIGS. 27(C) and (D) and Table 6B below, in accordance with yet another implementation, C2 can be removed from the triple-column method. Without the presence of C2, both Pb and Ra emerging from the AnIX column may bind onto a Ra-01 column, and Ra separated therefrom. Pb can be selectively removed from the column using a chelator such as EDTA that is adjusted to a pH below the point where Ra(II)/EDTA complex forms. Per FIG. 32, Ra is not complexed to EDTA below a pH of ~4. However, Pb(II) is fully complexed with EDTA above a pH of around 2, with a 50% complexation at a pH around 1.3. Therefore, a solution of EDTA with a pH 3.5 can be provided through the column, which selectively complexed $^{212}$Pb and eluted it from the column while leaving $^{224}$Ra on the column (Pb/EDTA complex is retained at a much lower pH, so at pH 3.5, Pb/EDTA complex is 100% speciated). Next, a solution of EDTA with a pH 11 (or a pH greater than ~6) can be provided to the C3 to remove the Pb-free $^{224}$Ra.

FIG. 27C depicts metals speciation comparison i) Pb/Pb-EDTA; ii) Bi/Bi-EDTA; iii) Th/Th-EDTA; and iv) Ra/Ra-EDTA along the same pH spectrum.

FIG. 27 D i and ii, depicts separation of $^{224}$Ra from $^{212}$Bi and $^{212}$Pb using Ra-01 resin column (3×50 mm) via protocol listed in Table 12. Column effluent fraction categories are designated at top. Legend is elapsed days between column run and gamma analysis of fractions. (Right) Select elapsed time series indicates radionuclides present across the separation protocol.

TABLE 6B

Protocol for loading $^{224}$Ra solution onto Ra-01 resin column, eluting $^{212}$Pb, and eluting $^{224}$Ra. [a]

| Step | Reagent | Volume, mL | Elapsed vol., mL [b] |
|---|---|---|---|
| Condition | 2M HNO$_3$ | 3 | — |
| Load | 2M HNO$_3$ + $^{224}$Ra | 3 | 3 |
| Wash | 2M HNO$_3$ | 5 | 8 |
| $^{212}$Pb elute | 0.05M EDTA, pH 3.5 | 5 | 13 |
| $^{224}$Ra elute | 0.05M EDTA, pH 11.05 | 5 | 18 |
| Rinse | DI H$_2$O | 3 | 21 |

[a] Solution flow rate = 0.5 mL/min; column dimensions = 3 × 50 mm (0.35 cm$^3$).
[b] Elapsed volumes correlate to subsequent column effluent gamma activity plots.

The load+wash "a" fraction gamma spectra are shown in FIG. 28 (A), and the wash "b" fractions are shown in FIG. 28 (B). $^{228}$Th can be eliminated from the Ra-01 column during the wash "a" steps. During the wash "b" steps, no $^{228}$Th is apparent; the $^{228}$Th has been largely eliminated from C3. This data indicates that any $^{228}$Th that may break through C1 and into the downstream fluidic system during the load/wash "a" step would pass, unretained, through the Ra-01 resin.

The spectra in FIG. 28 also indicates that $^{212}$Bi/$^{208}$Tl is largely unretained on the Ra-01. There is an obvious absence of $^{212}$Pb in the Ra-01 effluent fractions; $^{212}$Pb is retained on Ra-01 resin (which is why C2 (Sr Resin) is upstream to the Ra-01 resin column to strip it out).

In accordance with example implementations, a water wash can be placed between wash "b" and the $^{224}$Ra elution step. The water would be used to remove residual H±ions from the column prior to the introduction of the pH ~11 $^{224}$Ra eluent solution.

It is preferable that the wash "a" volume is sufficient to assure passage of $^{224}$Ra through C1 and onto C2/C3 (Step A), and the wash "b" volume is sufficient to assure passage of $^{224}$Ra through C2 and onto C3 (Step B). The load/wash "a" volumes shown in FIG. 29 are therefore more than adequate to accomplish the Step A objective.

The impact of the water wash through the Ra-01 resin is shown in FIG. 30 (A). $^{212}$Pb (retained on the Ra-01 column due to the lack of C2 upstream in this experiment) is removed from the vessel in water. An evaluation of the decay rate of these column effluent fractions indicated that $^{224}$Ra was not present (FIG. 30 (B)). Therefore, indications were that the water wash could be employed to eliminate excess H+ions (preventing EDTA precipitation) and further remove $^{212}$Pb from the Ra-01 resin (thus reducing $^{224}$Ra product dose) without impacting $^{224}$Ra elution yield.

Following the water wash, the Ra-01 resin contained isolated $^{224}$Ra. The $^{224}$Ra was eluted using the EDTA solution, and the eluent fraction's decay rate was monitored to evaluate its radionuclidic purity.

The results presented in FIG. 30 indicate that the addition of a water wash between wash "a" and the $^{224}$Ra elution serves to eliminate H±ions from the column, which in turn eliminates acidification of the basic EDTA-based $^{224}$Ra eluent. Additionally, the water wash was observed to remove $^{212}$Pb from the column, while $^{224}$Ra was retained.

The results presented in FIG. 31 indicate that the single-column (C3) separation of $^{224}$Ra from $^{228}$Th with the Ra-01 resin in this experiment was capable of a 1000-fold decontamination factor (decontamination factor determination was limited by dynamic range of the analysis method). In other words, ~0.1% of any $^{228}$Th that manages to break through C1 during the load/wash "a" step (the two steps wherein all three columns are inter-connected) would be expected to be found in the $^{224}$Ra elute. It is believed that the Cl $^{228}$Th retention factor is at least 500. If this is so, then the approximate $^{228}$Th decontamination factor across the entire triple-column method is 5×10$^5$.

While the radionuclidic purity of $^{224}$Ra is essential in providing a robust isotope product, it is just as important that the output of the triple-column method be amenable to existing and future $^{224}$Ra/$^{212}$Pb generators.

For the existing $^{224}$Ra/$^{212}$Pb generator design, the $^{224}$Ra source is loaded onto a CatIX resin column (using AG MP-50 resin beads). Therefore, the Ra output from the triple-column method should be amenable to direct loading onto CatIX resin. Unfortunately, the purified Ra product, delivered in dilute EDTA solution (pH adjusted to >7), will not bind to CatIX resin as a free divalent cation; according to the speciation plots for Ra/EDTA mixtures (FIG. 32), Ra is completely bound to EDTA above pH 7. The chelated complex likely progresses from [Ra(EDTA)]$^-$ to [Ra(EDTA)]$^{2-}$ as the pH increases above 7. However, at pH values near 5, the Ra/EDTA complex is ~50%, and at pH values ≤4, the Ra$^{2+}$ cation is completely dissociated from the EDTA complex.

Referring to FIG. 1 above and with reference to module 4, free element production, systems and/or methods for producing a free element are provided. The system/methods can include providing a mixing vessel in fluid communication with both a bound element source and an acid source. The mixing vessel can be operably configured to mix contents within the mixing vessel. The systems can include a first multiport valve operably engaged with an exit of the mixing vessel, and a second multiport valve operably engaged with the first multiport valve, the acid source, and a collection vessel.

As detailed below the element can be Ra, however, as described above, other elements can be processed using these systems and/or methods.

Methods for producing free element from a bound element are also provided. The methods can include: providing a solution comprising an element bound to a complex; exposing the solution to a precipitating solution to precipitate the complex binding the element and produce a free element solution; and transferring the free element solution to a collection vessel.

The systems/methods can include separating the Ra from a solution comprising Ra and Th to form the solution comprising Ra bound to EDTA. The solution of the Ra bound to the EDTA has a pH greater than 11, and the free element solution can include Ra and has a pH less than 4 or even less than 2.

As provided herein, lowering the $^{224}$Ra/EDTA product solution pH to 4 will result in free Ra$^{2+}$ cation in solution. The schematic shown in FIG. 33 provides a pathway for preparing and binding free Ra$^{2+}$ onto a generator column packed with AG MP-50 CatIX resin.

One milliliter of the isolated $^{224}$Ra product (5 mL) resulting from the triple-column separation can be acidified using 21.7 µL of concentrated HCl (0.26 mmoles H+ added). Next, the acidified solution can be delivered to a MP-50 resin at 0.5 mL/min. The data in FIG. 36(a) shows the activity observed in the column load effluent fraction as a function of elapsed days. Virtually no activity is present in the column effluent solution. Subsequent to media load, the media can be washed with four 1 mL fractions of dilute HCl solution (FIG. 34 (B)). An elution of a short-lived daughter isotope may be observed immediately after the fractions were collected; the isotope can decay away within the first ~0.18 days (~4 h), and this shows no bleed-through of $^{224}$Ra during the wash. Continuous counting of the CatIX media over ~7 days shows the characteristic decay rate of $^{224}$Ra beyond ~1.6 days (FIG. 34 (C)).

The results in FIG. 34 indicate that acidification of the isolated $^{224}$Ra product fraction from the triple-column method can provide for quantitative loading of the $^{224}$Ra onto a CatIX media. Accordingly, the triple-column method appears to be well suited to the subsequent $^{224}$Ra/$^{212}$Pb generator column preparation via a solution acidification step.

As can be seen in FIG. 35, at least one schematic depiction of the preparation of the free isotope ($^{224}$Ra$^{2+}$) is shown. The chemical modification chamber or mixing vessel can receive the bound isotope ($^{224}$Ra/EDTA) eluent directly from the triple-column method (Step D of FIG. 12 above) for example. Within this chamber, acid can be injected to reduce the solution pH to a point in which the Ra/EDTA complex is eliminated or uncoupled, thereby producing free isotopes ($^{224}$Ra$^{2+}$)ions in solution (per FIG. 32). A stir bar can be used for mixing of acid into the $^{224}$Ra eluent.

If the solution is acidified to <~pH 2, not only does the $^{224}$Ra$^{2+}$ dissociate from the Ra/EDTA complex, but the EDTA precipitates from the solution. Once the EDTA precipitate is fully formed, the supernate can be withdrawn from the base of the chemical modification chamber or mixing vessel, through a hydrophobic polyethylene frit for example, thereby removing the precipitated EDTA crystals from the $^{224}$Ra$^{2+}$ solution.

TABLE 7

Syringe pump distribution valve port and descriptions of system illustrated in FIG. 35.

| Port | Port Description |
| --- | --- |
| 1 | Waste (out) |
| 2 | DI water (in) |
| 3 | Acid (in) |
| 4 | Closed |
| 5 | Air (in) |
| 6 | Ra/EDTA acidification line (out) |
| 7 | Ra filtrate line (in) |
| 8 | Col. packing system line (out) |

In accordance with another example configuration, system 100 is shown in FIG. 36. As shown, system 100 can include a mixing vessel 110 that is in fluid communication with both a bound isotope source 112 and an acid source 114. In accordance with example implementations, the bound isotope source can be a source as described herein with reference to the separation of elemental Ra from thorium, for example. In accordance with other example implementations, the acid source 114 can be a syringe pump that can be mechanically controlled, for example. Mixing vessel 110 can be configured to mix contents therein utilizing, for example, a magnetic mixer such as magnetic mixer 116 that is placed lateral or underneath or about in an operable configuration of mixing vessel 110 that contains magnetic stirrer 130.

System 100 can also include first and second multiport valves with first multiport valve 118 being operably connected to the exit 124 of mixing vessel 110 and a second multiport valve 120 that can be operably connected to first multiport valve 118 as well as the acid source 114 and a collection vessel 126. In accordance with example configurations, the element being freed can be Ra such as $^{224}$Ra. The element can be freed from a complexing agent such as a chelating agent. Example chelating agents can include but are not limited to EDTA. As described, the first and second multiport valves can be configured to be operated remotely, and this system can be coupled in tandem with a Ra production system such as that described earlier for isolating Ra from Th.

In accordance with at least one example implementation, mixing vessel 110 can be a 5 mL Rezorian™ column (Supelco, Bellefonte, PA) fitted with a hydrophobic polyethylene (PE) frit 135 (Scientific Commodities Inc., Lake Havasu City, AZ), a PTFE Spinplus® magnetic stir bar 130 (SP Scienceware, Wayne, NJ), a one-way stopcock valve 118 (Cole-Parmer, Vernon Hills, IL), a 0.45 μm PES filter 131 (Pall, Port Washington, NY), a 12 mL disposable polypropylene syringe 114 (Thermo Fischer Scientific, Waltham, MA), and a "Multi-Stirrus" magnetic vertical mixer 116 (V&P Scientific, San Diego, CA).

In accordance with example methods, the 5 mL Rezorian™ tube can receive an aliquoted volume of $^{224}$Ra-EDTA solution from the triple-column system's column 3 (C3) $^{224}$Ra elution. An inlayed hydrophobic frit (positioned at the base of the Rezorian tube) and connected one-way stopcock valve (set to "closed") were utilized to prevent the $^{224}$Ra-bearing solution from leaking through the bottom port. An aliquot of mineral acid can be added the $^{224}$Ra/EDTA solution in the Rezorian tube to lower the pH, thus forming insoluble EDTA that precipitated out of solution. The vertical magnetic mixer can be used to create a magnetic field, driving the magnetic stir bar to mix the acid/Ra/EDTA solution and enhance precipitation rate. Once the EDTA precipitation was complete, the stopcock valve can be opened and the EDTA-removed $^{224}$Ra supernate can be withdrawn from the Rezorian tube through the hydrophobic frit and into the syringe barrel. An additional syringe filter can be added to the line between the syringe barrel and the $^{224}$Ra collection vessel to remove any fine EDTA particulates that may have passed through the larger-pored hydrophobic frit.

A schematic of the automated in-line EDTA precipitation and filtration system is shown in FIG. 36. The automated version of the precipitation and filtration system can employ an inverted digital syringe pump 114 (SP, 48,000 steps, IMI Norgren, Littleton, CO) with 8-port distribution valve 120, a three-way stopcock 118 (Cole-Parmer, Vernon Hills, IL) which can be controlled by servo motor (SvM, Dsservo, Dongguan, Guangdong, China), a "Multi-Stirrus" vertical magnetic spinning device 116, and a 0.45 μm PES filter connected to a $^{224}$Ra collection vessel. Port assignments, flow direction, and port designation for the SP are listed in Table 8. Each component in the system is described below in more detail. Operation of the SP, the vertical magnetic mixer, and SvM can be controlled via processing circuitry through a software.

The present disclosure provides systems and/or methods that can be performed advantageously with the assistance of processing circuitry. The processing circuitry can include personal computing system that includes a computer processing unit that can include one or more microprocessors, one or more support circuits, circuits that include power supplies, clocks, input/output interfaces, circuitry, and the like. Generally, all computer processing units described herein can be of the same general type. The computing system can include a memory that can include random access memory, read only memory, removable disc memory, flash memory, and various combinations of these types of memory. The memory can be referred to as a main memory and be part of a cache memory or buffer memory. The memory can store various software packages and components such as an operating system.

The computing system may also include a web server that can be of any type of computing device adapted to distribute data and process data requests. The web server can be configured to execute system application software such as the reminder schedule software, databases, electronic mail, and the like. The memory of the web server can include system application interfaces for interacting with users and one or more third party applications. Computer systems of the present disclosure can be standalone or work in combination with other servers and other computer systems that can be utilized, for example, with larger corporate systems such as financial institutions, insurance providers, and/or software support providers. The system is not limited to a specific operating system but may be adapted to run on multiple operating systems such as, for example, Linux and/or Microsoft Windows. The computing system can be coupled to a server and this server can be located on the same site as computer system or at a remote location, for example.

In accordance with example implementations, these processes may be utilized in connection with the processing circuitry described. The processes may use software and/or hardware of the following combinations or types. For example, with respect to server-side languages, the circuitry may use Java, Python, PHP, .NET, Ruby, Javascript, or Dart, for example. Some other types of servers that the systems may use include Apache/PHP, .NET, Ruby, NodeJS, Java, and/or Python. Databases that may be utilized are Oracle, MySQL, SQL, NoSQL, or SQLLite (for Mobile). Client-side languages that may be used, this would be the user side languages, for example, are ASM, C, C++, C#, Java, Objective-C, Swift, Actionscript/Adobe AIR, or Javascript/HTML5. Communications between the server and client may be utilized using TCP/UDP Socket based connections, for example, as Third Party data network services that may be used include GSM, LTE, HSPA, UMTS, CDMA, WiMax, WiFi, Cable, and DSL. The hardware platforms that may be utilized within processing circuitry include embedded systems such as (Raspberry Pl/Arduino), (Android, iOS, Windows Mobile)—phones and/or tablets, or any embedded system using these operating systems, i.e., cars, watches, glasses, headphones, augmented reality wear etc., or desktops/laptops/hybrids (Mac, Windows, Linux). The architectures that may be utilized for software and hardware interfaces include x86 (including x86-64), or ARM.

In accordance with example implementations, servos for engaging single or multiport valves as well as mechanical or electric switches for engaging valves can be configured according to software and/or hardware to engage/disengage upon achieving and endpoint such as a temperature, a time, a pressure, a volume, etc. Accordingly, much of the systems and methods of the present disclosure can be performed remotely from a processing circuitry interface and/or automatically according to a program.

The system can be plumbed with 0.02" or 0.03" or 0.04" ID by 1/16" OD fluorinated ethylene propylene (FEP) tubing (IDEX Health & Science, Oak Harbor, WA) connected to polyether ether ketone (PEEK) ¼-28 flangeless nuts with Tefzel® ferrules (IDEX Health & Science, Oak Harbor, WA) or PEEK 10-32 nuts with PEEK conical ferrules (Valco).

TABLE 8

Description of the 8-position syringe pump distribution valve port assignments for the automated in-line precipitation and filtration system shown in FIG. 36.

| Port assignment | Flow direction | Port designation | Tubing dimensions (ID by OD) |
|---|---|---|---|
| 1 | Out | Waste | 0.02" by 1/16" |
| 2 | In | Deionized (DI) H$_2$O | 0.03" by 1/16" |
| 3 | In | 6M HNO$_3$ | 0.03" by 1/16" |
| 4 | N/A | Closed | N/A |
| 5 | In | Air | 0.03" by 1/16" |
| 6 | Out | Line out to precipitation vessel | 0.02" by 1/16" |
| 7 | In | Line in from precipitation vessel | 0.04" by 1/16" |
| 8 | Out | Line out to $^{224}$Ra collection vessel | 0.02" by 1/16" |

The automated in-line precipitation and filtration system can utilize the same precipitation vessel described herein with the addition of a teflon cap fitted with tubing lines and an activated charcoal trap to filter $^{220}$Rn emanation from the air space above the $^{224}$Ra-bearing solution. The $^{224}$Ra-EDTA solution can be dispensed from the triple column purification system through one of these tubing lines, while the other was used to dispense mineral acid into the $^{224}$Ra-bearing eluent. EDTA precipitation rate was enhanced by the use of the vertical magnetic stirrer.

In the automated filtration process, the three-way stopcock valve with three ports can connect the holding vessel to the digital syringe pump, and to add a rinse vessel line that was used to clear the line of residual $^{224}$Ra-bearing liquid. The stopcock valve can be connected to a servo motor (SvM) which is operable between each port. The inverted syringe pump with 8-port distribution valve was utilized to aspirate the supernate before dispensing it through the 0.45 μm filter and into the $^{224}$Ra collection vessel as shown in FIG. 36.

With reference to FIG. 37, a custom holder can be provided to hold the precipitation vessel, servo motor, and vertical mixer in proximity. The component bracket was designed with Solidworks2017 (Dassault Systems, Waltham, MA) and 3D printed on a uPrint SE Plus (Stratasys, Eden Prairie, MN).

Referring to FIG. 38, an image of a pre acidified $^{224}$Ra-EDTA solution (a), precipitation forming solution (b), and post precipitation solution (c) is shown.

With reference to FIG. 39, configurations of the system for the automated in-line process replicated the method described with the use of two separate tubing lines to receive first the $^{224}$Ra-EDTA solution, and then a small volume of 6 M HNO$_3$ into the precipitation vessel. The precipitation vessel can be configured from a 5 mL Rezorian tube kit with an inlayed 20 μm pore size hydrophobic polyethylene frit at the base, and a Teflon-coated magnetic stir bar. Under magnetic mixing, the acid added to the $^{224}$Ra-EDTA solution reduces the pH, thus causing EDTA to precipitate out of solution while leaving $^{224}$Ra$^{2+}$ in the supernate.

Once the EDTA precipitation was complete, the automated in-line filtration process can be divided into four steps (FIG. 39). In step 1, the servo motor actuated the three-way stopcock valve to 90° and the $^{224}$Ra supernate was aspirated into the inverted syringe pump at a flow rate of 10 mL/min. During this process, the vast majority of the solid EDTA is captured by the frit. In step 2, the supernate in the syringe was dispensed through a 0.45 μm syringe filter and into the $^{224}$Ra collection vessel (d). The in-line filter was used to remove any small EDTA crystals that may have migrated through the Rezorian tube's frit. In step 3, the servo motor actuated the three-way stopcock to 180° to form a singular flow pathway between the rinse vessel, and the SP. From the rinse vessel, a 250 pL aliquot of 0.01 M HCl (pH 2) was aspirated through the syringe delivery line and into the SP, carrying any residual $^{224}$Ra-bearing droplets left in the tubing to the syringe. In step 4, the pH 2 rinse solution was dispensed through the 0.45 pm filter and into the $^{224}$Ra collection vessel.

In accordance with the systems described above, methods for producing free isotopes are provided that can include providing a solution comprising isotope bound to a complex. In accordance with example implementations, the bound isotope can be in a solution having a pH that is sufficient to bind substantially all of the isotope and/or retain the bound isotope in solution. Additionally, the solution can be adjusted to another pH that decomplexes the isotope from the complex and/or precipitates the complex while leaving substantial amounts of the isotope in solution.

These example solutions include the Ra bound to EDTA, for example. This solution can be exposed to a precipitating solution such as an acidic solution to precipitate the complex binding the isotope and produce a free isotope solution as shown and depicted with reference to the mixing vessels in the previous systems. The methods can further include transferring the free isotope solution to a collection vessel. In accordance with example implementations, the solution of the isotope bound to the complex can have a pH greater than 11. Additionally, the free isotope solution can have a pH less than 2. In accordance with example implementations, these solutions can be conveyed to and/or from the mixing vessel using pressure differentiation techniques that can include suction or positive displacement, for example. Additionally, the methods can include transferring the free element or Ra through a filter to a vessel.

Referring next to FIG. 40, systems and methods are described for producing metal storage/generation vessel assemblies, including particular metals to be stored and/or generated using the vessels. Embodiments of these systems, methods, and assemblies are described with reference to FIGS. 40-63B.

Systems and/or methods for producing a metal storage/generation vessel assemblies are provided. The systems can include: a first mixing vessel in fluid communication with a first and a second multiport valve; a manifold of multiport valves in fluid communication with the second multiport valve; a second mixing vessel in fluid communication with at least one of the multiport valves of the manifold; a third multiport valve in fluid communication with an exit of the second mixing vessel; and a metal storage/generation vessel in fluid communication with the third multiport valve.

The first and second mixing vessels define different volumes. The first mixing vessel defines a volume larger than the volume defined by the second mixing vessel.

Methods for producing a metal storage/generation vessel assembly are also provided. The methods can include: homogenizing a resin slurry in a first mixing vessel; supplementing the homogenized resin slurry with a free element to form a homogenized bound element resin slurry; and transferring the homogenized bound element resin slurry to a storage/generation vessel assembly. As shown and described, the resin/media of the present disclosure, without homogenization will consolidate at the lower portion of the vessel or adhere to other portions of the vessel. Homogenizing herein keeps the resin/media distributed throughout the solution of the vessel. This distribution can be uniform and/or without a heterogenous interface.

Metal storage/generation vessel assemblies are also provided that can include: sidewalls extending between entrance and exit openings to define a vessel volume; inert material proximate the exit opening: unbound resin (catch bed) proximate the exit opening wherein the inert material is between the unbound resin and the exit opening; and a homogenized bound element resin bed within the vessel, the inert material and unbound binding resin being between the resin bed and the exit opening.

Referring first to FIG. 40, an example sequence of events can include homogenizing a resin slurry, metering the resin bed volume to another vessel, and then mixing an element with the slurry mixture, and then transporting the element-loaded slurry to a storage and/or generation assembly 6.

Referring next to FIG. 41, a system 200 is provided. Within this system are two mixing vessels, a first mixing vessel 210 and a second mixing vessel 212. Mixing vessel 210 can be in fluid communication with first and second multiport valves 214 and 216. In accordance with example implementations, system 200 can further include a manifold of multiport valves 218 which can be in fluid communication with multiport valve 216. Mixing vessel 212 can be in fluid communication with at least one of the multiport valves within the manifold 218. System 200 can further include a third multiport valve 220 which is in fluid communication with an exit of mixing vessel 212. System 200 can additionally include a metal storage generation vessel 6 in fluid communication with multiport valve 220. In accordance with example implementations, FIG. 42 is a depiction of an implementation of system 200.

The automated vessel assembly packing system is shown in FIG. 41 and an image of the system in the fume hood is shown in FIG. 42. The systems can include a V6 digital syringe pump (SP, 48,000 steps, IMI Norgren, Littleton, CO) with 8-port distribution valve at its head, a 4-port and 6-port Cheminert selector valve (V4 & V6, Valco, Inc., Houston, TX), a stopcock manifold (SM, Cole-Parmer, Vernon Hills, IL), three servo motors (SvM, Dsservo, Dongguan, Guangdong, China), several solution holding coils (HC), two gas regulators (R1/R2) (McMaster-Carr, Los Angeles, CA), and two solenoid-controlled 3-way isolation valves (SCIV, Bio-Chem, Boonton, NJ). Port assignments for the syringe pump (SP), including flow direction, port designation, and tubing dimensions, are listed in Table 9. Port assignments for the 4-port valve (V4) and 6-port valve (V6) are listed in Table 10 and Table 11, respectively. Each component in the system, and their abbreviated terms, will be described in more detail in the sections below. Operation of the SP, V4, V6, SVMB, and SCIVs using processing circuitry.

TABLE 9

Description of the 8-position syringe pump (SP) distribution valve port assignments.

| Port assignment | Flow direction | Port designation | Tubing dimensions (ID by OD) |
|---|---|---|---|
| 1 | Out | Waste | 0.04" by 1/16" |
| 2 | In | Deionized (DI) H$_2$O | 0.04" by 1/16" |
| 3 | In | 0.25M HCl | 0.04" by 1/16" |
| 4 | In/Out | Excess supernatant coil (ESC) | 0.04" by 1/16" |
| 5 | In | Air | 0.04" by 1/16" |
| 6 | Out | Transport line (TL) | 0.04" by 1/16" |
| 7 | In/Out | Holding coil to V4 (HC/V4) | 0.063" by 1/8" |
| 8 | In/Out | Holding coil to V6 (HC/V6) | 0.063" by 1/8" |

TABLE 10

Description of the 4-position Cheminert selector valve (V4) port assignments.

| Port assignment | Flow direction | Port designation | Tubing dimensions (ID by OD) |
|---|---|---|---|
| 1 | Out | Waste | 0.063" by 1/8" |
| 2 | In | Air | 0.04" by 1/16" |
| 3 | In/Out | Large mixing vessel (LMV) | 0.063" by 1/8" |
| 4 | Out | V4 to 3 stopcock manifold (SM) | 0.063" by 1/8" |
| Center | In/Out | Holding coil to V4 (HC/V4) | 0.063" by 1/8" |

TABLE 11

Description of the 6-position Cheminert selector valve (V6) port assignments.

| Port assignment | Flow direction | Port designation | Tubing dimensions (ID by OD) |
|---|---|---|---|
| 1 | Out | Waste | 0.063" by 1/8" |
| 2 | In | Air | 0.04" by 1/16" |
| 3 | In/Out | Small mixing vessel (SMV) | N/A |
| 4 | In | $^{224}$Ra stock solution | 0.04" by 1/16" |
| 5 | In | 1M HCl | 0.04" by 1/16" |
| 6 | Out | Column body | 0.063" by 1/8" |
| Center | In/Out | Holding coil to V6 (HC/V6) | 0.063" by 1/8" | a. The part was connected without use of tubing.

In accordance with example implementations, the mixing vessels (e.g., LMV and SMV) can define different volumes wherein the first mixing vessel can be a larger volume than the second mixing vessel. In accordance with example implementations and with reference to FIG. 43, an image of a first mixing vessel configured for N$_2$ agitation for mixing is shown. The mixing vessel of FIG. 43 can be considered the first or Large mixing vessel (LMV) and contain a known ratio of CatIX resin to water and is capable of forming a homogeneous suspension of these solid/liquid phases.

Two resin/liquid suspension large mixing vessels (LMVs) were evaluated for the system. The first LMV employed N$_2$ gas or air to create a homogeneous resin/water slurry (LMV). The vessel was a 50 mL polyethylene centrifuge tube containing a reservoir of MP-50 resin and water at a known solid/liquid volume ratio. The LMV had a cap fitted with three holes, through which a N$_2$ gas (inlet) line, a resin slurry aspiration line (outlet), and a N$_2$ gas vent (outlet) port were fixed. A stream of N$_2$ gas or air was used to agitate the resin/water mixture in order to obtain a homogeneous slurry while the slurry aspiration line was used to withdraw a metered volume from the LMV. An image of the LMV as shown in FIG. 43.

Referring next to FIGS. 44A and 44B, a first mixing vessel configuration is disclosed that depicts a mixing vessel that can be mechanically stirred, for example.

Another LMV was evaluated that defined a 50 mL centrifuge tube and resin/water reservoir configured with a plastic vane placed down its center (FIG. 44A). This LMV was in turn positioned onto a base that oscillated in a back-and-forth "washing machine" pattern. The oscillations were driven by a rotating magnetic field using a "Multi-Stirrus" mixer (V&P Scientific, San Diego, CA) that caused angular rotation of the vane, agitating the slurry by turbulent action. Two vanes designs of FIG. 44B were evaluated; they were fabricated with holes along the edges, as shown in FIG. 44B. The slurry aspiration line was used to withdraw a metered volume from the LMV.

In accordance with FIG. 45, a second mixing vessel is depicted that is configured for $N_2$ gas or air mixing that includes a gas inlet and outlet, for example. This second or small mixing vessel (SMV) is configured to 1) receive the aliquoted volume of MP-50 resin (from the LMV) as a slurry, and 2) contact a $^{224}$Ra-bearing solution with the resin slurry received to obtain a homogeneous distribution of $^{224}$Ra adsorbed to the MP-50 resin. The SMV can be defined by a 10 mL polyethylene syringe barrel that was mounted to the V6 valve via a female luer to ¼-28 connector. The tube barrel cap, custom-machined from Teflon FEP, was fitted with four holes through which a $N_2$ gas or air (inlet) line, a resin slurry dispenser (inlet) line, an excess supernatant coil (ESC) line (inlet/outlet), and a $N_2$ gas or air vent (outlet) port were passed. The ESC line, with 2.00±0.02 mL inner volume, could be used to aspirate excessive supernatant from the dispensed resin slurry. The $^{224}$Ra solution could be introduced into the SMV via the V6 valve; the post-contacted $^{224}$Ra/resin slurry mixture could be aspirated from the SMV via the same valve. A stream of $N_2$ gas or air was used to agitate the mixture of resin slurry and $^{224}$Ra solution to affect homogeneous adsorption of $^{224}$Ra onto the resin particles.

In accordance with example configurations and with reference to FIG. 46, a configuration of the manifold 218 of system 200 is shown that includes the configuration of the multiport valves of the manifold, for example. The stopcock manifold (SM) system was constructed from a stack of three 3-way stopcock luer valves (Cole-Farmer). The SM was connected between the V4 and the SMV as a pathway to transport and meter resin for eventual $^{224}$Ra contact in the SMV followed by subsequent column packing. Based on the inner volume of a stopcock (0.120 mL) and a connecting cylinder between either pair of stopcocks (0.130 mL) in the manifold system, a set volume of slurry could be packed and partitioned into a 0.250 mL column bed. A custom trimmed high-density polyethylene 5 mL pipette filter (Eppendorf, Hauppauge, New York, USA) was used as a bottom frit to allow water, but no resin, to pass through the bottom port of the SM. A packed bed of resin therefore forms above the frit.

Configuration of stopcock positions in the SM allowed for a transport line (TL) to push excess resin to waste while the set metered volume was held, and subsequently transported, into the SMV. Adjustment of the stopcock valve positions can be performed using processing circuitry. An image of the SM is shown in FIG. 46, with port designations and flow direction provided in Table 12.

TABLE 12

Description of the stopcock manifold system (SM) shown in FIG. 46 and FIG. 47.

| Port assignment | Flow direction | Port designation | Tubing dimensions (ID by OD) |
|---|---|---|---|
| 1 | In | V4 to stopcock manifold (SM) | 0.063" by ⅛" |
| 2 | Out | Excess resin to waste | 0.063" by ⅛" |
| 3 | In | Transport line (TL) | 0.04" by 1/16" |
| 4 | Out | Small mixing vessel (SMV) | 0.063" by ⅛" |
| 5 | Out | Waste | 0.063" by ⅛" |

A schematic of the SM resin bed metering and partitioning sequence is shown in FIG. 47. Each of the stopcocks within the manifold can be operably engaged with a servo block motor. Referring to FIG. 47, again for moving the slurry between the prep slurry and the generator vessel and/or mixing the slurry with elements is shown with manifold configurations as shown in FIG. 47.

The importance of agitation of the slurry is shown with reference to FIGS. 48-52 that depicts unagitated and agitated slurry in the first mixing vessel, for example.

Two methods were evaluated to promote a homogenous resin suspension from which to feed into the fluidic system. A consistent resin concentration in the LMV was beneficial when aspirating volumes of slurry to deliver adequate resin mass to the SM for precise resin bed metering. In the LMV, a 20 mL resin/water mixture containing 5 cm$^3$ of gravity-settled resin was used. In the SMV, a 4.25 mL resin/water mixture consisting of 0.25 cm$^3$ gravity-settled resin metered from the SM was used.

As discussed, the first method of resin suspension we evaluated employed a stream of $N_2$ gas or air controlled via gas regulator to agitate gravity-settled resin bed causing dispersion of resin beads within the water volume until uniform. We termed the gas-agitated LMV as "LMVg". The regulator was opened at increasing increments of 0.5 pounds per square inch (PSI) followed by 5 minutes of observation to determine if the entire gravity settled resin bed was suspended and became homogenous (i.e., demonstrated no stratification of resin beads with liquid depth). This process was repeated until mixing became overly vigorous. A minimum and maximum PSI was noted for the LMVg and SMV. Images of these vessels in an unagitated and homogeneously agitated state are shown in FIG. 48 (LMVg) and FIG. 49 (SMV).

As discussed, the second method employed a magnetically rotating base (Multi-Stirrus mixer, V&P Scientific, San Diego, CA) to induce an oscillating angular rotation of the LMV. The spin vane-agitated assembly was termed "LMVv". The oscillating vessel containing the fixed vane creating turbulent eddies within the vessel, thus inducing mixing. Angular rotation of the system was increased at increments of 10 revolutions per minute (RPM) followed by 5 minutes of observation to determine if the entire gravity settled resin bed was suspended and became homogenous. This process was repeated until 100 RPM (the maximum) was reached. A minimum and maximum RPM was noted for each of two vane designs evaluated. An image of the LMVv being mixed using vane #1 is shown in FIG. 50.

A method for forming homogeneous resin suspensions in water was evaluated using $N_2$ gas or air agitation. An optimal gas regulator pressure range, which provides proportional gas flow rates, was determined to affect good resin suspension formation. Below this range, a partial suspension (a heterogeneous resin suspension) was formed (FIG. 51(A)). Within this range, a homogenous suspension was formed (FIG. 51 (B)). Beyond this range, resin slurry could be lost or ejected from the LMV (Large Mixing Vessel (gas-agitated resin/water mixture for resin delivery into system) or SMV (Small Mixing Vessel for $^{224}$Ra adsorption onto suspended resin mixture) due to overly vigorous agitation (FIG. 51 (C)). Use of excessive gas flow also enhanced the water evaporation rate, thus eventually altering the resin concentration in the suspension.

The most significant issue caused by overmixing occurs in the SMV after $^{224}$Ra solution has been added. Resin dispersed above the mixing line (at 22.5 mL in FIG. 51 (B)) may not re-incorporate into the suspension due to wall cohesion, leading to a loss in $^{224}$Ra-bound resin loaded onto each generator column due to the lack of resin mixture transferred to the SMV.

A gas regulator pressure range of 1.5 to 2.5 PSI, and 2 to 4 PSI was determined to be optimal for the LMVg, and SMV, respectively. In subsequent studies, the gas regulator pressures were set to 2 PSI for the LMVg and 3 PSI for the SMV to optimize the degree of resin/water mixing.

An evaluation of resin mass delivery using the gas mixing system was performed to determine the resin mass of an aspirated slurry volume as a factor of aspiration/dispensation flow rate. To ensure reproducibility in the column packing system, the slurry aspirated from the LMVg required a consistent resin concentration to deliver a sufficient resin mass. Maximizing resin slurry flow rate is important for reducing the overall time of automated column packing procedure, which will reduce $^{224}$Ra daughter product ingrowth during the process. However, excessive flow rates could cause cavitation of the aspirated solution and needed to be avoided.

Using the determined dry resin density of 0.347±0.009 g/cm$^3$ for a 1 cm$^3$ packed semi-wet column bed, a theoretical resin concentration of 0.087±0.002 g/cm$^3$ was calculated for a uniform 20 mL suspension containing 5 cm$^3$ of gravity-settled resin. Using this theoretical value, delivered resin mass bias could be evaluated against aspirated suspension volumes ranging between 5 and 30 mL/min. Contour plots displaying the empirically measured and calculated dry resin masses as a function of aspirated volume and flow rate are shown in FIG. 52. A comparison of the data sets is shown in Table 13.

TABLE 13

Comparison of empirically determined and calculated resin masses at varied flow rates and aspirated volumes. Mass biases ≥10% are in bold font.

| Flow rate, mL/min | Aspirated vol., cm$^3$ | Determined mass, g | Calculated mass, g | Bias,$^a$ % |
|---|---|---|---|---|
| 5 | 0.5 | 0.035 | 0.043 | −18.8 |
|   | 1 | 0.080 | 0.087 | −7.5 |
|   | 2 | 0.164 | 0.173 | −5.6 |
|   | 3 | 0.247 | 0.260 | −5.2 |
| 10 | 0.5 | 0.035 | 0.043 | −19.5 |
|   | 1 | 0.082 | 0.087 | −5.9 |
|   | 2 | 0.175 | 0.173 | 0.8 |
|   | 3 | 0.257 | 0.260 | −1.1 |
| 20 | 0.5 | 0.037 | 0.043 | −15.3 |
|   | 1 | 0.084 | 0.087 | −3.2 |
|   | 2 | 0.169 | 0.173 | −2.7 |
|   | 3 | 0.246 | 0.260 | −5.4 |
| 30 | 0.5 | 0.038 | 0.043 | −11.7 |
|   | 1 | 0.084 | 0.087 | −2.7 |
|   | 2 | 0.173 | 0.173 | <0.01 |
|   | 3 | 0.250 | 0.260 | −4.0 |

$^a$Relative bias, % = $100 * \left( \frac{\text{Determined Value} - \text{Calculated Value}}{\text{Calculated Value}} \right)$ Contour maps of the calculated and empirical data display a similar mass distribution, with a consistent increase in delivered resin mass relative to increasing aspirated volume. In addition, empirically determined dried resin masses showed a trend of reduced bias as a function of aspirated volume increase for a given flow rate from 0.5 to 3 mL. Minimal loss of resin mass per unit volume was observed (less than 7.5%) for aspirated volumes of at least 1 mL for each flow rate. However, a mass of 0.087 grams is needed to pack a 0.250 cm$^3$ resin bed, based on the determined dry resin density; therefore, aspirated volumes <1 mL would not provide sufficient resin mass at any flow rate.

In the vessel assembly packing method, excess resin mass can be removed during the SM resin metering process, so a larger aspirated volume (~2 mL) can be utilized. Additionally, the method must be performed in a rapid manner due to the ingrowth of short-lived daughter products from $^{224}$Ra. To minimize the elapsed processing time, higher flow rates will be used in the system. Based on the data, aspirating 2 mL at a flow rate of 30 mL/min may be beneficial, as it is rapid and has the lowest relative bias (less than 0.01%).

For the vessel assembly packing sequence, the aspirated volume of resin slurry was reduced to 1.85 mL (0.161 grams), based on the 0.25 cm$^3$ inner volume of the SM. This delivered slurry volume will allow an observable slight resin excess without unnecessary overfilling of the SM.

Referring to FIG. 53 an example progression for the preparation of a storage/generator vessel assembly is shown with component label descriptions of the generator column in Table 14.

TABLE 14

Example Component details of the generator column.

| Label | Description | Dimensions | Length, cm |
|---|---|---|---|
| 300 | Column body (Teflon PFA tubing) | 0.156" by ¼" | 5.00 |
| 310 | Male luer-lok to barbed tube coupler | 0.094" ID 0.44" barb OD. | 1.47 |
| 312 A/B | Top/bottom-silicone rubber tubing | 0.031" by ¹⁄₁₆" | ~15 |
| 314 A/B | Top/bottom-straight barbed reducer | 0.063" by ⅛" ⅜" by ⅜" barb OD. | 2.14 |
| 316 | Glass wool | 0.05 g | 0.21 |
| 318 | Teflon frit | 0.04 cm$^3$ | 0.31 |
| 320 | Resin catch bed (sans $^{224}$Ra) | 0.05 cm$^3$ | 0.40 |
| 322 | Polypropylene felt frit | 0.02 cm$^3$ | 0.18 |
| 324 | Resin column bed $^c$ (w/distributed $^{224}$Ra) | ~0.259 cm$^3$ | 2.06 |
| 326 | Female luer-lok to barbed tube coupler | 0.094" ID, 0.44" barb OD. | 1.37 |
| 328 | One-way luer-lok check valve | 0.44" barb OD. | 3.30 |

After the chemically resistant polypropylene felt frit (322) was packed above the catch bed (320), the open column body was enclosed with a barbed polycarbonate reducer (314B) connected by silicone tubing (312B) to a female luer-lok/barbed tube coupler (326). In the automated $^{224}$Ra-loaded column packing step, the bed of uniformly distributed $^{224}$Ra-sorbed resin (324) was dispensed as a slurry through the inlet tubing (326, 312B, and 314B) and into the column body, packing the column bed. In the final assembly, a one-way check valve (328) was used to connect the inlet/outlet silicone tubing lines (312A and 312B) by their luer-lok fittings (310 & 326).

In accordance with another implementation, the column body 300 was enclosed within a polyethylene vial prior to column bed packing so as to remove the risk of contamination, and reduce hand dose caused by the previous process (plugging the top with wool, and enclosing the column after the bed was delivered). In addition, the one-way check valve was installed to provide back pressure, thus preventing the uniform resin bed from deforming during transport.

As described above, this system is configured to be hands-free, as well as remotely and/or operable automatically. As shown in the systems, methods for producing a metal storage generation vessel can include homogenizing a resin slurry in a first mixing vessel, then supplementing the homogenized resin slurry with a metal to form a homogenized bound metal resin slurry and transferring the homogenized bound metal resin slurry to a storage generation vessel. In accordance with example implementations, these methods can provide for the stable transfer and distribution of these elements into storage and/or generation vessels.

Additionally, the storage and generation vessel can include a "catch bed" 320 that includes an unbound or element free resin portion that is proximate the exit of the vessel. This resin portion can be above a frit or porous material 318 to alleviate the transfer of resin out of the storage vessel. Another frit 322 placed atop the catch bed 320 allows separation of the catch bed 320 from the $^{224}$Ra-sorbed resin bed 324.

Accordingly, the metal storage generation vessel assembly is described with reference to FIGS. 54-61. Vessel 6 can have a metal free catch bed 320 that is below a metal and resin distributed bed 324. In accordance with example implementations, eluent solution can be provided to the intake conduit, and the metal generated can be provided through the eluted out conduit. In accordance with example implementations, this eluted out conduit can be a decay product of the element or isotope present or provided to the storage and generation vessel.

Referring next to FIG. 55, a more detailed view of an implementation of a storage generation vessel is shown with a more detailed description of the dimensions and materials.

Referring to FIGS. 56A-56B, a decay chain image is provided demonstrated the Pb production from an Ra storage/generator vessel assembly according to an embodiment of the disclosure.

Referring next to FIG. 57, an example series of storage and generation vessels prepared by the described apparatus are shown. This series was used to evaluate the reproducibility of resin bed deliveries.

The generator column preparation and packing process time should be minimized to the extent possible, so as to minimize $^{224}$Ra progeny ingrowth. Based on an elapsed time of up to 15 minutes, less than 0.1% per min of $^{212}$Pb, and 0.01% per min of $^{212}$Bi, $^{208}$Tl, and $^{212}$Po would grow in relative to the initial $^{224}$Ra activity. Minimization of $^{224}$Ra progeny ingrowth during the execution of the column packing process is essential to reduce radiological dose from high energy photons (up to 2.6 MeV from $^{208}$Tl).

The process for minimizing the elapsed time of the automated column packing sequence can be broken into four parts: A) maximization of reagent flow rates, B) reduction in tubing path lengths, C) simplification of the sequence code, and D) reduction in software cycling time.

Similar to the resin slurry delivery studies, water delivery studies were performed at 10 mL/min increments up to 50 mL/min to determine an upper limit for each tubing inner diameter employed and the SP. An upper flow rate limit was designated when cavitation within the tubing or syringe pump occurred and/or the reagent was not completely transferred. Optimal flow rates determined from this study are shown in Table 15.

TABLE 15

Maximum aspiration and dispensation flow rates for the column packing system.

| Flow pathway | Tubing ID, in | Water, mL/min | Resin slurry, cm$^3$/min |
|---|---|---|---|
| Syringe pump (SP) | — | 40 | n/a |
| 1/16" OD tubing | 0.04 | 20 | n/a |
| 1/8" OD tubing | 0.063 | 30 | 20 |

When operating the fluid delivery sequence under elevated flow rates, significant pressure could build into the lines, thus requiring additional steps to vent pressure. This was performed by adjusting the SP distribution valve to the waste port, which ensures that pressures equilibration is attained before the next step is initiated (e.g., before switching flow paths). Further time minimization was performed through a reduction of various tubing lengths to shorten the path required for a reagent to traverse the system.

Additional time delays originally programmed into the code during troubleshooting activities were reduced or removed. Finally, an inhouse software package was implemented enabling full automation of the system while providing additional controls over each electromechanical component in the system.

Using an interface, the idle time associated with cycling port position on the SP, V4, and V6 was reduced. Elapsed times for the automated column packing sequence is shown in Table 16.

The elapsed time for the entire column packing process was reduced from ~18 to ~12 minutes, with the column packing stage requiring 8.9 minutes. This time can be further reduced by separating the column packing stage into two parts. Steps 2 through 7 can be performed prior to purification and delivery of $^{224}$Ra to the column packing system while steps 8 through 13 can be performed after. Separating this stage will reduce the ingrowth time by 5.2 minutes, thus requiring only ~3.7 minutes to dispense/contact $^{224}$Ra and packing the column bed for shipping. Note that this elapsed time may increase slightly based on the sorption rate of $^{224}$Ra onto the MP-50 resin, which can be >=60 sec.

TABLE 16

Elapsed times for the automated column packing sequence. Non-bolded steps performed before or after $^{224}$Ra isolation and delivery; bolded steps performed upon $^{224}$Ra delivery.

| Stage | Step | Segment description | Time, min | Cumulative time, min | Sum time, min |
|---|---|---|---|---|---|
| System priming | 1 | Filling the reagent lines | 0.7 | 0.7 | 0.7 |
| Column packing | 2 | Dispense water/air to fill HCs | 1.3 | 1.9 | 8.9 |
| | 3 | Aspirate resin slurry from LMV$_g$; dispense to SM | 0.5 | 2.4 | |
| | 4 | Dispense air to clear residual resin slurry from lines | 0.3 | 2.7 | |
| | 5 | Dispense water/air to remove excess resin metering the column bed | 1.7 | 4.3 | |
| | 6 | Condition resin with 0.01M HCl; dispense to SMV | 1.1 | 5.4 | |
| | 7 | Aspirate resin supernatant to ESC | 0.4 | 5.9 | |
| | 8 | Dispense mock $^{224}$Ra to SMV; contact resin using gas agitation | 0.8 | 6.6 | |

TABLE 16-continued

Elapsed times for the automated column packing sequence. Non-bolded steps performed before or after $^{224}$Ra isolation and delivery; bolded steps performed upon $^{224}$Ra delivery.

| Stage | Step | Segment description | Time, min | Cumulative time, min | Sum time, min |
|---|---|---|---|---|---|
| | 9 | Aspirate contacted resin; dispense to pack column | 0.7 | 7.3 | |
| | 10 | Dispense ESC supernatant to SMV; contact residual resin using gas agitation $^a$ | 0.4 | 7.7 | |
| | 11 | Aspirate residual resin; dispense to pack column | 0.7 | 8.4 | |
| | 12 | Dispense 1M HCl to wash column | 0.4 | 8.8 | |
| | 13 | Dispense water/air to rinse; then air-dry column and lines | 0.8 | 9.5 | |
| Remediation | 14 | Dispense water/air to rinse; then air-dry Ra and HCl lines | 1.1 | 10.6 | 2.3 |
| | 15 | Dispense air to remove residual water in lines | 1.3 | 11.9 | |

The generator column packing system was evaluated through extensive testing to ensure a reproducible column bed with less than 5% variability in resin bed volumes. This was essential, as each generator column was preassembled with only enough empty space for the column bed and the subsequent addition of a barbed end fitting placed atop the column bed. This required that the generator column inserted into the fluidic system receive a consistent volume of resin in a uniform configuration above the felt frit 322 and catch bed 320.

Packed bed reproducibility testing was performed through the use of gravimetric and volumetric determination. Based on the optimal conditions described above, gravimetric analysis was used to evaluate mass loss when delivering the 1.85 mL of aspirated resin slurry (from the $LMV_g$) through the system.

Once a consistent resin mass was delivered, volumetric analysis was used to evaluate the column beds being packed in each generator column. This was performed to ensure uniform column beds were packed without disturbing the catch bed, and to ensure that there was no entrapment of air bubbles within the resin bed. A resin bed containing trapped air bubbles can significantly alter the flow pathway for the mobile phase through the resin, causing an inconsistent $^{212}$Pb elution recovery The automated packing method was evaluated to quantify the reproducibility of the resin mass delivered to the column delivery line. Five sets of six runs (n=30) were performed where each column bed was dispensed into a tared 20 mL LSC vial, then vacuum oven dried and weighed per the method described. The results of all thirty runs are shown in Table 17.

Systems demonstrated that a consistent resin mass could be delivered with less than 3% relative standard deviation (RSD) over thirty replicates. In addition, each individually prepared batch of resin/water suspension could be used for at least six sequential replicates without refill or replacement. Small deviations observed in mass deliveries could be caused by variance in size distribution of aspirated resin beads or human error in drying down samples.

TABLE 17

Measured masses of dry resin in the bed from the automated column packing process.

| Set | Run | Resin mass, g | Ave. mass, g | ±1 s | RSD, % |
|---|---|---|---|---|---|
| 1 | 1 | 0.0826 | 0.0864 | 0.0029 | 3.34 |
| | 2 | 0.0887 | | | |
| | 3 | 0.0830 | | | |
| | 4 | 0.0889 | | | |
| | 5 | 0.0882 | | | |
| | 6 | 0.0868 | | | |
| 2 | 7 | 0.0873 | 0.0873 | 0.0019 | 2.19 |
| | 8 | 0.0862 | | | |
| | 9 | 0.0885 | | | |
| | 10 | 0.0850 | | | |
| | 11 | 0.0867 | | | |
| | 12 | 0.0904 | | | |
| 3 | 13 | 0.0846 | 0.0886 | 0.0034 | 3.89 |
| | 14 | 0.0927 | | | |
| | 15 | 0.0885 | | | |
| | 16 | 0.0897 | | | |
| | 17 | 0.0915 | | | |
| | 18 | 0.0846 | | | |
| 4 | 19 | 0.0853 | 0.0874 | 0.0013 | 1.49 |
| | 20 | 0.0883 | | | |
| | 21 | 0.0877 | | | |
| | 22 | 0.0887 | | | |
| | 23 | 0.0863 | | | |
| | 24 | 0.0882 | | | |
| 5 | 25 | 0.0899 | 0.0879 | 0.0031 | 3.58 |
| | 26 | 0.0880 | | | |
| | 27 | 0.0932 | | | |
| | 28 | 0.0856 | | | |
| | 29 | 0.0850 | | | |
| | 30 | 0.0860 | | | |
| Grand Mean | | | 0.0875 | 0.0026 | 2.95 |

Overall, the system demonstrated that a consistent mass of resin can be delivered to the column. An average AG MP-50 resin mass delivery of 0.0875±0.0026 grams of dried resin (n=30) was observed.

The automated packing methods were evaluated to quantify the reproducibility of packing consistent resin bed volumes prior to use of the $^{224}$Ra stock solution. Two sets of six runs (n=12) were performed using the semi-automated packing method; an image of each packed column is shown side by side in FIG. 57. Two additional sets of six runs (n=12) were performed using the fully automated system through implementation of the SVMB and SCIVs. The packed resin bed volume of each column was calculated using the column bed height and inner diameter of the column tubes. Results for these twenty-four runs are shown in Table 18. It is noted that the presence of entrapped air pockets within the packed beds were not observed.

TABLE 18

Determined column bed volumes from automatically-packed columns.

| Set | Run | Bed vol.[a], cm$^3$ | Ave. mass, cm$^3$ | ±1 s | RSD, % |
|---|---|---|---|---|---|
| 1 | 1 | 0.263 | 0.261 | 0.004 | 1.4 |
|   | 2 | 0.263 |  |  |  |
|   | 3 | 0.265 |  |  |  |
|   | 4 | 0.257 |  |  |  |
|   | 5 | 0.256 |  |  |  |
|   | 6 | 0.261 |  |  |  |
| 2 | 7 | 0.252 | 0.257 | 0.005 | 1.9 |
|   | 8 | 0.254 |  |  |  |
|   | 9 | 0.263 |  |  |  |
|   | 10 | 0.253 |  |  |  |
|   | 11 | 0.263 |  |  |  |
|   | 12 | 0.258 |  |  |  |
| 3 | 13 | 0.259 | 0.261 | 0.006 | 2.3 |
|   | 14 | 0.259 |  |  |  |
|   | 15 | 0.267 |  |  |  |
|   | 16 | 0.269 |  |  |  |
|   | 17 | 0.263 |  |  |  |
|   | 18 | 0.252 |  |  |  |
| 4 | 19 | 0.254 | 0.256 | 0.004 | 1.7 |
|   | 20 | 0.261 |  |  |  |
|   | 21 | 0.257 |  |  |  |
|   | 22 | 0.257 |  |  |  |
|   | 23 | 0.248 |  |  |  |
|   | 24 | 0.259 |  |  |  |
| Grand mean |  |  | 0.259 | 0.005 | 2.0 |

[a] Bed volumes were determined using the column inner diameter (0.4 cm).

Based on volumetric measurements of the $^{224}$Ra distributed generator column bed, the grand mean of all twenty-four runs was 0.259±0.005 cm$^3$ (±2.0% RSD).

Referring next to FIG. 58, a tandem EDTA precipitation/filtration module and vessel assembly module is depicted and evaluated. The automated precipitation/filtration module can be coupled in tandem for the purpose of reducing the number of electronic components and extraneous process time between steps in the process. By coupling the two systems, only one microcontroller and computer was required to operate both systems. Additionally, this enabled both sets of process steps to be incorporated into a single process sequence which minimized the number of lines of code and system idle time. A schematic of the tandem two module system excluding components of the column packing system prior to $^{224}$Ra delivery is shown in FIG. 58. Descriptions of each component are shown in Table 19.

TABLE 19

EDTA precipitation/filtration module and column packing system module schematic labels (FIG. 58).

| Label | Component description |
|---|---|
| a | $^{224}$Ra-EDTA inlet line (C3 eluent from triple-column system) |
| b | Acid dispensing line |
| c | Activated charcoal $^{220}$Rn trap |
| d | 5 mL Rezorian ™ column w/Spinplus ® PTFE stir bar & hydrophobic PE frit |
| e | Three-way stopcock valve |
| f | Servo motor (SvM) |
| g | Rinse vessel for filtrate line |
| h | "Multi-Stirrus" vertical magnetic stirrer |
| i | Inverted digital syringe pump w/8-port distribution valve |
| j | 0.45 μm PES membrane syringe filter |
| k | $^{224}$Ra collection vessel |
| l | Nitrogen gas regulator |
| m | Solenoid-controlled isolation valve (SCIV) |
| n | Small mixing vessel (SMV) |
| o | Cheminert 6-port selector valve (V6) |
| p | Holding coil to 6-port selector valve (HC/V6) |
| q | Syringe pump w/8-port distribution valve |
| r | Assembled generator column (AGC) |

In performing the automated process, time minimization was performed to ensure minimal ingrowth of $^{212}$Pb/$^{212}$Bi/$^{208}$Tl after the initial $^{224}$Ra purification. Through integration of the two modules, the required process time to precipitate and filter EDTA, deliver $^{224}$Ra to the column packing module, and pack the generator column was minimized. A summary of the steps for these processes are shown in Table 20.

The overall process can be reduced from the total elapsed time of 16.6 minutes to 8.8 minutes by preforming the system preparation (steps 1 to 5) and remediation (steps 14 to 15) before and after the $^{224}$Ra was delivered. Compared to the individual column packing modular process described herein, the elapsed time of the two module sequence steps performed upon $^{224}$Ra delivery increased only 5.0 minutes (from 3.8 to 8.8 minutes).

TABLE 20

Elapsed times for the automated in line EDTA precipitation/filtration and column packing sequence. Non-bolded steps were performed before or after $^{224}$Ra delivery. Bolded steps were performed upon $^{224}$Ra delivery from the triple-column module.

| Stage | Step | Segment description | Time, min | Stage time, min | Elapsed time, min |
|---|---|---|---|---|---|
| System priming | 1 | Filling the reagent lines | 0.7 | 0.7 | 0.7 |
| Pre Ra- | 2 | Dispense water/air to fill HCs | 1.3 | 3.8 | 2.0 |
| Column packing | 3 | Aspirate resin slurry from LMV$_g$; dispense to SM | 0.5 |  | 2.5 |
|  | 4 | Dispense air to clear residual resin slurry from lines | 0.3 |  | 2.8 |

TABLE 20-continued

Elapsed times for the automated in line EDTA precipitation/filtration and column packing sequence. Non-bolded steps were performed before or after $^{224}$Ra delivery. Bolded steps were performed upon $^{224}$Ra delivery from the triple-column module.

| Stage | Step | Segment description | Time, min | Stage time, min | Elapsed time, min |
|---|---|---|---|---|---|
| | 5 | Dispense water/air to remove excess resin, metering the column bed | 1.7 | | 4.5 |
| Precipitation/ column packing | 6A | Acidification of $^{224}$Ra-EDTA solution/ stir bar agitation to form precipitate | 0.8 | 5.0 | 5.3 |
| | 6B | Condition resin with 0.01M HCl; dispense to SMV; aspirate resin supernatant to ESC | 1.2 | | 6.5 |
| | 7 | Withdraw Ra filtrate; dispense to CP system | 3.0 | | 9.5 |
| Column packing | 8 | Dispense mock $^{224}$Ra to SMV; contact resin using gas agitation | 0.8 | 3.8 | 10.3 |
| | 9 | Aspirate contacted resin; dispense to pack column | 0.7 | | 11.0 |
| | 10 | Dispense ESC supernatant to SMV; contact residual resin using gas agitation | 0.4 | | 11.4 |
| | 11 | Aspirate residual resin; dispense to pack column | 0.7 | | 12.1 |
| | 12 | Dispense 1M HCl to wash column | 0.4 | | 12.5 |
| | 13 | Dispense water/air to rinse; then air-dry column and lines | 0.8 | | 13.3 |
| System remediation | 14 | Dispense water/air to rinse; then air-dry Ra and HCl lines | 1.1 | 3.3 | 14.4 |
| | 15 | Dispense residual water in lines to waste | 2.2 | | 16.6 |

An assessment of the tandem two module system was performed to evaluate the $^{224}$Ra yield from each process in-line using a fully automated system. The automated precipitation and filtration method was connected in-line with the automated column packing process described herein. A partial schematic of the two-module system is shown in FIG. 58. A $^{224}$Ra/resin contact time of 1 minute was utilized for this assessment. A series of six replicates were performed, with results shown in Table 21.

TABLE 21

Assessment of $^{224}$Ra fraction recovery using the automated in-line EDTA precipitation/filtration, and column packing systems. The grand mean results are in bold.

| Replicate | EDTA precipitation and filtration | $^{224}$Ra generator column packing | Cum. $^{224}$Ra yield |
|---|---|---|---|
| 1 | 0.871 | 0.982 | 0.855 |
| 2 | 0.859 | 0.981 | 0.843 |
| 3 | 0.880 | 0.972 | 0.855 |
| 4 | 0.890 | 0.985 | 0.877 |
| 5 | 0.865 | 0.992 | 0.858 |
| 6 | 0.864 | 0.979 | 0.846 |
| Mean | 0.872 | 0.982 | 0.856 |
| ±1 s | 0.012 | 0.007 | 0.012 |
| RSD, % | 1.3 | 0.7 | 1.4 |

Each module displayed mean recoveries within 1% of their previous individual assessments.

The EDTA precipitation/filtration system and column packing system were successfully incorporated into a tandem in-line system. The $^{224}$Ra yield for the precipitation/filtration step (0.872±0.012) was in agreement with previous evaluation (0.867±0.010), and the generator packing yield of 0.982±0.007 was in agreement with the prior evaluation (0.980±0.010). Overall, a cumulative $^{224}$Ra yield of 0.856±0.012 was demonstrated. In addition, the elapsed time of the process was reduced to 8.8 minutes by reorganizing sequence steps, thereby minimizing ingrowth of $^{224}$Ra progeny (dose to user).

An assessment of the $^{224}$Ra yield through the entire three module automated process was performed through incorporation of the $^{224}$Ra isolation module, using the triple-column system and method, followed by the EDTA precipitation/filtration module, and the column packing system module. In the three-module process, the $^{224}$Ra elution outlet line of the triple-column fluidic module was connected directly to the precipitation vessel (label a in FIG. 58) so that an assessment of the entire in-line process could be performed. A summary of the elapsed process times for the entire three-module process is shown in Table 22.

TABLE 22

Summary of the elapsed process times for the automated three module process to obtain a $^{224}$Ra-packed generator column when starting from a $^{228}$Th stock solution.

| Segment description | Time, min | Stage time, min | Elapsed time, min |
|---|---|---|---|
| Preparatory steps before three module process | 9.0 | 9.0 | 9.0 |
| $^{224}$Ra isolation module | 50.2 | 59.0 | 59.2 |
| EDTA precipitation and precipitation module | 5.0 | | 64.2 |
| $^{224}$Ra/CatIX loading & column packing module | 3.8 | | 68.0 |
| Remediation of three module system | 21.9 | 21.9 | 89.8 |

In the assessment of the integrated three module process, the segments were reorganized so that all system preparatory steps were performed prior to the $^{224}$Ra isolation module, while all system remediation steps were performed after the generator column was assembled. Based on the process times described, total elapsed time for isolation of $^{224}$Ra, precipitating/filtering EDTA, $^{224}$Ra/CatIX loading, and column assembly was 59.0 minutes, with the entire process (inclusive of preparatory and system remediation steps) taking ~1.5 hours.

A series of twenty-one replicates were performed to evaluate the $^{224}$Ra yield at the completion of each modular step and to determine the cumulative $^{224}$Ra yield. Results of the assessment are shown in Table 23.

TABLE 23

Assessment of $^{224}$Ra yields through the automated in-line three module system, starting from a $^{228}$Th stock solution. The grand mean results are in bold.

| Replicate | $^{224}$Ra isolation | EDTA precipitation and filtration | $^{224}$Ra generator column packing | Cum. $^{224}$Ra yield |
|---|---|---|---|---|
| 1 | 0.985 | 0.861 | 0.993 | 0.843 |
| 2 | 0.991 | 0.870 | 0.993 | 0.857 |
| 3 | 0.975 | 0.865 | 0.987 | 0.832 |
| 4 | 0.983 | 0.872 | 0.987 | 0.846 |
| 5 | 0.969 | 0.858 | 0.987 | 0.821 |
| 6 | 0.980 | 0.852 | 0.987 | 0.824 |
| 7 | 0.973 | 0.850 | 0.988 | 0.817 |
| 8 | 0.999 | 0.861 | 0.977 | 0.841 |
| 9 | 0.976 | 0.863 | 0.978 | 0.823 |
| 10 | 0.962 | 0.894 | 0.980 | 0.842 |
| 11 | 0.964 | 0.900 | 0.971 | 0.843 |
| 12 | 0.964 | 0.896 | 0.991 | 0.856 |
| 13 | 0.984 | 0.902 | 0.983 | 0.873 |
| 14 | 0.950 | 0.856 | 0.980 | 0.797 |
| 15 | 0.958 | 0.861 | 0.972 | 0.801 |
| 16 | 0.950 | 0.889 | 0.981 | 0.829 |
| 17 | 0.952 | 0.910 | 0.970 | 0.840 |
| 18 | 0.970 | 0.863 | 0.997 | 0.835 |
| 19 | 0.941 | 0.872 | 0.976 | 0.801 |
| 20 | 0.979 | 0.886 | 0.971 | 0.843 |
| 21 | 0.967 | 0.855 | 0.980 | 0.811 |
| Mean | 0.970 | 0.873 | 0.982 | 0.832 |
| ±1 s | 0.015 | 0.019 | 0.008 | 0.029 |
| RSD, % | 1.5 | 2.1 | 0.8 | 3.5 |

The automated in-line three module system demonstrated a reproducible mean yield of 0.832±0.029. In addition, the EDTA precipitation/filtration and column packing modules demonstrated excellent performance consistency with $^{224}$Ra yields within the 1 sigma uncertainty between this and the previous system, wherein only modules 2 and 3 were employed (Table 21).

In summary, the integrated three module process has demonstrated that $^{224}$Ra can be isolated, EDTA-purified, resin-loaded, and packed into a generator column assembly reproducibly, with a mean yield of 0.832±0.029 in a process that takes less than 1 hour with only an additional ~0.5 hours to set up and remediate the system.

Using $^{224}$Ra/$^{212}$Pb generator columns that were prepared via the three-module fluidic system, performance parameters were assessed, which included: 1) the $^{212}$Pb elution profile during milking, and 2) $^{224}$Ra breakthrough from the column.

An assessment of the $^{212}$Pb elution behavior was performed using a $^{224}$Ra generator column produced by the three-module process. A 3 mL aliquot of 2 M HCl was loaded onto the generator column to measure $^{212}$Pb recovery as a function of eluent. Once complete, the generator column was flushed with 1 mL of water delivered through the generator column for storage. A plot of the $^{212}$Pb elution profile in 2 M HCl is shown in FIG. 59.

The storage/generator vessel assembly demonstrated that ~55% of the ingrown elutable $^{212}$Pb was recovered within the first 0.5 mL fraction collected, while ~95% was recovered within the first 1 mL. For the $^{224}$Ra generator milking process, 1 mL is sufficient to recover the majority of the elutable $^{212}$Pb, while each additional 0.25 mL fraction will only slightly increase the recovery (<1% gain).

$^{224}$Ra breakthrough levels from generators prepared via the automated three-module process were also determined.

In order to confirm the $^{224}$Ra breakthrough value on a freshly-packed $^{212}$Pb generator column, 10 milking cycles were performed using a 1 mL 2 M HCl load followed by a 1 mL DIW rinse. A plot comparing the fractional loss of $^{224}$Ra in each of these milking cycles is shown in FIG. 60. Before $^{224}$Ra level was determined by gamma counting, each fraction was allowed to decay for several days to ensure that $^{224}$Ra and $^2$Pb were in secular equilibrium.

A decrease in $^{224}$Ra breakthrough was observed between the $1^{st}$ milking cycle and $2^{nd}$ milking cycle, while a steady $^{224}$Ra breakthrough was noted from the $2^{nd}$ to $10^{th}$ cycle. The $1^{st}$ milking cycle is typically discarded (as it represents the $1^{st}$ milking after the generator column arrives to the end-user facility), since it grows in stable Pb during transport. Excluding this first milking cycle, the system's breakthrough is ~0.14% per elution cycle. Based on these observed results, a careful assessment of the milking process was performed in an attempt to understand and minimize the $^{224}$Ra breakthrough observed from auto-packed generator columns.

The distribution coefficient ($K_d$) for Ba (a close Ra chemical analogue) on macroporous CatIX resin is estimated to be only ~300 mL/g in a $^{212}$Pb elution matrix of 2 M HCl. In comparison, the $K_d$ for Pb on the same is ~5 mL/g. So, $^{212}$Pb elutes from the column with ~60-fold less resin affinity relative to that of Ba (Ra). As depicted in FIG. 59, the low CatIX resin affinity of Pb is apparent from the sharp elution from the generator column.

For the moderately-adsorbed $^{224}$Ra, the Ra$^{2+}$ ions at the base of the distributed CatIX bed have a ~50 μL resin catch bed (~0.4 mm bed height) to prevent them from co-eluting with $^{212}$Pb. The volume of this catch bed may be insufficient to assure a high-purity milked $^{212}$Pb product.

In an effort to better understand the loss of $^{224}$Ra from the distributed bed generator column, the end-to-end fluidic system was employed to prepare a generator column without the ~50 μL catch bed, and also three columns that each contained the standard catch bed at the column base. The column without the catch bed would allow evaluation of the distributed $^{224}$Ra elution rate without the protective catch bed being present. With the three catch bed-bearing columns, $^{224}$Ra breakthrough was compared with and without the presence of a supplemental catch bed cartridge. The supplemental catch beds were prepared from trimmed-down SPE tube columns (5.6 mm ID) and employed 20 μm pore size polyethylene frits above and below the supplemental resin beds. The prepared columns used in this evaluation are shown in FIG. 61, and described in Table 24.

TABLE 24

Description of $^{224}$Ra/$^{212}$Pb generator column configurations shown in FIG. 61.

| Column ID | $^{224}$Ra distributed bed vol., μL | 50 μL catch bed? | Supplemental catch bed cartridge vol., μL [a] |
|---|---|---|---|
| a | 0.260 ± 0.004 | N | — |
| b | | Y | — |
| c | | Y | 100 |
| d | | Y | 200 |

[a] Prepared in a trimmed down SPE tube column (5.6 mm dia.)

Given that $^{212}$Pb is milked from the generator columns using 2 M HCl (~1 mL), this reagent was used to deliver the equivalent of ~20 $^{212}$Pb milking cycles. This study excluded the injection of water between each ~1 mL $^{212}$Pb eluent injection. The column effluents were collected generally in 1.0±0.1 mL fractions, and were allowed to decay until any $^{224}$Ra bleed-out in the effluent fractions were in secular equilibrium with $^{212}$Pb. Analysis of the fractions by auto-gamma detector counts provided the fraction of $^{224}$Ra breakthrough, relative to the $^{224}$Ra activity loaded onto each generator column.

The incremental $^{224}$Ra breakthrough fraction as a function of $^{212}$Pb eluent volume is shown in FIG. 62A. As was apparent in FIG. 60, a slightly higher release of $^{224}$Ra eluting from the column in the first ~1 mL of 2 M HCl for the column without the catch bed (Column a). After the first ~1 mL of $^{212}$Pb eluent, the degree of $^{224}$Ra breakthrough is generally reduced to a plateau level around 0.8% per mL. This plateau makes sense, as the $^{224}$Ra is distributed evenly in the CatIX resin bed; there is as much $^{224}$Ra at the top of the column as there is at the very bottom of the column. As the $^{224}$Ra migrates down the column, a continuous level of bleed-out would be anticipated. In FIG. 61B, the same data is shown, but as a cumulative plot. If the first "sacrificial" elution volume (~1 mL) is discarded, ~8% of the $^{224}$Ra is lost from Column a after 10 mL, and ~15% is lost after 20 mL.

The standard column (column b), with the distributed $^{224}$Ra bed and embedded ~50 μL catch bed behaves differently. Initially, a lower degree of $^{224}$Ra breakthrough (~25-fold decrease), as the catch bed successfully captures a portion of the $^{224}$Ra as it migrates from the distributed CatIX bed. However, as the volume of 2 M HCl delivered through standard column b increases, the degree of $^{224}$Ra breakthrough likewise increases. This is evidence that $^{224}$Ra does eventually migrate through the catch bed. If provided sufficient 2 M HCl volume, it is anticipated that the $^{224}$Ra breakthrough would increase until it reaches the plateau level obtained by Column a. For long-term milking, Column b achieved a cumulative $^{224}$Ra loss of ~1.4% and ~4.0% after 10 mL and 20 mL of eluent delivery, respectively.

Columns c and d, with the supplemental 100 μL and 200 μL resin cartridges attached to the generator column outlets, respectively, show additional reductions in $^{224}$Ra breakthrough. Column c starts at 0.005% breakthrough, and rises to 0.016% breakthrough per mL at ~20 mL. The rise in breakthrough level, although slight, indicates some progressive $^{224}$Ra levels emerging from the cartridge. At 10 mL and 20 mL elution volumes, the cumulative $^{224}$Ra breakthrough levels are ~0.08% and ~0.2%, respectively.

In comparison, Column d shows extremely low $^{224}$Ra loss; the data trace plots the minimum detectable activity (MDA) level beyond 3 mL. Even with accumulation of the MDA levels vs. volume, Column d shows ~0.001% and ~0.003% $^{224}$Ra loss at 10 mL and 20 mL of $^{212}$Pb eluent solution delivery, respectively.

The four generator column configurations discussed herein can be preserved for over two weeks following the $^{224}$Ra breakthrough study. At the conclusion of the ~20 mL delivery of 2 M HCl, the columns were blown out with air, capped, and stored.

Respective $^{212}$Pb milking profiles for each of the column configurations were evaluated. Each column (with or without the supplemental cartridges described in Table 24) received 2 M HCl at a flow rate of 1.0 mL/min to milk the in-grown $^{212}$Pb. Fractions of ~0.5 mL were collected for each column elution cycle. The results are shown in FIGS. 63A and 63Bb. Here, it is observed that $^{212}$Pb elution volume between Columns a and b are virtually identical; the presence of the ~50 μL catch bed has no observable impact on $^{212}$Pb elution profiles (which is consistent with the low Kd of $^{212}$Pb on MP-50 resin). The $^{212}$Pb yields for Columns a and b after a 1 mL elution volume was ~88%.

The two columns with the supplemental resin cartridges (Columns c and d) did exhibit some degree of $^{212}$Pb elution broadening. The $^{212}$Pb activity was distributed relatively evenly between the first two ~0.5 mL fractions; Columns c and d had 1 mL $^{212}$Pb yields of ~85% and ~81%, respectively. At fractions 3 and beyond, the $^{212}$Pb tailing was consistent with those observed for Columns a and b, those without the supplemental resin cartridges. At the 1.5 mL elution volume, all column $^{212}$Pb elution yields were >90%.

The presence of the 100 μL and 200 μL supplemental resin cartridges placed immediately downstream of the $^{212}$Pb generator columns had similar $^{212}$Pb yields at 1.0 mL elution volume, relative to the standard generator column configuration (Column b). Therefore, the supplemental resin cartridges did not adversely affect the $^{212}$Pb recovery, while providing $^{212}$Pb products that contained significantly higher radionuclidic purity from $^{224}$Ra.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A system for producing a free element, the system comprising:
   providing a mixing vessel in fluid communication with both a bound element source and an acid source, wherein the mixing vessel is operably configured to mix contents within the mixing vessel, wherein the element is Ra, and the Ra is bound with EDTA;
   a first multiport valve operably engaged with an exit of the mixing vessel; and
   a second multiport valve operably engaged with the first multiport valve, the acid source, and a collection vessel.

2. The system of claim 1 wherein the isotope is 224Ra.

3. The system of claim 1 wherein the first and second multiport valves are configured to be operated remotely.

4. The system of claim 1 further comprising a system for isolating Ra from Th to form the bound element source.

5. The system of claim 1 further comprising an adsorbent vessel coupled to the mixing vessel.

6. The system of claim 5 wherein the adsorbent vessel contains activated carbon.

7. The system of claim 1 wherein the mixing vessel is oriented vertically having an exit at the bottom of the mixing vessel.

8. The system of claim 7 further comprising a porous structure proximate the exit.

9. The system of claim 8 wherein the porous structure defines a frit or filter.

10. A method for producing a free element from a bound element, the method comprising:
    providing a solution comprising an element bound to a complex, wherein the solution comprising an element bound to a complex comprises Ra bound to EDTA;

exposing the solution to an acid solution to separate the complex from Ra; and removing either Ra or the Ra bound to the EDTA from the solution to produce Ra.

11. The method of claim 10 wherein the exposing the solution to an acid solution precipitates the Ra bound to the EDTA to produce a Ra solution, the method further comprising transferring the Ra solution to a collection vessel.

12. The method of claim 11 wherein the providing the solution comprising the element bound to the complex comprises using a pressure differential to provide the solution to a mixing vessel.

13. The method of claim 12 further comprising agitating the solution within the mixing vessel using a stirring member.

14. The method of claim 11 wherein the transferring the Ra solution comprises using a pressure differential to transfer the Ra solution through a filter to the collection vessel.

15. The method of claim 10 further comprising separating the Ra from a solution comprising Ra and Th to form the solution comprising Ra bound to EDTA.

16. The method of claim 10 wherein the solution of the Ra bound to the EDTA has a pH greater than 11.

17. The method of claim 10 wherein the free element solution comprises Ra and has a pH less than 4.

18. The method of claim 10 wherein the free element solution comprises Ra and has a pH less than 2.

19. A system for preparing a free element and providing a storage/generator vessel assembly, the system comprising:
 a free element production module configured to uncouple a complexed element;
 a storage/generator vessel assembly production module configured to combine the free element and media within the vessel assembly; and
 an element isolation module configured to isolate Ra from a mixture comprising at least Ra, Pb, Bi, and Th.

20. The system of claim 19 wherein the free element is predictably unstable to form progeny that can be withdrawn from the vessel assembly.

21. The system of claim 19 wherein the free element is Ra.

22. The system of claim 20 wherein the vessel assembly can be utilized to generate Pb.

23. A method for providing a free element and providing a storage/generator vessel assembly comprising the element, the method comprising:
 providing a complexed element to a first mixing vessel, wherein an element of the complexed element is Ra and the complex is EDTA;
 providing an acid solution to the first mixing vessel to free the Ra and precipitate the complex while leaving Ra in the solution;
 separating the Ra from the precipitate;
 providing the Ra to a second mixing vessel to mix the Ra with a homogenized media to form an Ra-media mix; and
 providing the Ra media mix to a storage/generator vessel assembly.

24. The method of claim 23 wherein the Ra is $224Ra^{2+}$.

25. A method for providing an Ra and providing a storage/generator vessel assembly comprising the Ra, the method comprising:
 providing complexed Ra to a first mixing vessel, wherein the complexed Ra is provided by separating Ra from a mixture comprising at least Ra, Pb, Bi, and Th to form the complexed Ra;
 providing an acid solution to the first mixing vessel to free the complexed Ra and precipitate the complex while leaving the Ra in solution;
 separating the Ra from the precipitate;
 providing the Ra to a second mixing vessel to mix the Ra with a homogenized media; and
 providing the Ra-media mix to a storage/generator vessel assembly.

* * * * *

UNITED STATES PATENT AND TRADEMARK OFFICE
CERTIFICATE OF CORRECTION

PATENT NO. : 11,999,628 B2  
APPLICATION NO. : 17/120084  
DATED : June 4, 2024  
INVENTOR(S) : Matthew J. O'Hara, Gabriel B. Hall and Lucas P. Boron-Brenner Page 1 of 1

It is certified that error appears in the above-identified patent and that said Letters Patent is hereby corrected as shown below:

On the Title Page

Item (56) References Cited, page 2, 2nd Column, 36th Line:  
Replace "EP 20902056 2/2024"  
With --EP 20903056 Partial Supp Search February 26, 2024--

Signed and Sealed this  
Eighteenth Day of February, 2025

Coke Morgan Stewart  
*Acting Director of the United States Patent and Trademark Office*